SELECTION CIRCUITS

STORAGE INPUT CIRCUITS

BFR

BCU RESPONSE

CHAN REQUEST

GATE CH/CPU CH E/O CH/CPU OP

CPU REQ

CPU E/O

BASIC BUSY TRIGGER & CYC INH TIMING

CH-CPU INTERPLAY

SAB ADR CHK

X/Y - W/Z

ADVANCE

United States Patent Office 3,376,556

Patented Apr. 2, 1968

3,376,556

STORAGE REFERENCE PRIORITY IN A DATA PROCESSING SYSTEM

Leo J. Hasbrouck, Poughkeepsie, N.Y., Charles Richard Holleran, Saratoga, Calif., Lewis E. King, Highland, N.Y., and William P. Wissick, Sunnyvale, Calif., assignors to International Business Machines Corporation, Armonk, N.Y., a corporation of New York Continuation-in-part of application Ser. No. 445,316, Apr. 5, 1965. This application Jan. 13, 1967, Ser. No. 609,239

14 Claims. (Cl. 340—172.5)

ABSTRACT OF THE DISCLOSURE

The specification discloses an illustrative embodiment for the invention comprising a large scale data processing system of the type which is composed of a plurality of quasi-independent units. The environmental data processing system includes a central processing unit or portion, which is herein referred to as a CPU, a plurality of storage units, a plurality of input/output control devices referred to herein as channels, as well as control and maintenance facilities which are found in a power distribution unit, herein referred to as a PDU. The CPU of the environmental system includes a control or instruction unit hereinafter referred to as an I unit, and an arithmetic and logic or execution unit, hereinafter referred to as an E unit. The I unit includes controls for instruction fetching, branching, interruption handling, communication with the input/output channels, and other related functions. The E unit of the environmental system can perform algebraic and logical operations, moving, shifting, and other functions.

This application is a continuation-in-part of application Ser. No. 445,316, filed Apr. 5, 1965, entitled "Storage Reference Priority in a Data Processing System," now abandoned.

TABLE OF CONTENTS

Figure 40:
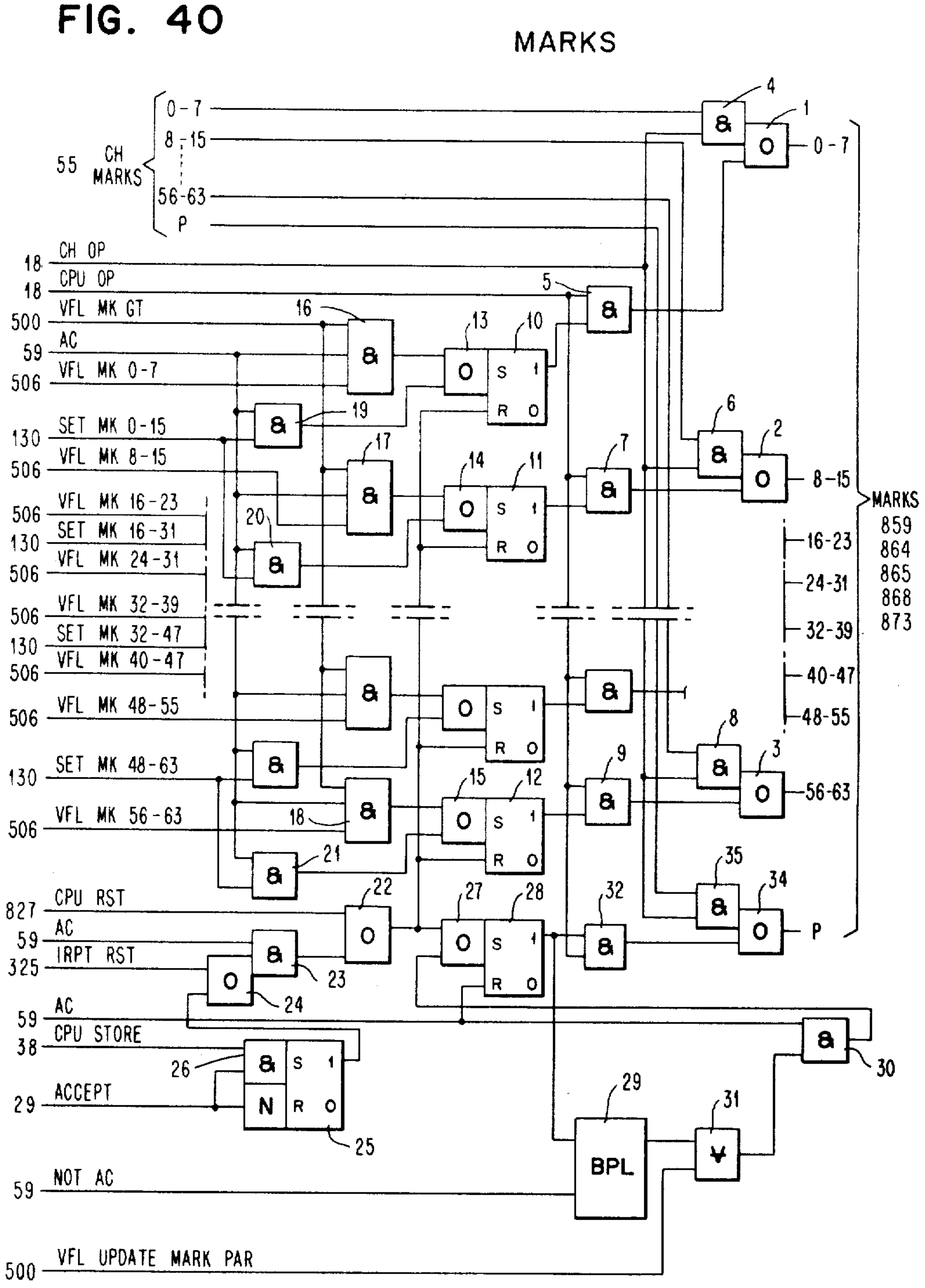

Column
(1.0) Background of the Invention — 2
(2.0) References — 5
(3.0) Nomenclature — 6
(4.0) Brief Description of Environmental System (FIG. 2) — 8
(5.0) Component Circuits (FIG. 3 Through FIG. 8) — 8
(6.0) Basic Bus Control Unit — 10
(6.1) Selection Circuits — 11
(6.1.1) Channel Priority (FIG. 9) — 11
(6.1.1.1) Channel Priority Circuit (FIG. 12) — 12
(6.1.1.2) Buffer Circuit (FIG. 13) — 13
(6.1.1.3) Delay Circuit (FIG. 14) — 13
(6.1.1.4) BCU Data Request Circuit (FIG. 15) — 14
(6.1.1.5) BCU Response (FIG. 16) — 14
(6.1.2) Channel Selection, Generally (FIG. 9) — 15
(6.1.2.1) Channel Request Circuit (FIG. 17) — 15
(6.1.2.2) Channel Even/Odd Selection (FIG. 18) — 16
(6.1.3) CPU Selection, Generally (FIG. 9) — 17
(6.1.3.1) CPU Request Circuit (FIG. 21) — 18
(6.1.4) CH CPU Selection Circuits. Generally (FIG. 9) — 19
(6.1.4.1) Channel—CPU Selection A/B—Even/Odd (FIG. 27) — 20
(6.1.4.2) Busy, Positive Select And Inhibit Circuits (FIG. 28) — 21
(6.1.4.3) Accept Circuit (FIG. 29) — 21
(6.1.4.4) CPU Communicate—Busy Circuit (FIG. 30) — 22
(6.1.5) Storage Address Register (FIG. 23) — 22
(6.1.6) Summation of Selection Circuits — 23
(6.2) Storage Input Circuits (FIG. 10) — 25
(6.2.1) Address OR (FIG. 31) — 26
(6.2.2) Storage Addressing (FIG. 32) — 26
(6.2.3) SAB Address Check (FIG. 33) — 26
(6.2.4) Invalid Address (FIG. 34) — 27
(6.2.5) Cancel—Panel Key Fetch (FIG. 35) — 28
(6.2.6) Parity Adjust (FIG. 36) — 29
(6.2.7) Address Compare (FIG. 37) — 29
(6.2.8) Store Circuit (FIG. 38) — 30
(6.2.9) Storage Bus in Latch (FIG. 39) — 30
(6.2.10) Marks Circuit (FIG. 40) — 31
(6.2.11) In Keys Circuit (FIG. 42) — 33
(6.3) Storage Output Circuits (FIG. 11) — 35
(6.3.1) Return Address Timing (FIG. 43) — 35
(6.3.2) X/Y—W/Z Triggers (FIG. 44) — 36
(6.3.2.1) X and Y Registers (FIG. 45 and FIG. 46) — 37
(6.3.2.2) X/Y Advance Circuit (FIG. 47) — 38
(6.3.2.3) Summation of X/Y W/Z circuits (FIG. 42 and FIGS. 43 through 47) — 40
(6.3.3) BCU Checking Circuits — 40

Column
(6.3.3.1) Storage Address Protection Circuit (FIG. 48) — 40
(6.3.3.2) Storage Data Check Circuit (FIG. 49) — 41
(6.3.3.3) Storage Address Check Circuit (FIG. 50) — 42
(6.3.3.4) X/Y—W/Z Check Circuit (FIG. 51) — 42
(6.3.3.5) BCU Stop Clock Circuit (FIG. 52) — 43
(6.3.4) Out Keys (FIG. 53) — 43
(6.3.5) Storage Bus Out Latch Circuit (FIG. 54) — 44
(6.3.6) Reset Circuits — 44
(6.3.6.1) Computer Reset Control — 44
(6.3.6.2) System Reset Control — 45
(6.3.6.3) System Reset — 45

1.0 BACKGROUND OF THE INVENTION

This invention relates to data processing and more particularly to a selective circuit for assigning priority as between an input/output control channel and a central processing unit in determining the allotment of storage for references thereto.

Large scale data processing systems usually are provided with main storage facilities which are utilized for storing instructions, controls and data for use throughout the system. In order for the input/output devices of the system to communicate with the central processing unit of the system, referencing of the storage facility by both the input/output devices and the central processing unit is provided. In counter distinction to the "IRE Standards on Electronic Computers Definitions of Terms, 1956" (Proceedings of the IRE, September 1956) it has been common in recent years to refer to input/output control units which communicate directly with the central processing unit as "channels." The use of the word "channel" herein relates to a device which can communicate with a storage facility, a central processing unit, and other main portions of a data processing system, and which may have attached thereto input/output devices or control units therefor.

In a system employing several channels and a central processing unit, it is desirable to allow the channels to reference the storage facility independently of the central processing unit, and vice versa. However, maximum system throughout (job performing capability) requires that the channels and the CPU interfere with each other as little as possible in the accessing of storage. Therefore, various storage control means have been provided in data processing systems known to the art.

In one type of data processing system, the various channels are alloted storage references by means of time division or other multiplexing, wherein each channel is poled to determine whether or not it requires a reference to a storage facility. In some cases, the central processing unit is considered to be one of the channels, and may be poled first or last or at some other station within the poling sequence. In other systems, absolute priority as between the channels is established by means of alloting to each channel a priority number such that the lowest numbered channel always takes priority over any higher number channel. In some of these systems, the central processing unit may be considered to be one of the channels and given either highest, lowest, or some other priority. In variations of the two foregoing types of systems, the channels themselves may be multiplexed or given absolute priority ratings, but the CPU may be allowed to completely block the channels, or the channels may be allowed to completely block the CPU. In still other systems, the last type of unit to receive service, (such as a channel or a CPU) is given a lower priority in comparison with the other type of unit. Thus, if the channel has made a reference and the CPU is waiting, then the CPU can make the next reference, the following reference to be made again by one of the channels. This latter type of system provides a useful "mix" in allotting storage availability as between channels and the CPU, but has the inherent disadvantage of preventing repetitive use by either a channel or the CPU in the event that there is an absolute need therefor.

Whenever a channel is receiving data at a rate faster than it can transfer the data to a storage facility without exceeding its own buffer-storage capability, the channel will develop what is commonly called an "overrun condition." In many systems, an overrun condition causes an interruption indicating that a nonpermissible situation exists in the channel. This of course stops the execution of the program by the central processing unit, thereby decreasing the throughput and increasing the number of special cases which must be handled by the computer. It is therefor desirable to provide a good "mix" as between the channels and the CPU without absolutely preventing the channels from referencing a storage device. In this connection, it should be borne in mind that channels are frequently communicating with input/output devices which run completely asynchronously, and which cannot be slowed down or stopped by either the channels themselves or by the central processing unit. This is particularly true in what is called "real time" applications, wherein an event which is happening must be monitored as it happens, in contrast to "non-real time" applications such as the sensing of punched data processing cards, which can be delayed if necessary.

A further characteristic of data processing systems is that the input-output devices, and therefore the channels which assist them in communicating with the remainder of the system, operate at speeds which are generally much slower than the maximum operating speed capability of a central processing unit. Therefore, it is necessary to provide storage referencing facilities which can take into account the different operating speeds of the portions of the system which may require access to the storage facility. Similarly, many systems operate asynchronously in the sense that various units of the system are independent of each other in their clocking control circuits; for instance, systems frequently permit channels to operate at their own speed, and to become synchronized with a storage referencing device only by means of an interface through which permissive actions and reactions can be communicated. Such a channel is described in a copending application of the common assignee herewith entitled, "Automatic Channel Apparatus," Ser. No. 357,369, filed Apr. 6, 1964, in the name of L. E. King et al.

Because of the fact that the central processing unit has a much shorter basic operating cycle than an input/output channel, it is desirable to provide storage facility control to handle storage references by the CPU in a manner which is calculated to detract from the speed of the CPU as little as possible. Additionally, the CPU is normally located in close proximity to the main storage facility in contrast with the location of channels which is usually somewhat more removed therefrom. Due to the necessity of having input/output units arranged about the channel which control them, it is fundamental that not all of the channels can be in close proximity to any equipment, including a storage facility. Thus, if all the channels are grouped close together, and immediately adjacent to the CPU and the storage facility, there would be no room at that point to install input/output equipment to which the channel relates. It is therefore common that circuit propagation time for intercommunication between channels and the CPU and/or a storage facility is longer than the circuit propagation time for communication between a CPU and the storage unit. Even after a storage unit has made a request known to a bus control unit or other storage control units, the fact that the channel's request has been granted must be propagated back to the channel, and then the address, data, and other signals must be propagated toward the bus control unit. Since greater distances are involved with the channels than with the CPU, these times are considerably longer in channel communications than in communications with the CPU.

An object of the present invention is to provide improved bus control means for a data processing system. Other objects of the invention include the following:

Provision of a storage bus control means which provides a good mix between channel and CPU storage references;

Provision of a storage control means for granting storage control accesses to channels and to a CPU without preventing repetitive accesses by one or the other of them;

Provision of a storage bus control means which provides a varying priority scheme as between channels and a CPU which may reference the storage facility;

Provision of a storage bus control means which is adapted to handle channel storage requests and CPU storage requests somewhat differently, whereby each of them is handled in a manner best suited thereto;

Provision of a storage but control means having a capability of accommodating the characteristics of channels and accommodating the characteristics of a CPU with a minimum of interference between channels and CPU;

Provision of a versatile bus control unit which lends itself to incorporaton in a variety of embodiments.

This invention is predicated on the concept that channel and CPU storage requests may first be handled separately, and then selectively honored as between them, with a quasi/random priority as between storage and channels, and with circuit arrangements designed to accommodate the differing speeds of channels and CPU's.

In accordance with the present invention, a "double-level" priority system is used to determine whether the CPU or the channels will receive service whenever storage references conflict between them. In accordance with one feature of the invention, the CPU is given priority over the channel in the event that access of a non-busy storage is requested by both of them, and yet priority is given to the channels in the event that the channels and the CPU both have outstanding requests to access a storage unit which is busy at the time that the requests are manifested.

In accordance with a further feature of the invention, the circuitry which interconnects the storage unit with either the CPU or the channels is normally arranged so that the CPU is connected to storage, and in the event that a channel-storage operation is involved, the circuitry is switched so as to connect the storage unit with the channels instead; this feature favors the CPU circuitwise so that a minimum of time is required in providing the proper circuit arrangements for communicating between the CPU and the storage unit, the circuit operation time for changing storage connections from the CPU to the channels being absorbed within the time of a channel storage reference.

In accordance with still another feature of the invention, a storage facility having a basic accessing rate is controlled for operation with a plurality of channels having roughly the same accessing rate as the storage facility and of the CPU. In accordance with still another cessing rate capability by means of control logic which has a basic accessing rate in between that of the storage facility and of the CPU. In accordance with still-another feature of the invention, the foregoing features are rendered compatible with overlapped (or interleaved) operation of a plurality of storage units so as to provide a storage facility having a faster effective accessing rate than the rate of the storage units of which the facility is comprised.

The foregoing and other objects, features and advantages of the invention become more apparent in the light of the following detailed description of a particular embodiment thereof as shown in the accompanying drawings. The drawings are illustrative block diagrams, schematic block diagrams, timing diagrams, charts and illustrations of an embodiment of the present improvement, as set forth in a Large Scale Data Processing System which is referred to as "said environmental system," as set forth in the following list:

TABLE OF FIGURES

Figure 1:
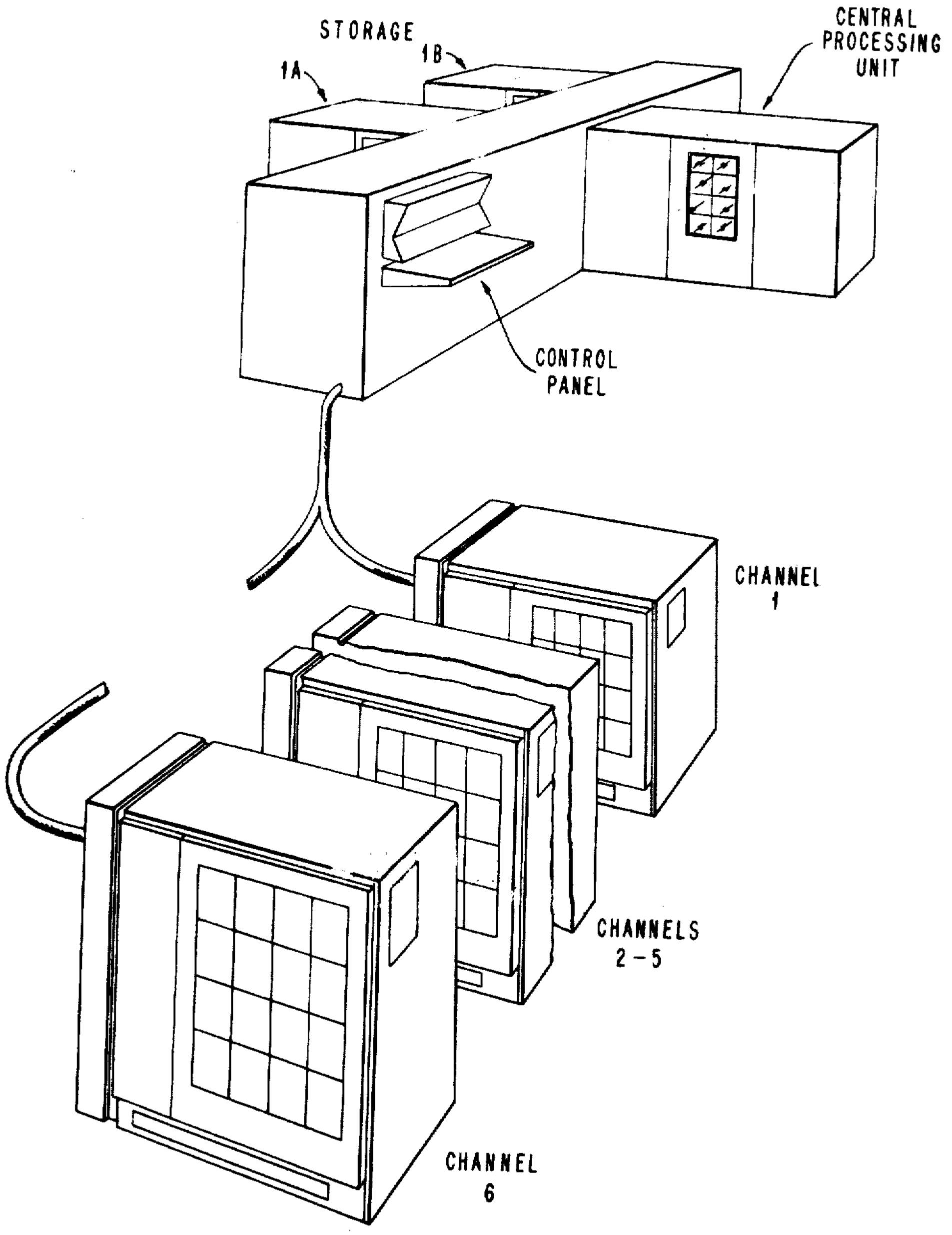
Figure 2:
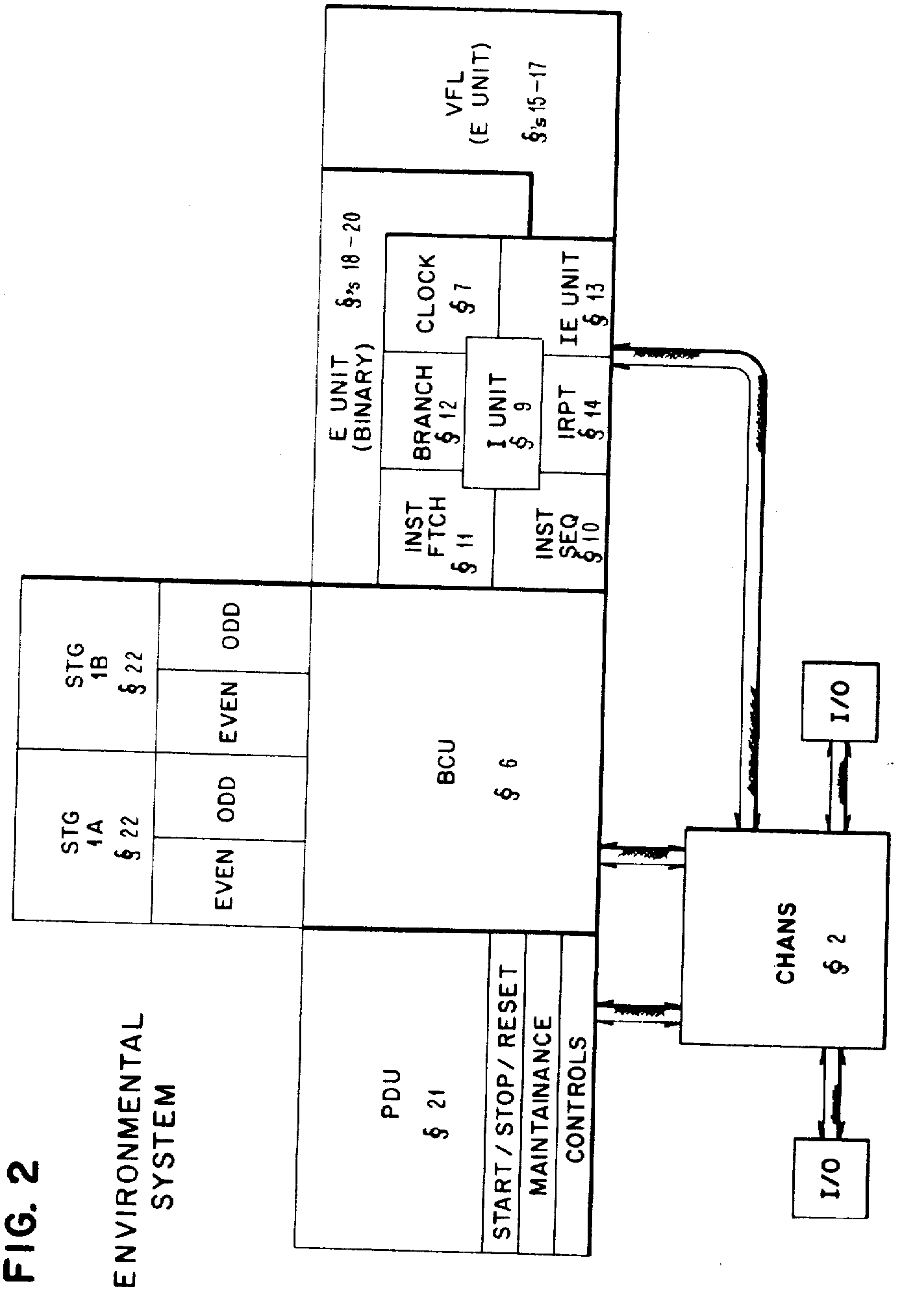
Figure 3A:
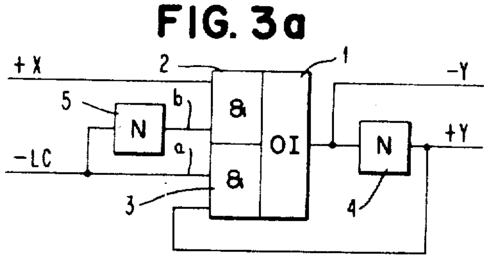
Figure 3B:
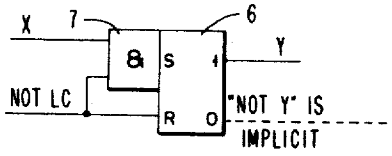
Figure 3C:
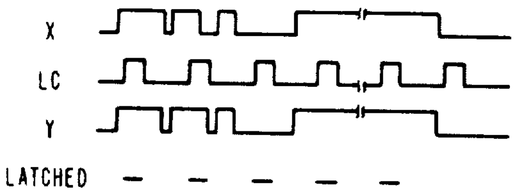
Figure 3D:
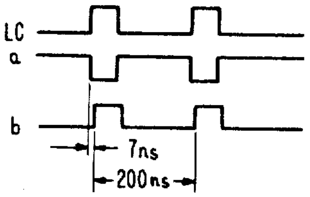
Figure 4A:
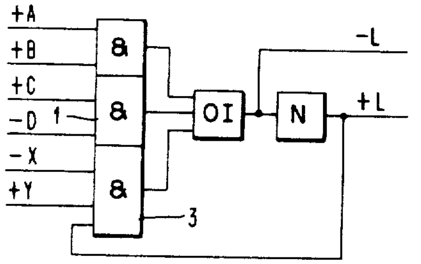
Figure 4B:
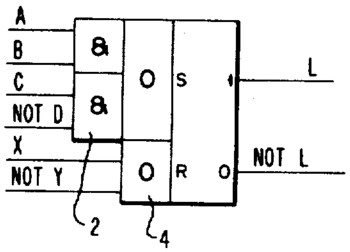
Figure 5A:
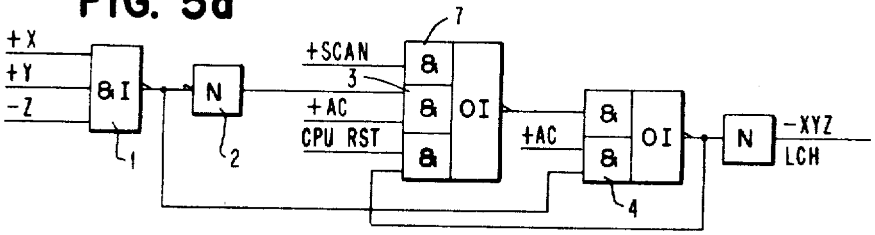
Figure 5B:
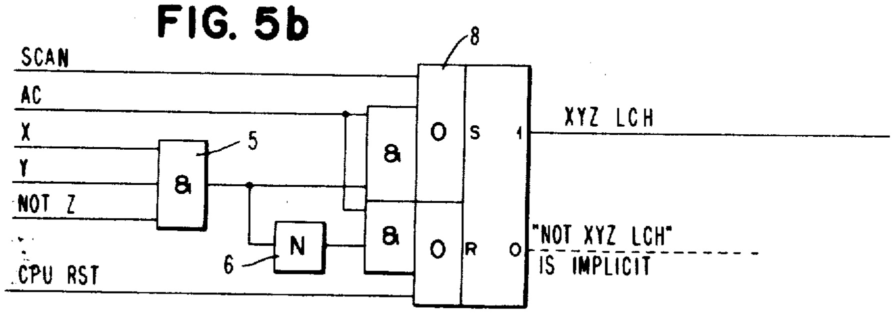
Figure 6A:
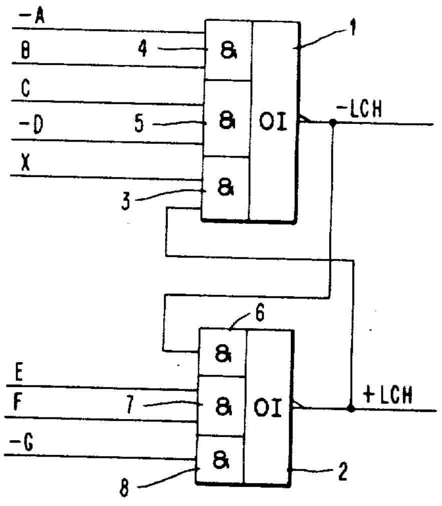
Figure 7A:
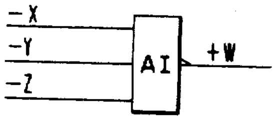
Figure 7B:
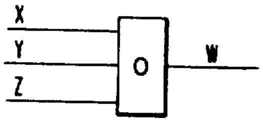
Figure 8A:
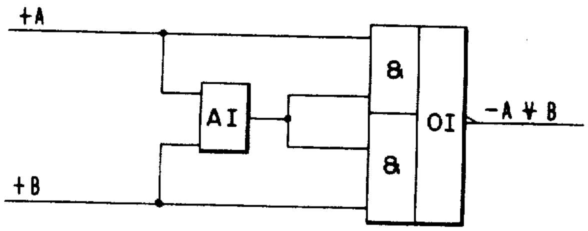
Figure 55:
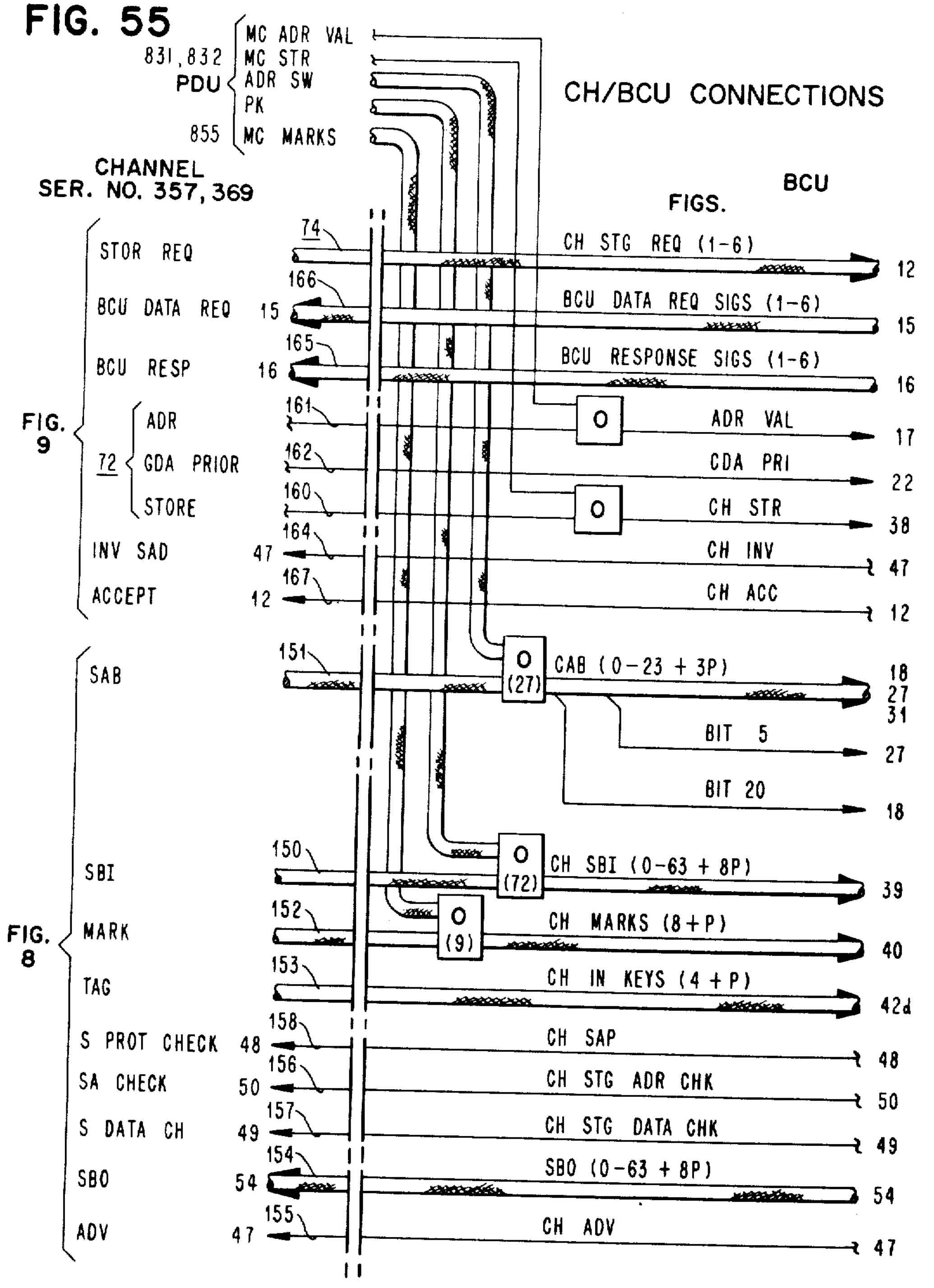
Figures 56, 876:
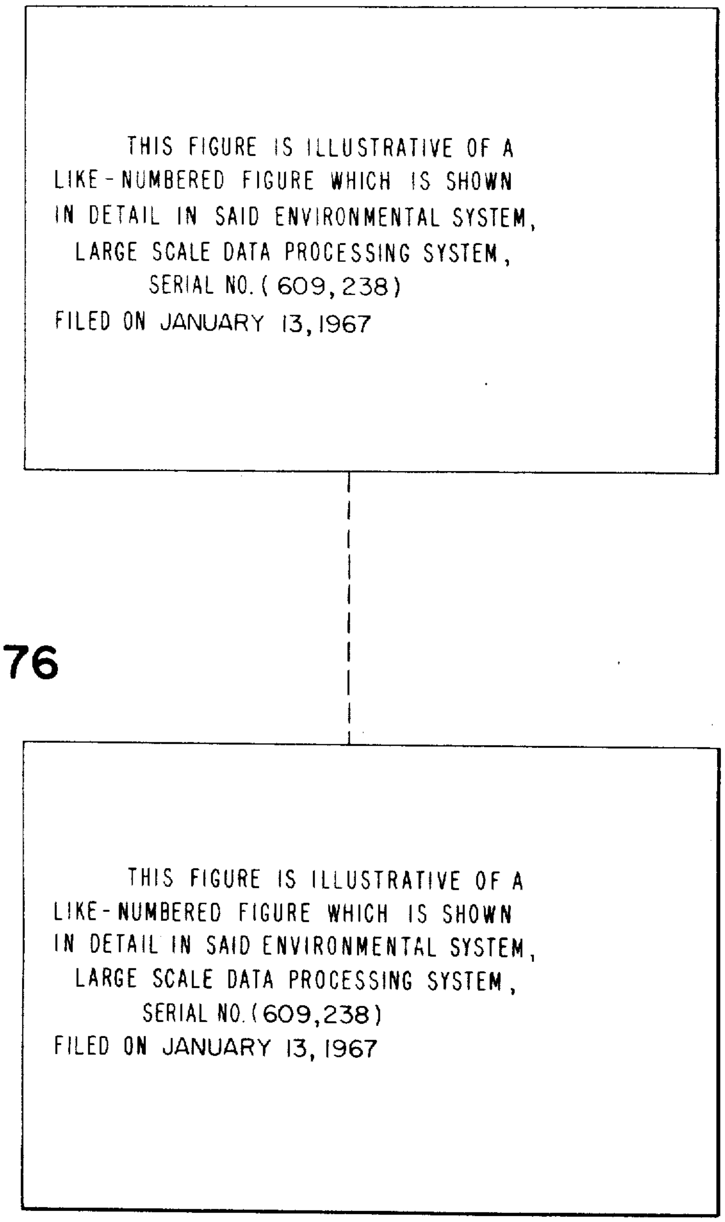

| | Sheet |
|---|---|
| (Fig. 1) System Illustration | 1 |
| (Fig. 2) Environmental System | 2 |
| (Figs. 3a–5b) Component Circuits | 3 |
| (Fig. 3a) Simple Latch | 3 |
| (Fig. 3b) Simplified Illustration of Latch of Fig. 3a | 3 |
| (Fig. 3c) Illustrates Operation of Latch of Fig. 3a | 3 |
| (Fig. 3d) Illustrates Inverter Delay | 3 |
| (Fig. 4a) Latch Having a Combined Reset Condition | 3 |
| (Fig. 4b) Simplified Illustration of Latch of Fig. 4a | 3 |
| (Fig. 5a) Latch | 3 |
| (Fig. 5b) Simplified Illustration of Latch of Fig. 5a | 3 |
| (Figs. 6a–8b) Component Circuits | 4 |
| (Fig. 6a) Variation of Latch Shown in Fig. 5a | 4 |
| (Fig. 6b) Simplified Illustration of Latch of Fig. 6a | 4 |
| (Fig. 7a) Illustrates Operation of AND-INVERT Circuit | 4 |
| (Fig. 7b) Illustrates Operation of OR Circuit | 4 |
| (Fig. 8a) Two Input EXCLUSIVE-OR Circuit | 4 |
| (Fig. 8b) Simplified Illustration of EXCLUSIVE-OR Circuit of Fig. 8a | 4 |
| (Fig. 9) Selection Circuits | 5 |
| (Fig. 10) Storage Input Circuits | 6 |
| (Fig. 11) Storage Output Circuits | 7 |
| (Fig. 12) CH PRI | 8 |
| (Figs. 13–15) BFR, Delay, BCU Data REQ, respectively | 9 |
| (Figs. 16–18) BCU Response, CHAN Request, Gate CH/CPU, respectively | 10 |
| (Fig. 19) Basic CH REQ CYC | 11 |
| (Fig. 20) Basic CPU CYC | 12 |
| (Fig. 21) CPU REQ | 13 |
| (Fig. 22) CPU E/O | 13 |
| (Fig. 23) SAR | 14 |
| (Fig. 24) CPU REQ CT | 15 |
| (Fig. 25) Busy & CYC INH Timing | 16 |
| (Fig. 26) CH–CPU Interplay | 17 |
| (Fig. 27) SEL A/B–E/O CH–CPU | 18 |
| (Fig. 28) Busy-POS SEL-INH | 19 |
| (Fig. 29) Accept | 20 |
| (Fig. 30) CPU COM-Busy | 20 |
| (Fig. 31) ADR OR | 21 |
| (Fig. 32) Addressing | 21 |
| (Fig. 33) SAB ADR CHK | 22 |
| (Fig. 34) INV ADR | 23 |
| (Fig. 35) Cancel-PKF | 23 |
| (Fig. 36) PAR ADJ | 24 |
| (Fig. 37) ADR COMP | 24 |
| (Fig. 38) Store | 25 |
| (Fig. 39) SBIL | 25 |
| (Fig. 40) Marks | 26 |
| (Fig. 41) Mark Timing | 27 |
| (Figs. 42a–d) In Keys | 28 |
| (Fig. 43) Simplified RTN ADR Timing | 29 |
| (Fig. 44) X/Y–W/Z | 29 |
| (Fig. 45) X REG | 30 |
| (Fig. 46) Y REG | 30 |
| (Fig. 47) Advance | 31 |
| (Fig. 48) SAP | 32 |
| (Fig. 49) STR Data CHK | 32 |
| (Figs. 50–52) STR ADR CHK, X/Y–W/Z CHK, BCU Stop CLK, respectively | 33 |
| (Fig. 53) Out Keys | 34 |
| (Fig. 54) SBOL | 35 |
| (Fig. 55) CH/BCU Connections | 36 |
| Figs. 56–876 are illustrative of figures in said environmental system | 37–643 |

(2.0) REFERENCES

The following reference explains the full environment of the present invention: "IBM System/360 Principles of Operation," a copy of which has been deposited in the "Scientific Library of the U.S. Patent Office" IBM "Form No. A–22–6821."

Another reference, which discloses a small system in accordance with the architecture of said System/360 Manual is found in a copending application of the same assignee entitled Data Processing System, Ser. No. 357,372, filed on Apr. 6, 1964, by G. M. Amdahl, et al.

An input/output channel device which is adapted for use in said environmental system is disclosed in a copending application of the same assignee entitled Automatic Channel Apparatus, Ser. No. 357,369, filed Apr. 6, 1964, by L. E. King, et al.

A core storage device is shown in a copending application of the same assignee entitled Storage Drive System, Ser. No. 445,306, filed Apr. 5, 1965, by Anatol Furman.

A bipolar latch, used throughout said environmental system, is described in detail in an article by O. J. Bedrij, entitled Gated Trigger with Bipolar Set, IBM Technical Disclosure Bulletin, vol. 2, No. 6, Apr. 1960, p. 50 (a copy of which has been deposited in the Scientific Library of the U.S. Patent Office).

A binary trigger is referred to in particular in section 5. This trigger is described in detail in section 11*b* of a copending application of the same assignee entitled Parallel Memory, Multiple Processing, Variable Word Length Computer, Ser. No. 332,648, filed Dec. 23, 1963, by R. S. Carter and W. W. Welz, now Patent 3,270,325, issued on Aug. 30, 1966.

Binary-decimal addition is described in a copending application of the same assignee, Ser. No. 223,431, entitled Byte Processing Unit, filed Sept. 13, 1962 by Robert Keslin. A shifter is described in a copending application of the same assignee, Ser. No. 162,477, Proportional Space Matrix Printer, filed Dec. 27, 1961, by Richard L. Taylor, now Patent 3,174,427, issued on Mar. 23, 1965.

Additional references include the following copending applications of the same assignee as in this case, each of which forms a part of, and is illustrated in the environmental system:

Large Scale Data Processing System, Ser. No. 445,326, filed Apr. 5, 1965, by O. L. MacSorley et al., now abandoned.

Large Scale Data Processing System, Ser. No. 609,238, filed on Jan. 13, 1967, by O. L. MacSorley et al., said application being a continuation-in-part of Ser. No. 445,326.

Unit Unavailability Detector for a Data Processing System, Ser. No. 445,318, filed Apr. 5, 1965, by W. P. Wissick et al., now Patent 3,341,824, issued on Sept. 12, 1967.

Rate Control in an Asynchronous Device Storage Accessing Apparatus, Ser. No. 445,319, filed Apr. 5, 1965, by W. P. Wissick et al., now abandoned.

Rate Control in an Asynchronous Device Storage Accessing Apparatus, Ser. No. 609,254, filed on Jan. 13, 1967, by W. P. Wissick et al., said application being a continuation-in-part of Ser. No. 445,319.

Storage Cancellation and Panel Data Key Fetching in a Data Processing System, Ser. No. 445,311, filed Apr. 5, 1965, by W. P. Wissick et al., now abandoned.

Storage Cancellation and Panel Data Key Fetching in a Data Processing System, Ser. No. 609,252, filed Jan. 13, 1967, by W. P. Wissick et al., said application being a continuation-in-part of Ser. No. 445,311.

(3.0) NOMENCLATURE

The nomenclature of the present embodiment is almost entirely consistent with that shown in said System/360 Manual. A few exceptions do exist however. One of these is the instruction Execute and is herein referred to in abbreviated form as XEQ, whereas said manual refers to this instruction in abbreviated form as EX. Another example is the instruction Edit; it is referred to in abbreviated form herein as EDT whereas said manual refers to same as ED. In order to avoid confusion with "execution," "E decode," and other similar functions in the present embodiment, these changes have been made. However, a good definition of each of the instructions which may be performed by the present embodiment is found in said manual. Additionally, the functions of a data processing system in accordance with the architectural definition within said manual are applicable to this embodiment, with the exception of the fact that the present embodiment does not provide for: sharing of storage by more than one system, a multiplex channel, direct coupling between computers, large capacity storage, and certain other features which could be available on an embodiment of the system described in said manual. However, said environmental system is readily adapted for the achievement of these functions.

In the present embodiment, a bit means a binary unit of intelligence, which can be either a one or a zero. A byte comprises eight bits, two bytes comprise a syllable or a half-word. Two syllables, or two half-words comprise a word, which includes thirty-two bits. A storage word is two words or sixty-four bits in the environmental system of the present embodiment. In storage, and within the data flow of the environmental system, there is one parity bit for each eight bits of data; at certain points in a data flow this is altered; for instance, at the output of an adder, it is possible that parity may be carried to several stages of logic on a four bit basis, and then combined on an eight bit basis.

In the detailed descriptions herein, the signals which propagate between various figures are all identified by unique lines which are referred to in the upper case (such as SAR meaning the output of the storage address register, CPU RST being the line that causes a computer reset of a particular type). As is discussed more fully in section 5, hereinafter, the use of positive and negative signals as inputs to positive and negative-type circuits is so customary, that it no longer has any significance to consider signals in actual circuitry as being either the true or the complement of an event; for instance, if a signal is generated in a positive sense when the event occurs, a minus signal may nonetheless be required to indicate that event due to the fact that the circuit which is utilizing the signal requires a negative input. For that reason, complementary functions (such as NOT LC, meaning the complement of the LC signal) are referred to as inputs even though they may not be explicitly generated in the circuit where the event is manifested by the true signal.

In block diagrams which comprise a plurality of blocks, each block being represented by one or more figures, the figure or figures within which the details of the particular block are shown may be identified in that block by figure number only, without the word "FIG." actually being printed within that block. This allows a simpler block configuration which is easier to read.

In the description of the detail figures, the various circuits elements are referred to by reference numerals, the reference numerals being applicable only in the particular figure number. However, in any case where a particular item is referred to in more than one place, it would have the same reference numeral wherever it is referred to. On the other hand, reference numerals between 1 and 30 are used repetitively throughout the environmental system due to the fact that the size of the environmental system would require reference numerals having four or five digits if completely sequential reference numerals were used for the entire environmental system. Therefore, any possible tendency toward confusion is alleviated by also specifying the figure number along with the reference numeral; additionally, the description itself is patently clear insofar as the precise element to which reference is being made.

When terms such as "storage cycle" or "last E cycle" are used, machine cycles as such are not necessarily involved. For instance, a storage cycle requires five machine cycles in the embodiment of said environmental system; last cycle triggers may be set from the start of NOT L time to the start of the following NOT L time, a period equal to a 200 nanosecond machine cycle, but displaced therefrom by approximately 65 nanoseconds since the basic machine cycle is defined to be from the start of A time to the end of A time, as is described in section 7. The duration or phase of any specially-refered to cycle often differs from a basic machine cycle. The terms, when used, refer to the latched condition or event being described, as is apparent in the context where used.

In order to facilitate cross referencing between the various copending applications, and most particularly, to facilitate cross referencing of embodiments in said copending applications of portions of said environmental system with the embodiment of a full environmental system, constant sequential figure numbers are used in all of said copending applications, whereby all figure numbers are identical in all of the cases. In order to reduce the cost of printing, figure numbers which relate to circuits not required in smaller embodiments are shown in an illustrative manner only. Any reference to a figure which is shown in an exemplary form in one of said copending applications should be interpreted as a reference to that same figure in the embodiment of said environmental system.

In certain instances, control lines comprising a particular combination of operational decoding or other status indications may not be shown in detail; that is, a line called "BR OR STATUS SWX" may be utilized, as an input to a circuit, but may not be generated, as an output from a circuit. However, there are innumerable examples of generated decode lines such that the generation of any other one would be well within the skill of the art. As an example, a line called "VFL T1 OR Y ≠O" could be generated by the OR of "VFL T1" with "Y≠O," or with "NOT Y EQ O," or by ORing the bits of the Y REG to see that Y does indeed equal other than zero.

(4.0) BRIEF DESCRIPTION OF ENVIRONMENTAL SYSTEM (FIG. 2)

In FIG. 2, a block representation of said environmental system is shown to include a bus control unit (BCU) which is described in section 6, and which provides data flow communication between the various units of the system, and provides controls for the storage devices. The operator controls, certain maintenance controls, and basic stop, start and reset controls are provided in the power distribution unit (PDU) described in section 21. The system also includes an I unit, the data flow portion of which is described in section 9, the main other functions of the unit being described in separate sections. The clock is shown in section 7, and includes the main timing pulses which are utilized throughout the system so as to synchronize operations. In section 10, instruction sequencing is described, and instruction fetching is described in section 11. Branching operations, and their effect on the remainder of the system are all described in section 12. Communication with channels, and performance of certain supervisory type instructions, inter alia, are described with respect to an I execution unit (IL UNIT) in section 13. Interruption handling, and functions which, although not interruptions, are handled by the interruption circuitry, are described in section 14 of said environmental system. The E unit of said environmental system includes a binary portion and a VFL portion, which are referred to in a compound fashion; both the binary and VFL portion are considered part of the E unit, and E unit controls can come from either portion. However, the binary portion is generally not referred to as such, but is referred to merely as the E unit, and the VFL (variable field length) portion is usually referred to as the "VFL." Storage devices are not completely described herein, but the logical control thereover as it relates to the bus control unit is described in section 22.

(5.0) COMPONENT CIRCUITS (FIG. 3 THROUGH FIG. 8)

In FIG. 3 through FIG. 8, component circuits of the type which may be utilized in said environmental system are illustrated. These are not exhaustive, and merely illustrate types of circuits which might be utilized, and the manner in which they are illustrated in the detailed description of said environmental system.

In FIG. 3*a*, a simple latch is shown. This comprises an "AND-OR-INVERTER" combination which includes an OR-INVERT circuit 1 and two AND circuits 2, 3 as well as two inverters 4, 5. In normal operation, whenever the LC line is positive, the inverter 5 will provide a signal *b* to the AND circuit 2 so that a +X signal, whenever it may arrive, will cause the AND circuit 2 to activate the OR-INVERT circuit 1 thereby generating a −Y signal. If the +X signal is removed, then the −Y signal will disappear. The −Y signal causes the inverter 4 to generate the +Y signal which is fed back to an AND circuit 3; however, so long as the −LC pulse is present, the AND circuit 3 will not operate, so that the circuit of FIG. 3*a* is essentially an AND circuit whereby a +X signal and the signal from the inverter 5 pass through the AND circuit 2, becomes inverted in the OR circuit 1, and no latching takes place.

When the LC signal turns positive (at NOT L time) then any +X signal will cause a +Y signal to be gated through the AND circuit 3 thereby causing the circuit of FIG. 3*a* to become latched for the duration of the +LC signal. When the LC signal returns to a negative condition (at L times) then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 3*d*) when the circuit of FIG. 3*a* will have no output whatever. This is of too short a duration to be illustrated in FIG. 3*c* which shows the operation of the latch of FIG. 3*a* in general terms.

The circuit of FIG. 3*a* is illustrated herein as shown in FIG. 3*b*. Thus, the circuit of FIG. 3*a* can be considered to be a latch circuit 6 settable by an AND circuit 7 at NOT L time, to be reset at L time.

In FIG. 4*a* is shown a variation of a latch having a combined reset condition which, as shown in FIG. 4*b* includes X or NOT Y. Notice that the AND circuit 1 in FIG. 4*a* has a minus D signal applied thereto which represents a NOT D as illustrated by the AND circuit 2 in FIG. 4*b*. Also notice that the AND circuit 3 in FIG. 4*a* has both −X and applied Y signals thereto so that the latched effect will be ended by the disappearance of −X or by the disappearance of +Y. This is illustrated as resetting in response to either X or NOT Y by the OR circuit 4 in FIG. 4*b*. A still further complicated latch is illustrated in FIG. 5*a*. This includes an AND-INVERT circuit 1 which passes a signal through an inverter 2 (the output of which then would be positive when the conditions to the AND invert circuit 1 are met) so as to cause an AND circuit 3 to operate when the +AC signal appears. +AC means a positive controlled clock signal having the A time duration. The "C" within "AC" stands for "controlled," in contrast with "running," as is the case when an AR signal is involved. The AR signal would be of the same duration and timing as the AC signal, but could run even through single cycle operations, whereas the AC signal would be stopped during single cycle operations.

The latch of FIG. 5*a* can be reset by the CPU RST signal, or by the raw output of the AND INVERT circuit 1 as applied to an AND circuit 4. The circuit of FIG. 5*a* would be illustrated herein as shown in FIG. 5*b*, wherein an AND circuit 5 will either set or reset the latch in dependence upon whether the conditions are met, due to the assistance of an inverter 6. Notice also that single-input AND circuits such as the AND circuit 7 in FIG. 5*a* actually represent merely an input to the OR INVERT circuit, as illustrated by the direct application of the scan signal to the OR circuit 8 in FIG. 5*b*.

Figure 6B:
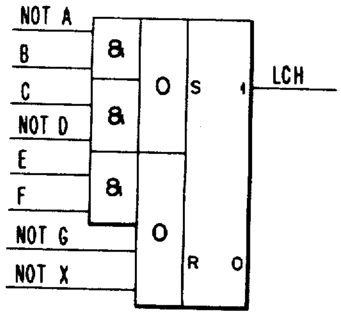

A variation in the circuit of FIG. 5*a* is shown in FIG. 6*a*, wherein a first OR INVERT circuit 1 operates when the latch is in the on condition, and a second OR INVERT circuit 2 operates when the latch is in the reset condition. When the OR circuit 2 operates, it has a negative output, thereby locking an AND circuit 3. However, a negative output from the OR circuit 2 does not preclude an output from the latch inasmuch as either one of two AND circuits 4, 5 could supply an input to the OR circuit 1. If either of the AND circuits 4, 5 do operate, then there will be a minus signal out of the OR circuit 1 which will block a single-input AND circuit 6 at the input to the OR circuit 2 so that the OR circuit 2 will normally have no output unless inputs are applied to either an AND circuit 7 or a single input AND circuit 8. With the OR circuit 2 locked, its positive output will be applied to an AND circuit 3, and if there is an X signal at the AND circuit 3, then the latch will remain on even though either of the OR circuits 4, 5 which turn the latch on in the first place no longer has inputs therto. This is illustrated more clearly in the circuit shown in FIG. 6*b*, which represents the manner of illustrating this circuit herein. As seen in FIG. 6*b*, the latch can be turned on by NOT A and B, or by C and NOT D. If turned on, it will latch up provided that E and F are not both present, and provided that G and X are both present. If the latch turns on and becomes latched in an on condition, then the appearance of E and F together or the appearance of NOT G or NOT X will cause the latch to turn off.

In FIG. 7*a*, an AND INVERT circuit with minus inputs is shown to create a +W signal. This is fully equivalent to the circuit of FIG. 7*b* wherein a positive, non-inverting OR circuit responds to positive XYZ signals to generate a positive W signal.

Figure 8B:
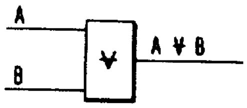

FIG. 8*a* is a simple illustration of a two input EXCLUSIVE OR circuit, which is represented herein as shown in FIG. 8*b*. It should be understood that the EXCLUSIVE OR function with only two inputs is a test for oddness: that is, one and only one input must be present; if no inputs or two inputs are present, then there will be no output. Thus, an odd number of inputs are required. In the embodiment described herein, a term "EXCLUSIVE OR circuit" is utilized to mean a complex of EXCLUSIVE OR circuits which test for oddness and evenness of the inputs thereto. These may be actually manifested in two input EXCLUSIVE OR circuits as shown in FIG. 8*a*, or may be represented with EXCLUSIVE OR circuits actually responding to more inputs. To the extent that more than two inputs are shown, it can be assumed that a three input EXCLUSIVE OR circuit or a two input EXCLUSIVE OR circuit or combinations thereof are utilized in a well-known "tree" fashion so as to fashion so as to provide an EXCLUSIVE OR complex which gives an output whenever the inputs thereto are odd in number.

From the foregoing description, it can be seen that the presence of a plus or a minus signal has no significance in and of itself, due to the way in which a plus or a minus signal may be utilized. For instance, when applied to a +AND circuit of a reset side of a latch as shown in FIG. 6*a*, it may be a NOT signal, as illustrated by the NOT G signal shown in FIG. 6*b*. Similarly, when applied to a resetting AND circuit such as the AND circuit 3 in FIG. 4*a*, a −X signal really becomes an X signal in terms of its logical connotation as illustrated in FIG. 4*b*. Also, the minus signals applied to the circuit of FIG. 7*a* in fact are plus signals when the function of that circuit is considered to be an OR circuit. For that reason, the simplified showing of the present embodiment (such as illustrated in FIGS. 3*b*, 4*b*, 5*b*, 6*b*, 7*b* and 8*b*) do not consider whether a plus or minus signal may be generated at the source of a signal, or whether that signal may be generated in true or complement form, since such considerations have no bearing on the way in which the signal may be utilized. However, at the input to any particular circuit (such as the input to FIG. 6*b*) the affirmative or negative function which the signal represents does have logical connotation and is shown. To the extent that a "NOT SIGNAL" is required but not generated, it is implied that one with ordinary skill in the art could obtain the opposite phase thereof from the source of the "SIGNAL." This is illustrated, for instance, in FIGS. 3*a* and 3*b* where both phases are generated in 3*a*, and only the affirmative phase is generated in 3*b*, the complement thereto being implied.

(6.0) BASIC BUS CONTROL UNIT

The BCU (bus control unit) acts as a buffering traffic control for data, address, control, and checking signals between the storage devices and the reset of the system. In this embodiment, the CPU (including the I unit, the IE unit, the BE unit, and the E unit) is considered to be a single device with respect to the accessing of storage, and it must share storage with the channels. Each of the I/O channels 1–6 has a priority rating corresponding to its number (1–6), and the MC (maintenance channel, including panel keys and panel indicators) comprises a seventh, lowest-priority channel for storage reference purpose. In accessing storage, priority is determined as between channels, and then priority is determined between the selected channel and the CPU. Stated alternatively, the CPU may reference storage unless it is prevented from doing so by a prior outstanding request for an available storage device initiated from one of the channels; which one of the channels will be permitted to reference storage is determined independently by a channel priority circuit. For purposes of completeness and simplicity, the embodiment of a bus control unit described in this section does not include provisions for handling a large capacity storage, nor for the sharing of a single storage device by more than one data processing system. The BCU comprises three general portions, shown in FIG. 9, FIG. 10 and FIG. 11, and described in Sections 7.1, 7.2 and 7.3, respectively of previously referred to application Ser. No. 609,238.

(6.1) SELECTION CIRCUITS

Figure 9:
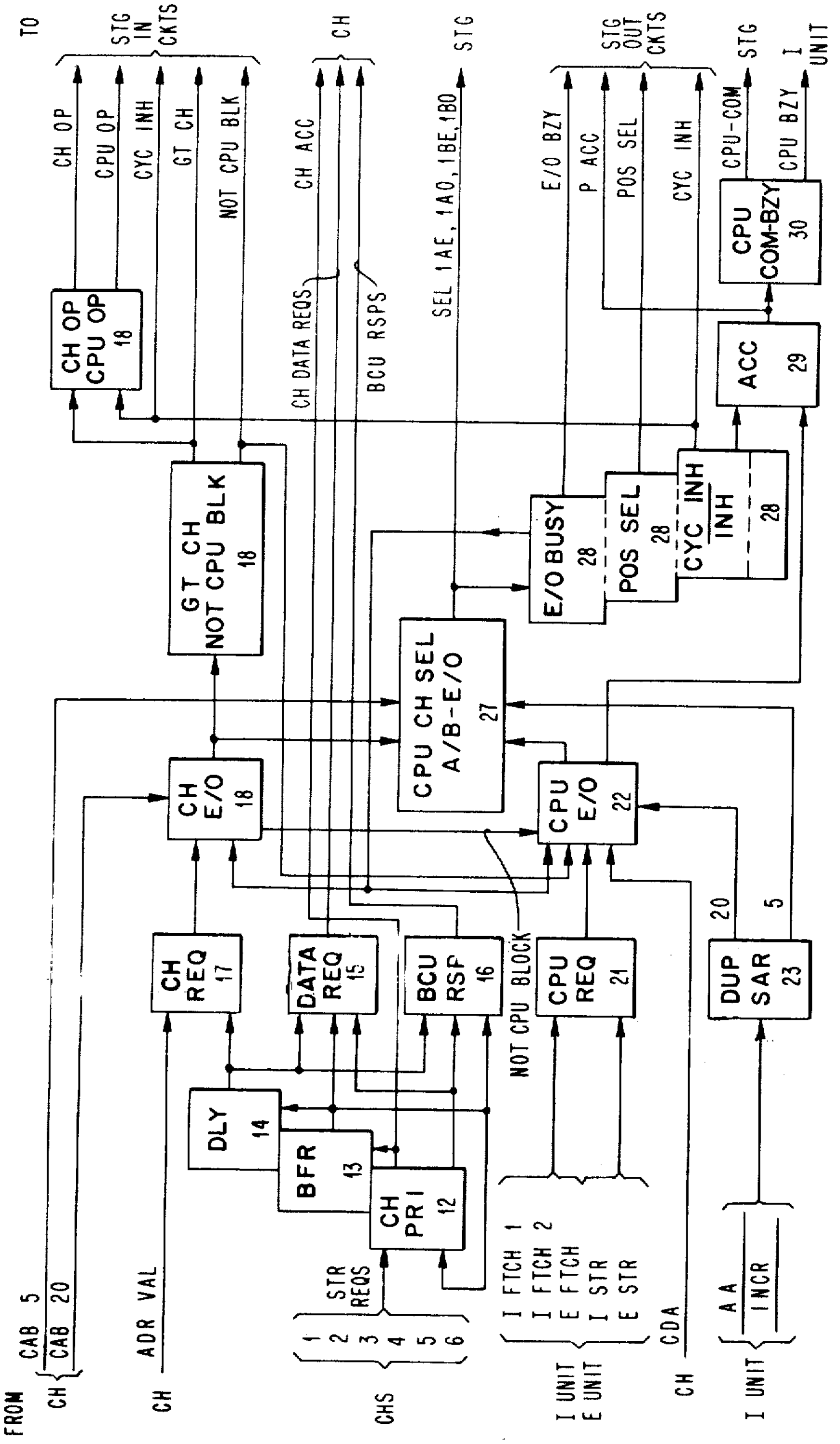

FIG. 9 is a simplified functional block diagram of the selection circuits in which all of the blocks represent figures where circuit details are shown, and the blocks are referred to by figure number rather than by an arbitrary reference numeral. For instance, in the extreme upper left hand corner of FIG. 9, a CH PRI (channel priority) circuit is shown in detail in FIG. 12 (described hereinafter), and the circuit is referred to in the description of FIG. 9 as the "channel priority circuit, FIG. 12." Although not all interconnecting lines are shown in FIG. 9, the main control, data and address lines of the selection circuits are all shown.

(*6.1.1*) *Channel priority* (*FIG. 9*)

Figure 12:
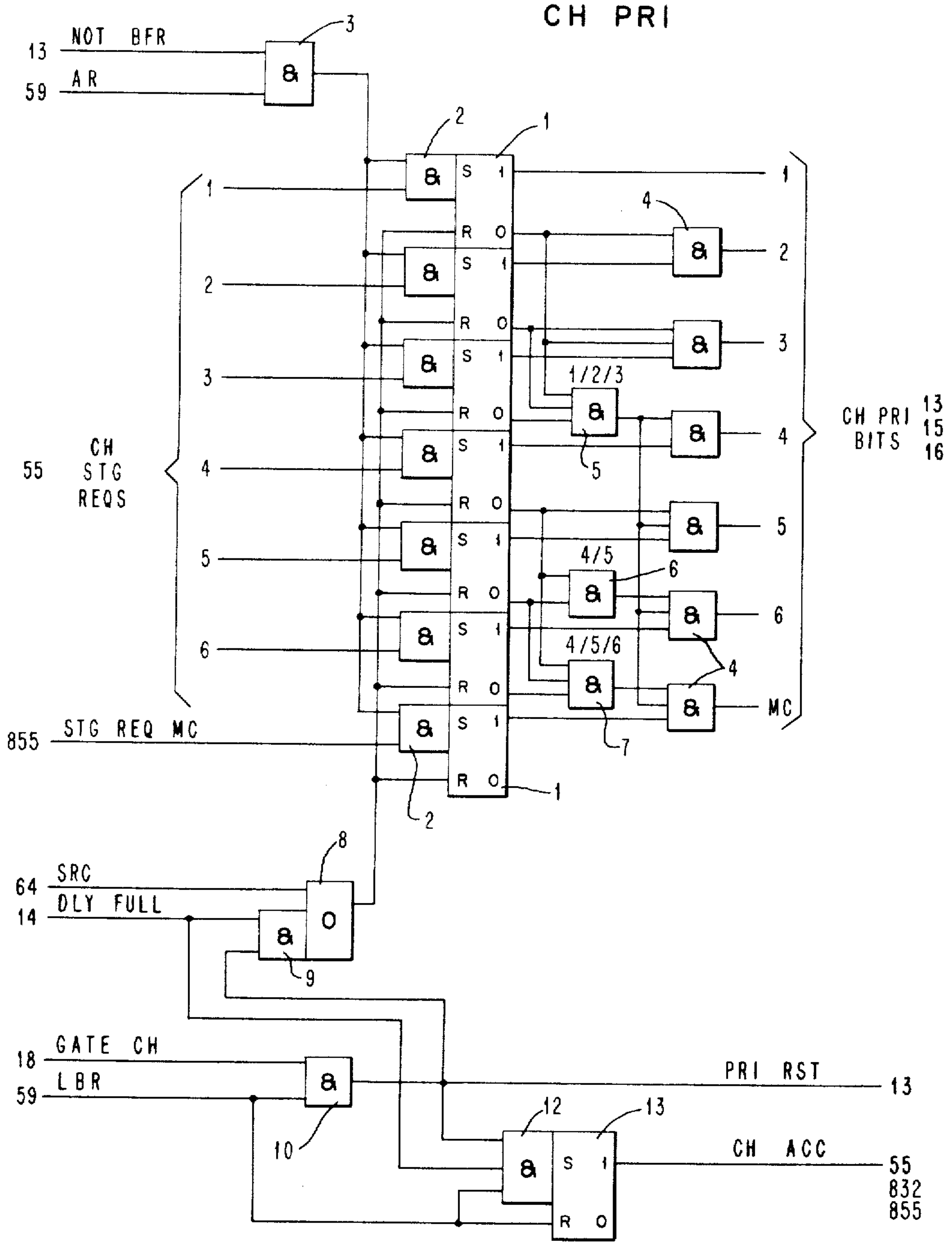
Figure 13:
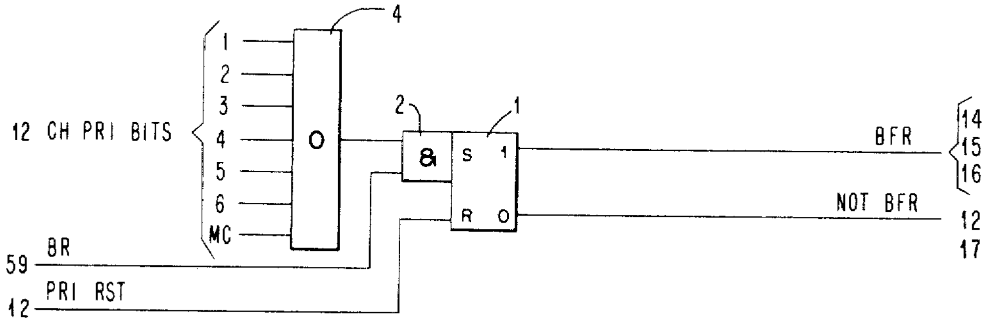
Figures 14, 15:
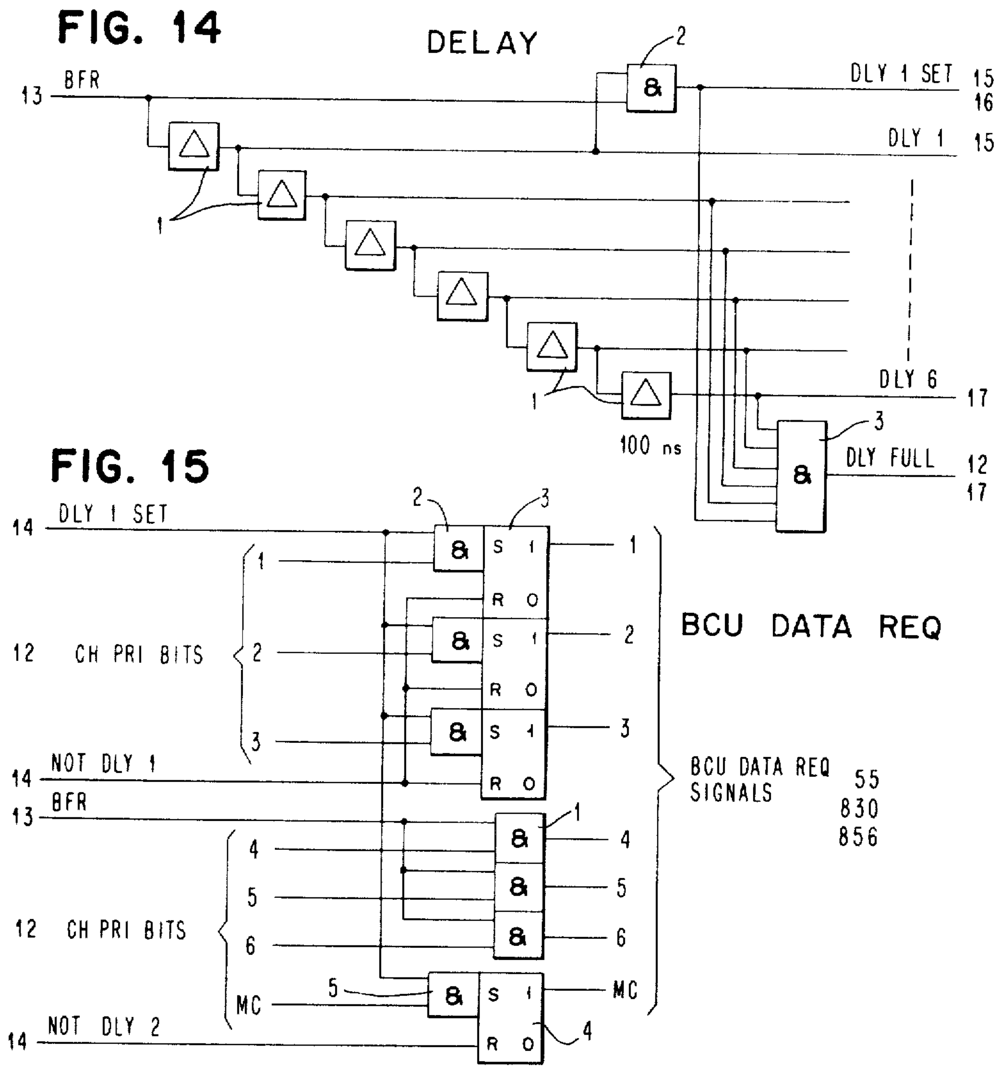
Figure 16:
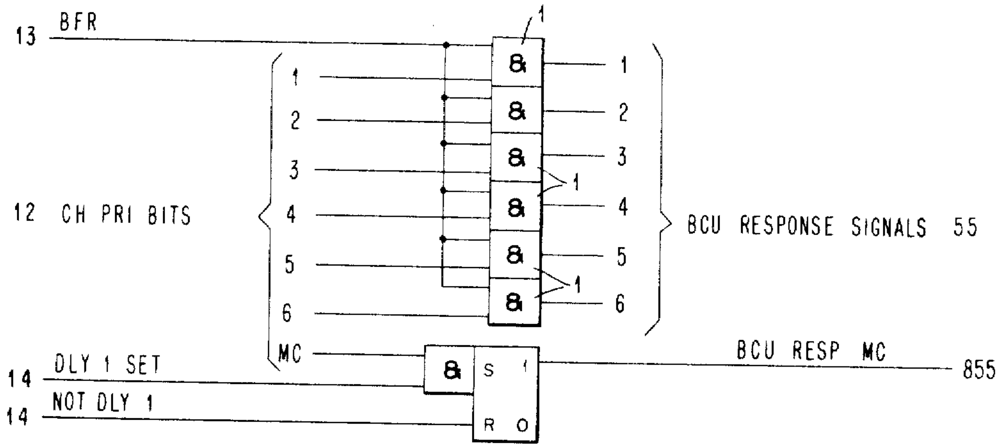

In the upper left-hand corner of FIG. 9 are shown the circuits which determine priority as between channels, including the channel priority circuit, FIG. 12, the buffer circuit, FIG. 13, the delay circuit, FIG. 14, the BCU data request circuit, FIG. 15, and the BCU response circuit FIG. 16.

The channel priority circuit, FIG. 12 (CH PRI), assigns priority to the channels, channel 1 being first, channel 6 being next to last, and the maintenance channel having lowest priority. All the circuit does, is lock out any channel of lower priority once it has selected a channel of a given priority; selection of the particular channel is complete when a buffer circuit (BFR), FIG. 13 (which is a trigger) turns on, in response to there being a request for storage reference from a channel; in turning on, the buffer blocks further channel storage requests. Once the buffer is turned on, it will start a delay circuit (DLY), FIG. 14, which provides signals at different times to control the timing of the channel priority circuits. The output of the channel priority circuit, FIG. 12, the buffer circuit, FIG. 13, and the delay circuit, FIG. 14 are each fed to a BCU data request circuit (DATA REQ), FIG. 15, and a BCU response circuit (BCU RSP), FIG. 16. Each of these circuits sends a corresponding signal back to the respective channel (the selected channel) to request data and one address from the channel; a signal on the the CH ACC (channel accept) line indicating to the channel that the storage request from the channel has been honored. The data request signal and BCU response signal are identical except for timing.

In the BCU, it is desirable to reset the priority circuits as soon as possible so that the priority circuits will be available to do the initial contact work with a channel making a subsequent request currently being handled. However, it cannot be reset so soon as to preclude receiving address and data information from the channel which has just made a request. Therefore, a time is picked which is sufficiently early enough to permit the next channel to make a request as soon as possible, but which will cause the communication of the resetting of the priority circuit back to the channel to be sufficiently late so that, by the time the channel received this communication, its data and address information will have been accepted at the BCU and be participating in an actual storage access. The timing of this is controlled by when the BCU RSP and BCU DATA REQ are sent to the channel, the timing of the reset itself being fixed with respect to the turning on of the buffer. Inasmuch as the response to each of these channels can be controlled with sufficient precision by utilizing the various outputs of the delay circuit (FIG. 14), the reseting of the priority circuit can be done in a fixed fashion without regard to the particular channel which has been accepted for a storage reference. This simplifies the priority resetting circuit.

The significance of the interrelation of the selection circuits, and features of importance with respect various component circuits thereof are discussed in detail in Section 7.1.19, which follows the detailed introduction to each of the circuits.

(*6.1.1.1*) *Channel Priority circuit* (*FIG. 12*)

The channel priority circuit, FIG. 12, comprises essentially a plurality of latches 1, each settable by a corresponding AND circuit 2 in response to a setting signal from an AND circuit 3 which is operated by a signal on the NOT BFR line from FIG. 13 (indicating the buffer trigger is not SET), and by a running A clock (AR) from the I unit. A channel storage request can therefore be set into one of the latches 1 at A time following the presence of a signal on a corresponding channel storage request line provided the buffer has not yet been set. It is the setting of the buffer therefore that controls the admissibility of requests, and that therefore establishes the point in time when priority has been established. The output of the latches comprise tentative channel priority bits, channel 1 being automatically recognized (if its latch is SET) as the channel for which priority has been granted, due to the fact that there is no AND circuit in the output of the latch. However, each of the latches corresponding to the channels 2 through MC has an AND circuit 4 which is blocked by the setting of any latch corresponding to a channel of higher priority. For instance, the output of the latch corresponding to channel 4 will be blocked by the related AND circuit 4 unless an AND circuit 5 provides a gating signal in response to the out-of-phase outputs (0) of the latches corresponding to channels 1, 2 and 3; in other words, in the event that any of the channels 1, 2 or 3 has set its latch, then the output of the latch for channel 4 will be blocked by a lack of a signal from the AND circuit 5. Similarly, another AND circuit 6 together with the output from the AND circuit 5 controls the gating of the output of the latch corresponding to channel 6.

Figure 18:
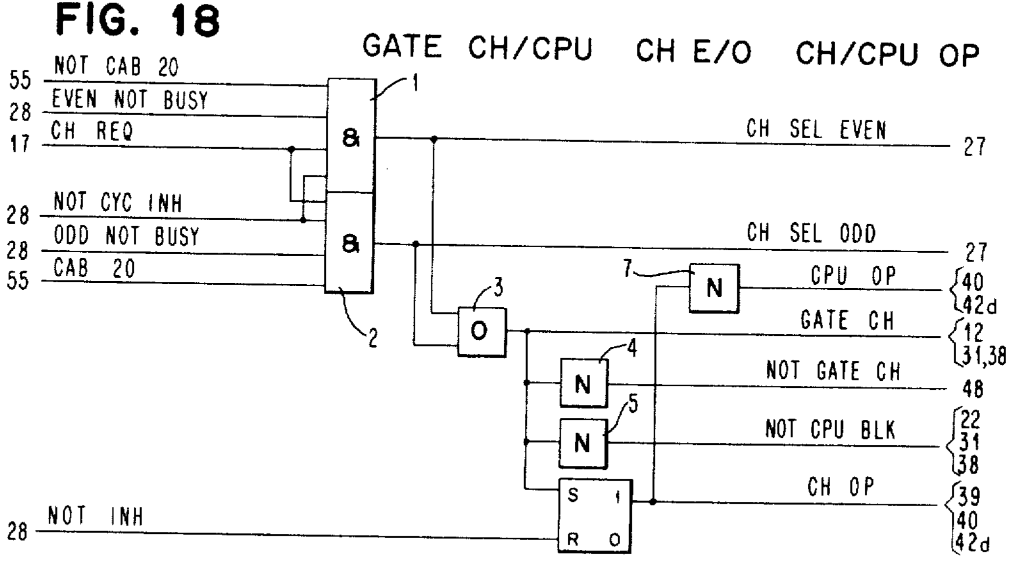

Each of the latches 1 is reset by an OR circuit 8 which will operate in response to the system reset control (SRC) from the CPU or in response to an AND circuit 9 which, due to a further AND circuit 10, will operate in response to a signal on the DLY FULL line from FIG. 14 during a late B running clock signal (LBR line) whenever a channel will in fact access storage (during the following cycle) as indicated by a GATE CH gate channel signal on the line from FIG. 18. The output of the AND circuit 10 comprises a priority reset which is also used to reset the BFR circuit of FIG. 13.

The signal on the PRI RST line is also used along with the signal on the DLY FULL line and a late B clock pulse on the LBR line to gate an AND circuit 12 which is used to set a latch 13 which generates a channel accept signal on a CH ACC line, which comprises an indication that a request for storage reference by a channel has been accepted. Notice that this is directly responsive to signal on the GATE CH line, which signal cannot appear until a channel request for even or odd storage has been matched by an available even or odd storage, and a corresponding storage cycle has been initiated. The latch 13 is reset at the start of the next B time due to the application to the reset side of the latch of the signal on the LBR line. Also, the channel accept signal is essentially identical to the reset condition of the channel storage request latches 1 (in FIG. 9) except for the fact that it is latched throughout one cycle.

The outputs of the AND circuits 4 comprise the respective channel priority bits which are utilized in setting the buffer (FIG. 13) and in causing the correct BCU data request or BCU response to be generated in FIG. 15 and FIG. 16, respectively.

Thus the channel priority circuit of FIG. 12 will be set at A time provided it has not previously been set so as to activate the buffer of FIG. 13, and will remain set until late B time in some cycle which follows the presence of a signal on the DLY FULL line from FIG. 14; when GATE CH will appear depends on when a correct storage unit becomes available, up to five machine cycles (1 μs.) later (see Section 6.1.2.2). As can be seen from a timing diagram, FIG. 18, DLY FULL does not appear until about the middle of the fifth cycle of a sequence of cycles in which a storage request has been made for one of the channels. Thus, the latches, when set, will remain set until the BCU response and BCU data request from FIG. 15 and FIG. 16 can be sent to the selected channel; note however, that no other channel request will be honored because the buffer is on until the time when DLY FULL goes off after having reset the latches.

Note that running clocks are used in FIG. 12 since channel priority is not operated by single cycle operation under control of the maintenance panel, but rather whenever single cycle operation should cause a channel response, the priority circuits can respond thereto in a normal fashion.

(*6.1.1.2*) *Buffer circuit* (*FIG. 13*)

The buffer circuit shown in FIG. 13 comprises essentially a trigger 1 which is set by an AND circuit 2 at B time provided there is an output from an OR circuit 4 in response to any one of the channel priority signals 1–MC on the CH PRI BITS lines from the channel priority circuit, FIG. 12.

The buffer will be set within a small fraction of a cycle of the settinng of any of the storage request priority latches in FIG. 12. With the buffer set, no further setting of the latches FIG. 12 can take place, and due to the priority control at the output of those latches, the circuit of FIG. 12 will settle down to pick a particular channel as the channel having priority. The buffer is reset by a signal on the priority reset line from FIG. 12, as described in Section 6.1.2, hereinbefore.

The buffer guarantees sliver-free (definite) operation when a request latch is ony partially set. A storage request signal appearing at the end of an A time could cause a short pulse that might condition the AND circuit 2, FIG. 12; but it might not suffice to fully latch the request latch. Gating for the buffer is developed a quarter cycle after the end of A time. During this quarter cycle interval of time, the request latch would definitely by in a stable state (off or on); therefore, a definite priority would be established.

(*6.1.1.3*) *Delay circuit* (*FIG. 14*)

The delay circuit of FIG. 14 comprises essentially a plurality of delay units 1, each having a delay of approximately 100 ns. which is equal to about one-half of a cycle. Each of these delay units can be of any known type, the function of each being to cause the output of the unit to follow the input of the unit after the half cycle of delay time has expired. In other words, the signal will be present on the DLY 1 line 100 nanoseconds after a signal appears on the BFR line from FIG. 13, and this signal will be present until 100 nanoseconds after the time that the signal is no longer present on the BFR line.

The delay circuit is somewhat unique in the provision of a signal on a DLY 1 SET line in response to an AND circuit 2 which is operative in response to the concurrent presence of a signal on the DLY 1 line and the BFR line. The purpose of the signal on the DLY 1 SET line as to provide a signal which goes on at the time of DLY 1 but goes off as soon as the BFR signal goes off, rather than waiting the delay period after the BFR signal goes off. The DLY 1 SET line is also applied to an AND circuit 3 to assist in generating a signal on a DLY FULL line. The AND circuit 3 is operative in response to the concurrent presence of signals on each of lines DLY 1 SET, and DLY 2 through DLY 6. The outputs of the delay circuit, FIG. 14, are used in FIG. 12, FIG. 15, FIG. 16, and FIG. 17 to control the channel priority circuits in a manner that is described in detail with respect to the various figures.

(*6.1.1.4*) *BCU data request circuit* (*FIG. 15*)

The BCU data request circuit shown in FIG. 15 comprises a gate circuit to cause a selected channel to send data to the BCU. A DATA REQ signal is sent even though the channel may have requested a storage fetch operation to send data to channel, since the BCU does not know at this time whether a store or fetch operation has been requested by the channel. The gating of the data request circuit is somewhat complex, to account for the different timing characteristics of the channels (which result in part from their different locations with respect to the BCU). Specifically, a data request for channel 4–6 is initiated by a corresponding AND circuit 1 as soon as there is a signal on the BFR line from FIG. 13. On the other hand, requests for channel 1–3 and the maintenance channel (MC) are not gated by corresponding AND circuits 2 until a signal appears on the DLY 1 SET line, which signal requires both the BFR signal and the output of the first delay unit to be present. Additionally, data requests for channels 1–3 and the maintenance channel (MC) are lodged in corresponding latches 3 so that the signal will be available for a somewhat longer period of time; because CH 1–3 and MC are so close to BCU it is required to maintain their Data Request signals to insure a sufficient gating pulse will be generated to complete the transfer of store data from channel to the storage unit (via the SBI LTH). Dropping data request (CH *u*–3 and MC) with the turn-off of the BFR would definitely not be a sufficient gating signal for those channels remember—the closer the channel—the faster the reaction between BCU and channel. A second request could in fact be initiated and cause the operation of the signal lines if these latches were not maintained set during this period where a second setting could take place, and a reset immediately thereafter. This prevents an erroneous second setting of the latches which result from the same signal being present from these close-in channels.

The MC channel is reset by the NOT DLY 2 (rather than the NOT DLY 1) because the MC channel is so very close to the BCU within the CPU section of the main frame that the double setting condition is even more critical.

The BCU DATA REQ SIGNALS (1–MC) are sent to the channel where the signals are used to initiate the sending of data on the CH SBI (channel storage bus in), which occurs only if a store operation were initiated by the channel.

(*6.1.1.5*) *BCU response* (*FIG. 16*)

The BCU response circuit shown in FIG. 16 comprises, essentially, a plurality of AND circuits 1 which gate corresponding channel priority bits from FIG. 12 as soon as a signal appears on the BFR line from FIG. 13. On the other hand, the BCU response signal to the MC channel is delayed, it being set 100 nanoseconds later in response to a signal on the DLY 1 SET line, from FIG. 14, and being reset 100 nanoseconds after the disappearance of the BFR signal due to the application of a signal on a NOT DLY 1 line from FIG. 14. Although not shown in FIG. 14, in accordance with the general principals upon which this description is based, it should be understood by those skilled in the art that the NOT DLY 1 line may be generated merely by inverting the DLY 1 line in any well known fashion, and, in many circuit technologies, may be available as an incident to generating DLY 1. In other words, whenever there is a signal on the DLY 1 line in FIG. 14, there will be no signal on the NOT DLY 1 line in FIG. 16, and vice versa, all as is well within the skill of the art.

Summarizing, a BCU RESPONSE SIGNAL is sent almost immediately to each of the channels 1–6, and after a 100 nanosecond delay is sent to the BCU RESP MC channel, in response to corresponding channel priority bits. The BCU response is a signal which indicates to the appropriate channel, that priority has been granted to that channel, and that it may now send address signals and other related signals to the BCU.

(6.1.2) *Channel selection, generally* (*FIG. 9*)

Figure 17:
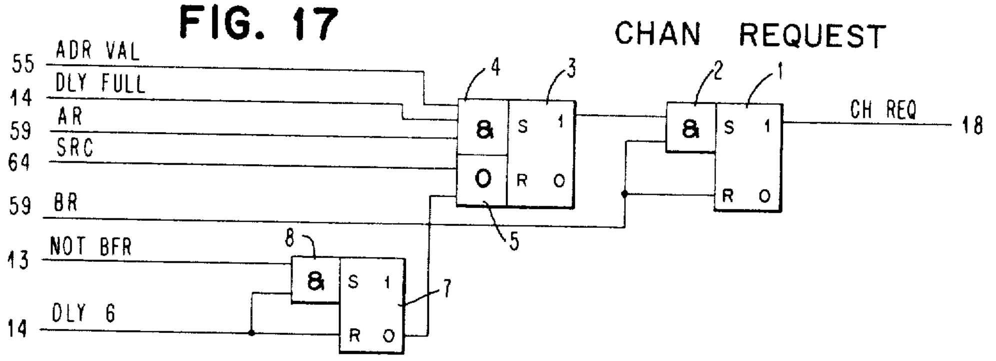

Selection of a channel for communication with a storage unit is achieved by the channel request circuit, FIG. 17, and the channel even/odd circuit FIG. 18 shown in FIG. 9. As described in preceding sections, one channel will be selected in dependence upon the priority of the channels making storage requests; from the particular selected channel, a signal will be received on an ADR VAL (address valid) line in the channel request circuit, and, providing that even or odd storage is not busy (in correspondence with the desire to select an even storage or an odd storage, respectively), a GATE CH signal is generated in response to the selecting of the even or odd storage as shown in FIG. 18 and described in detail in Section 6.1.2.2, hereinafter.

(6.1.2.1) *Channel request circuit* (*FIG. 17*)

The channel request circuit shown in FIG. 17 comprises a latch 1, which when set by an AND circuit 2 will generate a signal on the CH REQ line for use in FIG. 18. The AND circuit 2 in turn responds to a latch 3 which is set by an AND circuit 4 at A time (due to a signal on the AR line) provided there is a signal on the DLY FULL line from FIG. 14 and a signal on an ADR VAL line from the channel. In the embodiment herein described, the signal will never appear on the ADR VAL line until after the DLY FULL signal has already appeared, which means that use of the ADR VAL signal as an input to the AND circuit 4 is redundant. However, if a different channel device were applied to the BCU here being described, it is possible that the delay characteristics of the channel configuration could be such that the DLY FULL signal could be available at a time earlier than when a correct address were being presented to the BCU by the channel; therefore, the ADR VAL signal being applied to the AND circuit 4 renders this BCU more universal in its compatability with channels of various designs. The use of the two latches 1, 3 permits recognizing the time when a channel request can be effective in starting a storage operation even though the ADR VAL signal may come on at differing times (in dependence upon the characteristics of the particular channel to which priority has been assigned). The latch 1 can be set only 100 ns. after latch 3 is set, which means there is no possibility of latch 3 becoming set at the wrong time within a timing signal so as to cause noise or other questionable operation of the various circuits. In other words, by the time the latch 1 can be turned on by the BR clock pulse, latch 3 must have been set nearly 50 nanoseconds earlier, and therefore has had plenty of time to fully establish the set condition (in view of the fact that only approximately 10 nanoseconds are required for a latch to establish a definite steady state).

Figure 19:
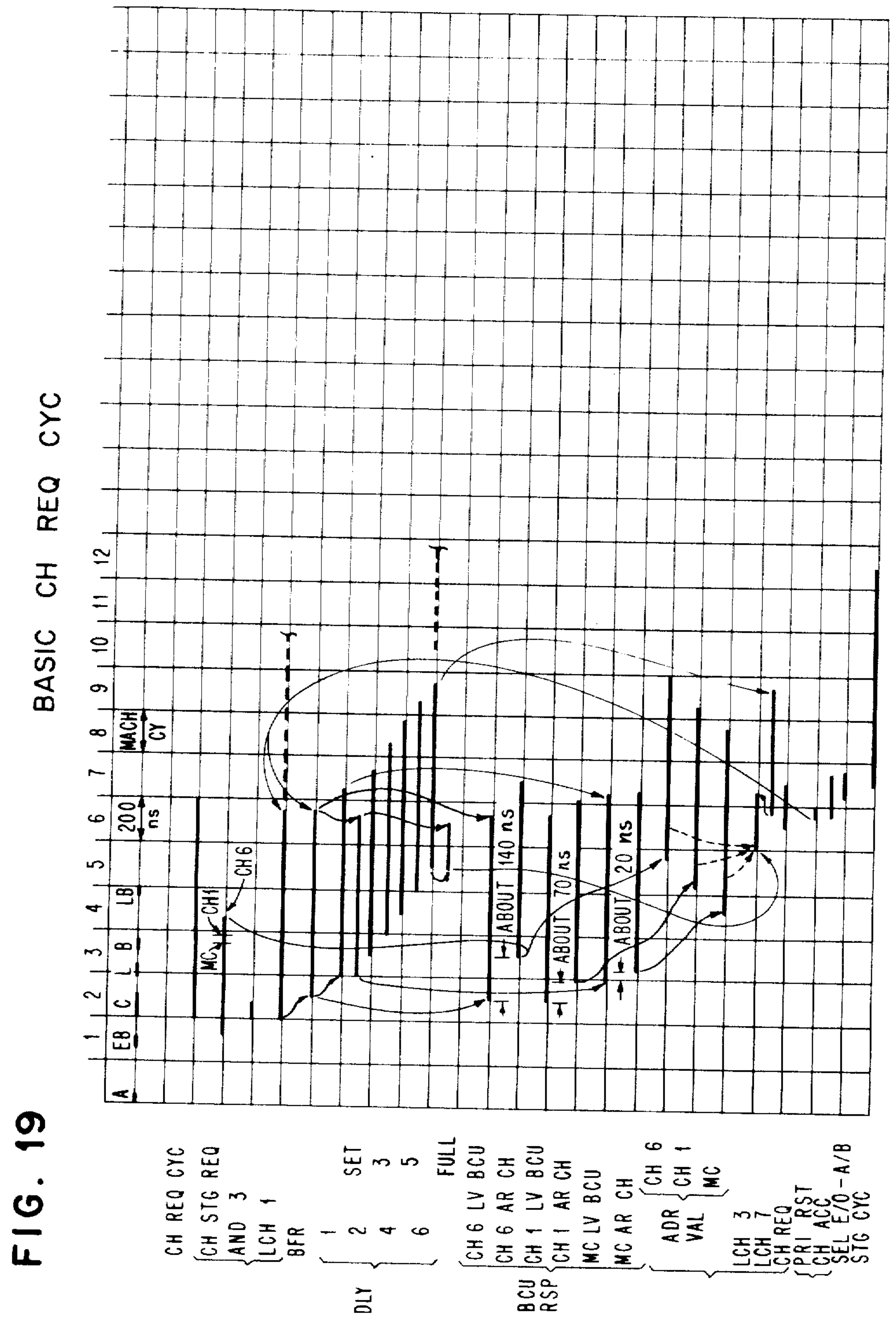
Figure 20:
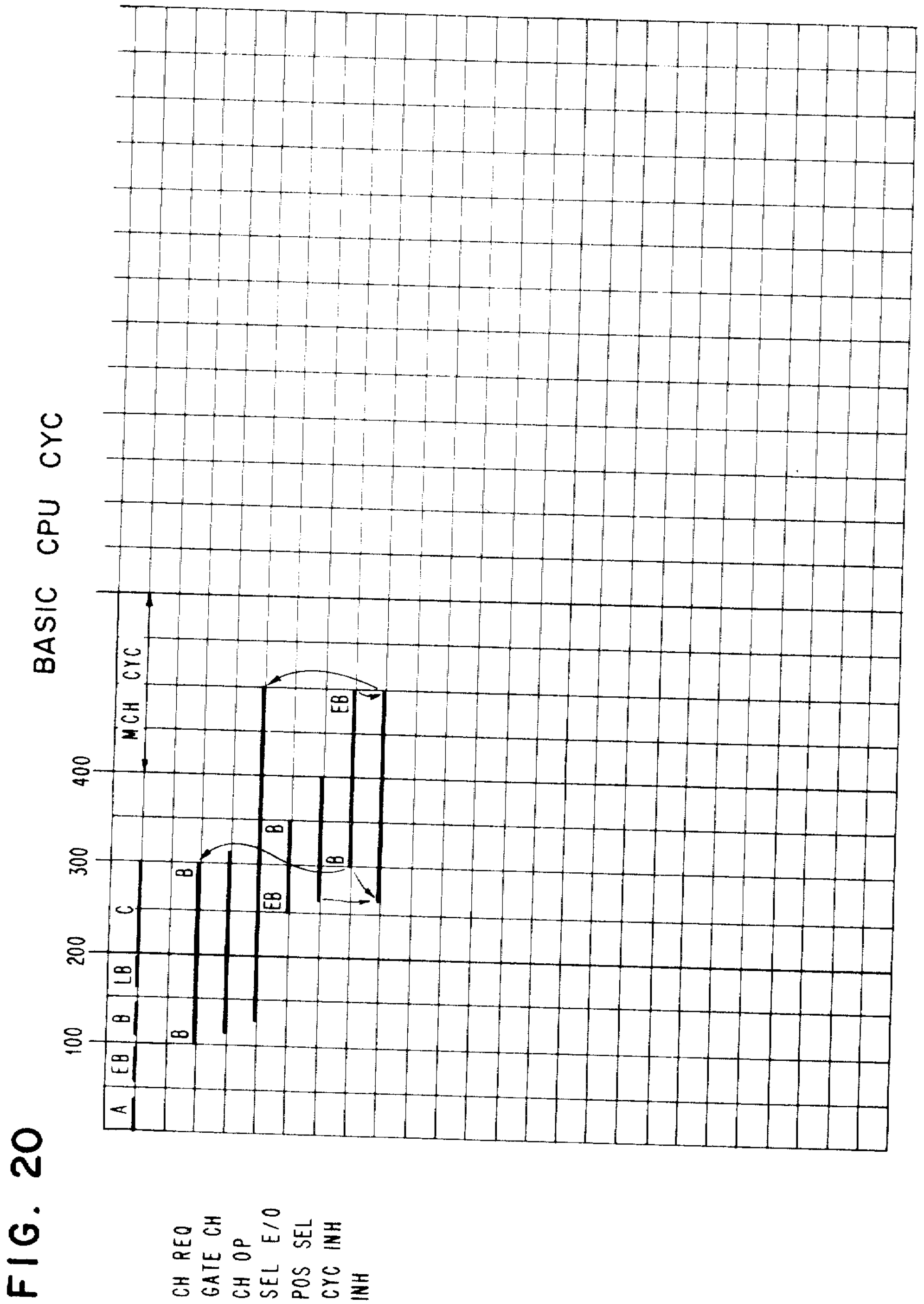

The latch 1 is not only set at B time, but also will be reset at B time. This is another latch of the type wherein the setting condition has a shorter path than the resetting condition, and a tendency to set simultaneously with a tendency to reset will cause the latch to be set. The latch is reset upon the rise of the BR signal, and is set immediately thereafter (about 4 ns.), is set. When the BR signal disappears however, it disappears more quickly from the reset input to the latch than it does from the set input of the latch, due to the fact that an additional logic circuit is in the set path. Thus, the BR signal will be effective at the set input to the latch for a sufficient length of time *after* the loss of the BR signal at the reset input of the latch so as to leave the latch in a set condition, provided the other input to the AND circuit 2 is present. In this manner, the latch 1 is set at the start of B time and remains set until the start of the following B time. This is illustrated in FIG. 19, the channel priority and selection timing diagram.

The latch 3 is reset by an OR circuit 5 in response to the off-side of still another latch 7 which is set by an AND circuit 8 in response to the NOT BFR signal and a signal on the DLY 6 line. In operation, the latch 7 is reset when DLY 6 appears, and will be set (during DLY 6) as soon as NOT BFR appears. This conditions latch 7 to reset the latch 3 until the next NOT BFR time which causes the latch 7 to be set again. (See FIG. 19.) It is to be noted that the clock pulses are RUNNING clock pulses (AR, BR) and the reset signal utilized to reset the latch 3 is a system reset control signal (SRC) indicating that these circuits are allowed to operate by themselves during diagnostic procedures wherein CPU reset controls and single cycling may be effective.

Concerning the ADR VAL signal, it should be noted this signal is received by the BCU from the channel to indicate that the channel has sent to the BCU a valid address and other related signals. The ADR VAL signal is therefore directly caused by the BCU RSP signal sent to the channel, which causes the channel to apply a valid address on the input lines to the BCU. Thus, in the chain of operation, one considers that a storage request from a channel will eventually result in a BCU response, causing the channel to send an address and an address valid signal, which then permits the channel request circuits to recognize a particular channel storage request and initiate the storage selection process.

(6.1.2.2) *Channel even/odd selection* (*FIG. 18*)

The channel even/odd selection circuit, shown in FIG. 18, determines that a valid channel request has been accepted for either an even or an odd storage unit and, when this is so, that the channel, rather than the CPU, is to be gated in various other circuits within the BCU, as indicated by the GATE CH (gate channel). NOT CPU BLK (block), CH OP (operation), and CPU OP, control signals which are utilized in the remainder of the circuits shown in block form in FIG. 9 and FIG. 10.

The channel even/odd circuits control the selection of an even or an odd storage in response to a signal on the CH REQ (request) line from FIG. 17 and a signal on a NOT CYC INH (cyclic inhibit) line from FIG. 28 described in Section 6.1.4.2, hereinafter.

The AND circuit 1 is operative in response to a signal on an EVEN NOT BUSY line which is described in Section 6.1.4.2, hereinafter. However, AND circuit 1 will not be able to respond unless the channel has indicated a desire to reference an even storage unit by virtue of the fact that the address has no bit in bit position 20, as indicated by a signal on a NOT CAB 20 (channel address bus, bit 20). The relationship of bit 20 to the addressing of storage is described in detail in Section 6.2.2, hereinafter, for now it sufficies that, considering the highest ordered address bit to be bit zero and the lowest ordered bit of the address to be bit 23, (0, 1, 2 . . . 22, 23) the storage units herein are not responsive to the lowest 3 bits (bits 21, 22, 23) since these tend to select only a particular fraction of a storage word, called a byte (8 bits); therefore, the lowest ordered bit to which the storage unit themselves are responsive, is bit 20. This bit has merely an even and odd significance; for instance, addressing of storage location 6 would require the same address bits as accessing of storage location 7, with the exception of the fact that bit 20 would be a ZERO if addressing location 6 and bit 20 would be a ONE if addressing location 7. The AND circuit 2 responds in a fashion similar to AND circuit 1 except that is responsive to a signal on the ODD NOT BUSY line (indicating that the odd storage units are available) and a signal on the CAB 20 line (indicating, by a bit in address position 20 of the CAB, that the channel has requested access of an odd storage unit). The outputs of the AND circuits 1, 2 comprise signals on the CH SEL EVEN line and the CH SEL ODD line, which signals are applied to FIG. 27 for purposes to be described in section 6.1.4.2, hereinafter. Each of these signals is also applied to an OR circuit 3 to generate a signal on the GATE CH line, which indicates that the channel (rather than the CPU) is referencing one of the storage devices. In the event that no channel selection has taken place, then an inverter 4 will generate a signal on a NOT GATE CH line, and an inverter 5 will generate a signal on a NOT CPU BLK line. The NOT CPU BLK line is utilized to permit gating of the CPU, and it is so named to emphasize the fact that the CPU will be blocked whenever the channel is selected, and otherwise, the storage units are considered to be available to the CPU. Stated alternatively, one could say that the CPU is presumed to be using the storage selection circuitry unless a channel has affirmatively taken control.

The GATE CH signal is also applied to an OR circuit 6; the OR circuit 6 will generate a signal on a CH OP line in response to the signal on the GATE CH line, or in response to a signal on the NOT INH (inhibit) line from FIG. 28, described in Section 6.1.4.2, hereinafter. The INH signal is present whenever any of the storage units has just been selected or when there is a need to prevent a storage request from being recognized due to the time synchronization in the BCU described in Section 6.1.4.2 (section explaining cyclic inhibit), hereinafter. An inverter 7 will generate a signal on the CPU OP line whenever there is no signal on the CH OP line; note that this is identical to the relationship between the GATE CH line and the NOT CPU BLK line.

Thus, the channel even/odd selection circuit of FIG. 18 will permit a recognized channel to select an even or odd storage unit provided that the even or odd unit, respectively, is not busy, and this is used to indicate that the channel is to be allowed access to the storage units, and the CPU is to be blocked therefrom. The use of these signals is developed more fully in the succeeding portions of this section (Section 7, relating to the basic BCU).

(*6.1.3*) *CPU Selection, Generally* (*FIG. 9*)

Figure 21:
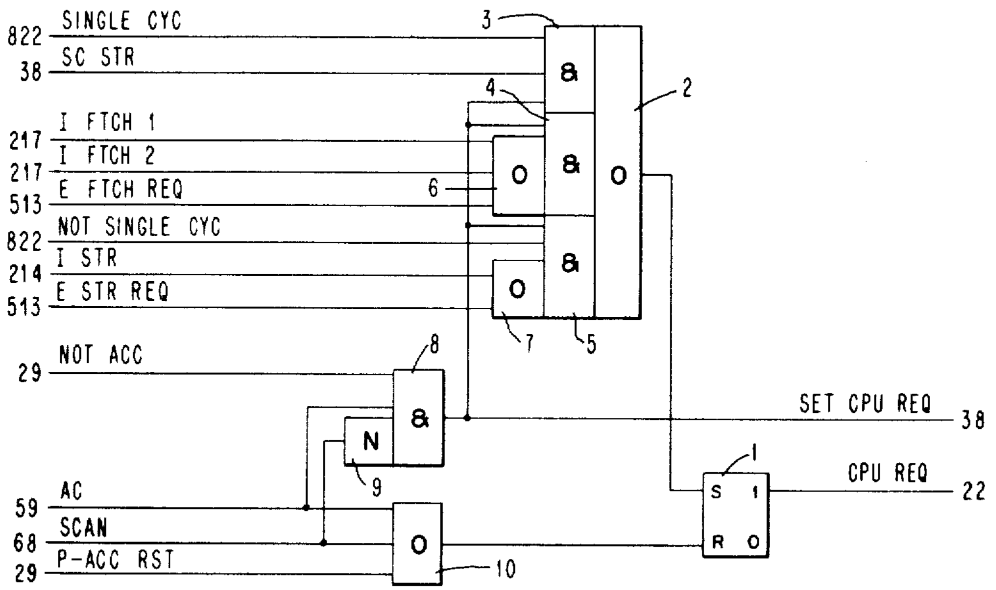
Figure 22:
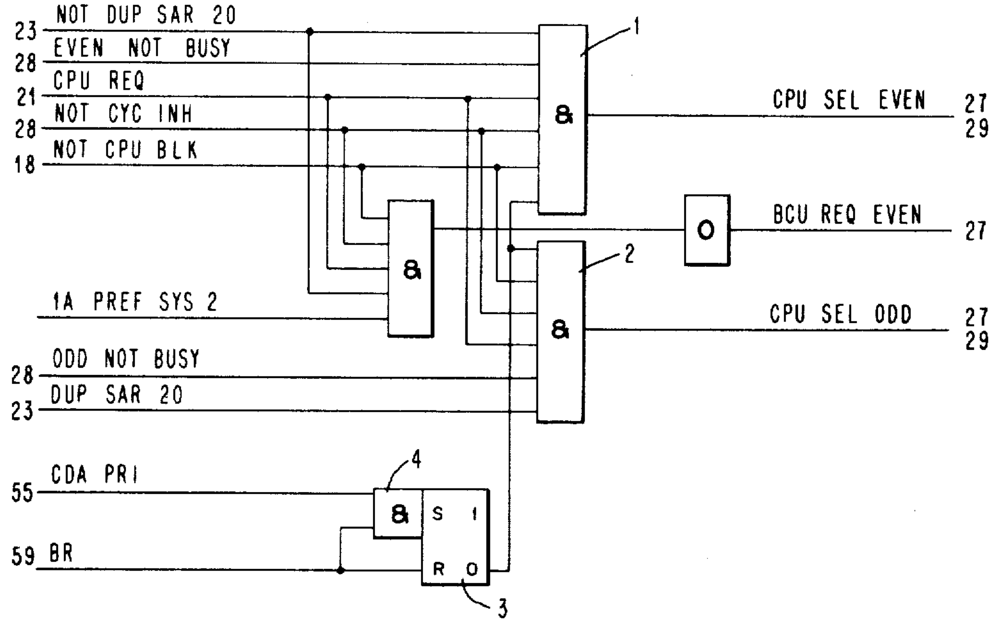

Referring to the block diagram of the selection circuits in FIG. 9, various store and fetch requests from the I unit and the E unit of the CPU will cause a CPU REQ (request) circuit, FIG. 21, to send a CPU request signal to the CPU E/O (even/odd) circuit, FIG. 22. The requesting portion of the CPU requests either an even or an odd storage unit, as indicated by the absence or presence, respectively, of the bit 20 output of the DUP SAR (duplicate storage address register) circuit, FIG. 23. If the corresponding (odd or even) storage unit is not busy, as indicated by the not busy input from the even/odd busy circuit, FIG. 28, then a valid CPU request is generated. However, if a channel request has been recognized by the CH E/O (channel even/odd) circuit, FIG. 18, then the CPU E/O circuit, FIG. 22, is blocked from operating. In other words, the channel selection circuit, FIG. 18, is free to operate notwithstanding the operation of the CPU, provided the correct even or odd storage unit is available; on the other hand, the CPU selection circuit, FIG. 22, is not free to operate whenever there has been a valid selection of storage by the channel.

(*6.1.3.1*) *CPU Request Circuit* (*FIG. 21*)

In FIG. 21, a signal is generated on a CPU REQ line by a latch 1 which is set by an OR circuit 2 in response to any one of three AND circuits 3–5. The AND circuit 3 is operated during single cycle store operations as indicated by a signal on the SINGLE CYC (cycle) line, concurrently with a signal on the SC STR (single cycle store) line. Thus, during single cycle diagnostic operations wherein the CPU is to store data, the AND circuit 3 will initiate a CPU request. The AND circuit 4 is operated by an OR circuit 6 which responds to signals on any one of three CPU fetch lines: I FTCH 1, I FTCH 2, E FITCH REQ. AND circuit 5 is operative, during other than single cycle operations (due to the necessity of a signal on the NOT SINGLE CYC line), to respond to an OR circuit 7 which recognizes requests from the I unit or the E unit to store data, due to the signals on the I STR or E STR REQ lines. Each of the AND circuits 3–5 is gated with a signal on a SET CPU REQ (request) line generated by an AND circuit 8, which is operative at A time (due to a signal on the AC line), provided that a SCAN operation is not being performed (inverter 9), and further provided that no accept condition exists as indicated by the signal on the NOT ACC line. The NOT ACC line indicates that the CPU has not recently been granted access to storage, thus indicating that a CPU request, if honored by the BCU, will not interfere with any other previous CPU request. The development of this signal is discussed in Section 7.1.4.3, hereinafter.

The latch 1 is reset by an OR circuit 10 in response to a signal on the AC line, to a signal on the SCAN line, or to a signal on a P–ACC RST (pulse accept reset) line (which is developed in FIG. 29) and which indicates generally that the need to block further CPU requests has passed, and that the CPU selection circuits are therefore to be prepared for further requests). It is to be noted that the timing control for the CPU REQ circuit of FIG. 21 is an AC (controlled A clock) signal, which means that, during single cycle diagnostic procedure, the CPU REQ circuit can be set or reset only when an active single cycle is generated by an operator.

In summation, a CPU REQ may be instituted by a single cycle storage operation, by any CPU fetch operation, or by CPU store operations other than single cycle. Subsequent requests will be blocked and a current request is cut off when previous requests have set the accept latch, and are reset when the accept latch is reset.

The CPU request latch is gated with NOT ACC primarily for single cycle operations, and also just to be sure, should there be a very long I FETCH or E FETCH or I or E STORE request, that as soon as the request has been honored as is indicated by an accept signal, this will block further passage of this long request through the OR circuit 2 to the latch 1 so that this latch can be reset in a timely fashion. Note particularly that although NOT ACC is used to block the AND circuits 3–5, P–ACC RST is used to reset the circuit since it will be running at all times. Thus in a single cycle operation, as soon as the accept latch is set, a NOT ACC will disappear and block the AND circuits, thus cutting off a long single cycle store request. However, the P–ACC set is controlled by a running clock pulse, and is therefore available throughout single cycle operations, and permits the CPU request latch to be reset when in fact the work has been done.

Referring to the timing diagram of the P–ACC latch and the reset of the CPU request, notice that the CPU request latch will be reset at AC time in the third cycle during a non-single cycle operation since the AC pulse will appear the second time and that each cycle is independent insofar as CPU requests are concerned. For instance, supposing a branch operation took place, the branch location having been fetched and now the branch plus one location is being fetched, but in the meantime it was learned that the branch was not successful and that therefore this was not desired. If the initial request had not been accepted due to busy storage units, then this lack of desire for the branch plus one location will cause a termination of the I FETCH which had requested storage and therefore on the next cycle the latch will not be again set so that it will remain reset, thus avoiding the necessity of taking this redundant storage cycle. Another example of the value of the CPU request reset circuit and set circuit combination is in an interrupt situation. It speeds the handling of the interrupt if a redundant and worthless CPU request which related to the program prior to interrupt is not required; thus, if a request has not been accepted prior to the time that the interrupt is effective, then it will not be accepted in the following cycle due to the fact that the request will have been removed and the latch is reset for a few nanoseconds of time. Therefore, this redundant storage cycle is avoided.

In FIG. 13, a signal, is generated on a CPU SEL (Select) EVEN line by an AN circuit 1, or a signal is generated on a CPU SEL ODD line by the AND circuit 2, alternatively. Both of the AND circuits 1, 2 respond to a signal on the CPU REQ line, to a signal on a NOT CYC INH (not cyclic inhibit) line from a signal on the NOT from a signal on the NOT CDA (CHAINED DATA ACCESS) LINE. The lack of a signal on the NOT CBU BLK line indicates that a channel storage selection has just taken place. The lack of a signal on the NOT CDA line indicates that, although the CPU might normally be able to take the next storage cycle, due to the queing of chained data in a channel, the channel is operating at a high rate of speed, and has need for multiple rapid accesses of storage. The NOT CDA signal is generated by the off-side of a latch 3 which is set by an AND circuit 4 whenever a channel sends a signal on a CDA PRI (priority) line; the latch is set at the end of B time and reset at the start of the following B time. The BR signal is used since continuous control by the channel is required, even though the CPU may be single-cycling.

Figure 28:
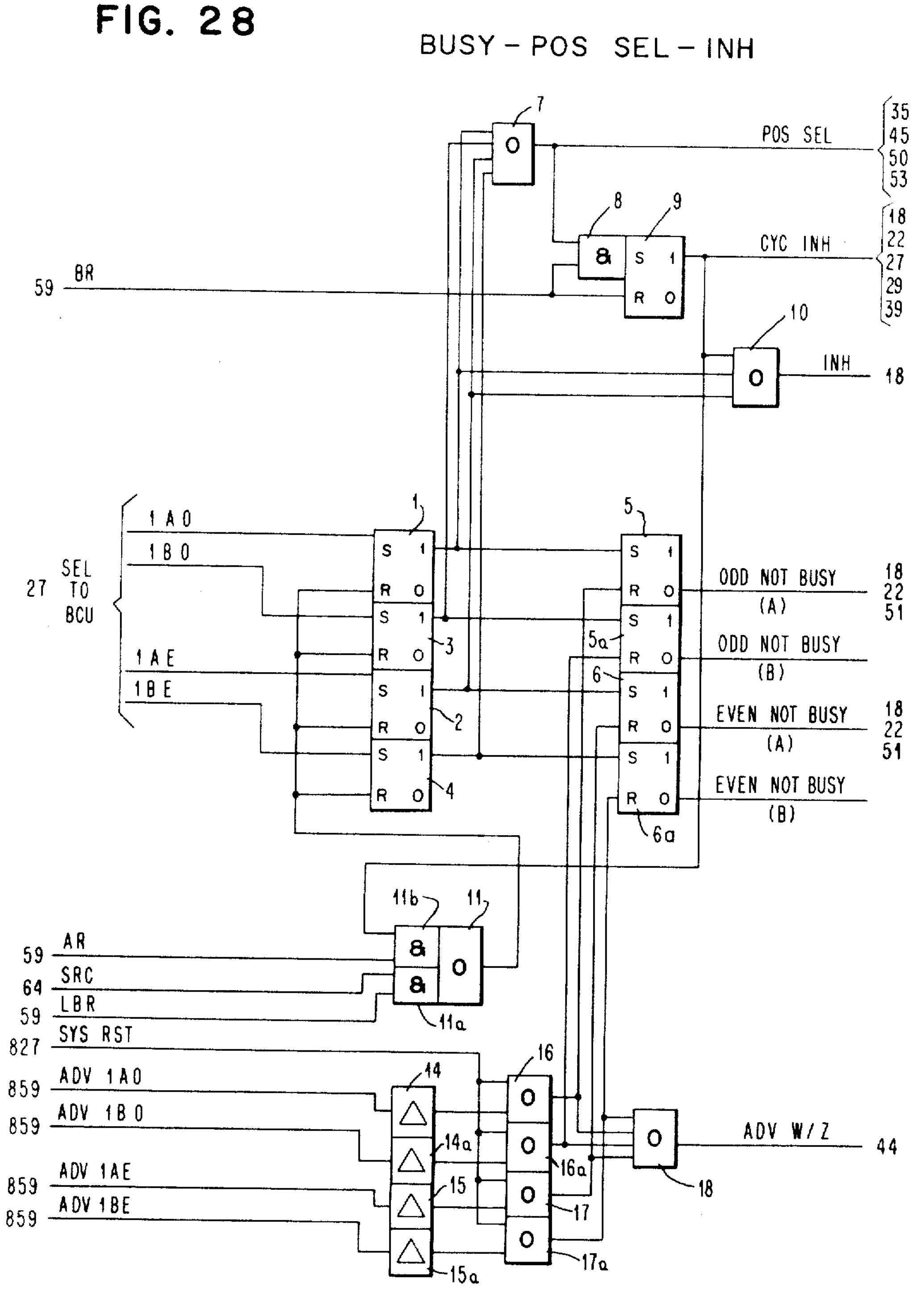

The AND circuit 1 will operate if there is a signal on the NOT DUP SAR 20 line (indicating a ZERO in the bit 20 position of the duplicate storage address register) concurrently with a signal on the EVEN NOT BUSY line from FIG. 28 (the same line which is fed to the AND circuit 1 in FIG. 18). Similarly, the AND circuit 2 will operate if there is a signal on the ODD NOT BUSY line and a signal on the DUP SAR 20 line (indicating a ONE in the bit 20 position of DUP SAR).

In as much as the CH E/O circuit, FIG. 18, controls whether the channel or the CPU will be allowed a storage request, the CPU E/O circuit shown in FIG. 22 is therefore much simpler. Thus, in addition to the CPU REQ and NOT CYC INH inputs to the AND circuit 1 and 2, the CPU E/O circuit of FIG. 22 has other inputs (for which there are no counterpart inputs in the CH E/O circuit of FIG. 18, which relate to the channel usage of the storage circuits.

*(6.1.4) CH CPU Selection Circuits, Generally (FIG. 9)*

Figure 10:
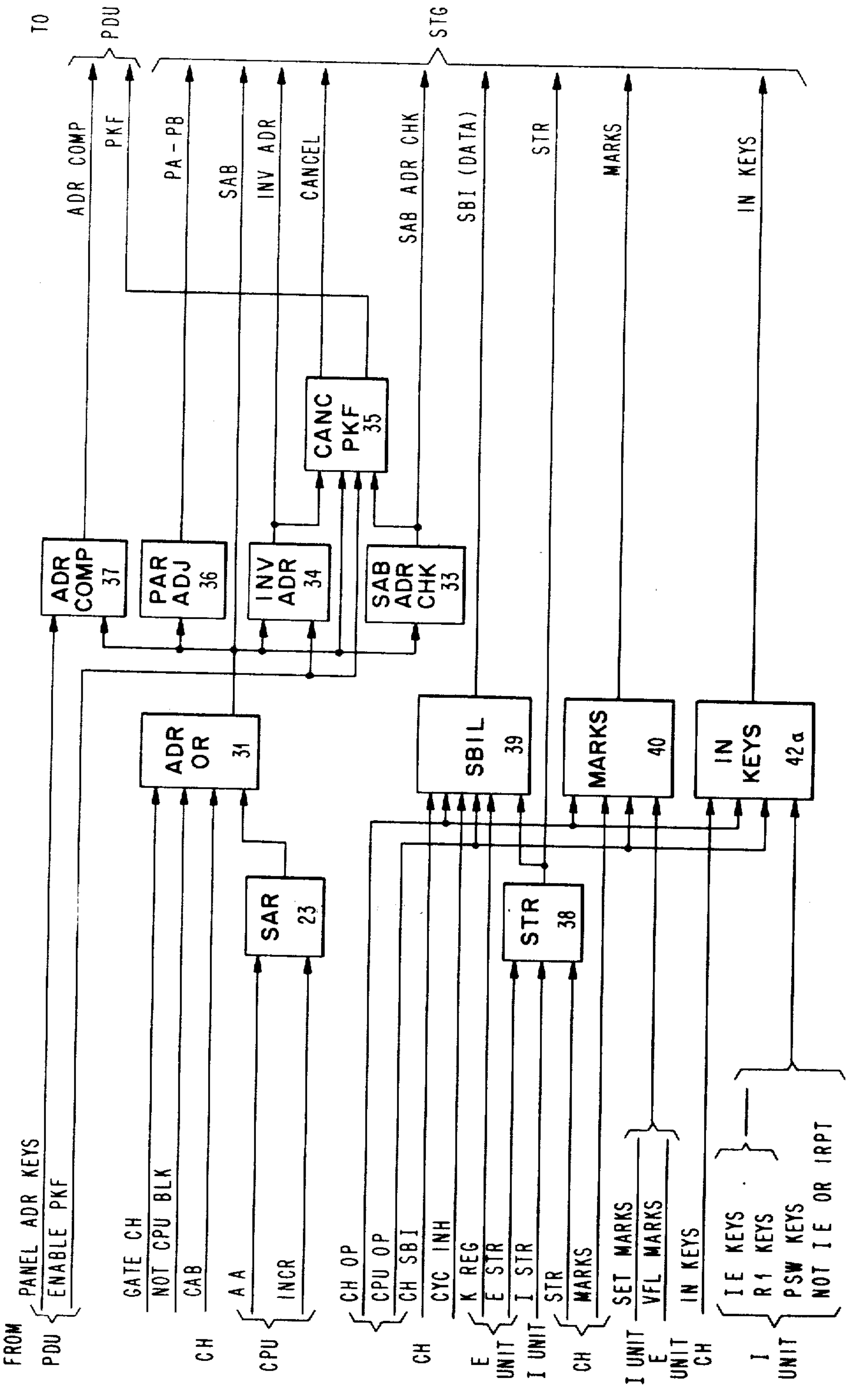
Figure 27:
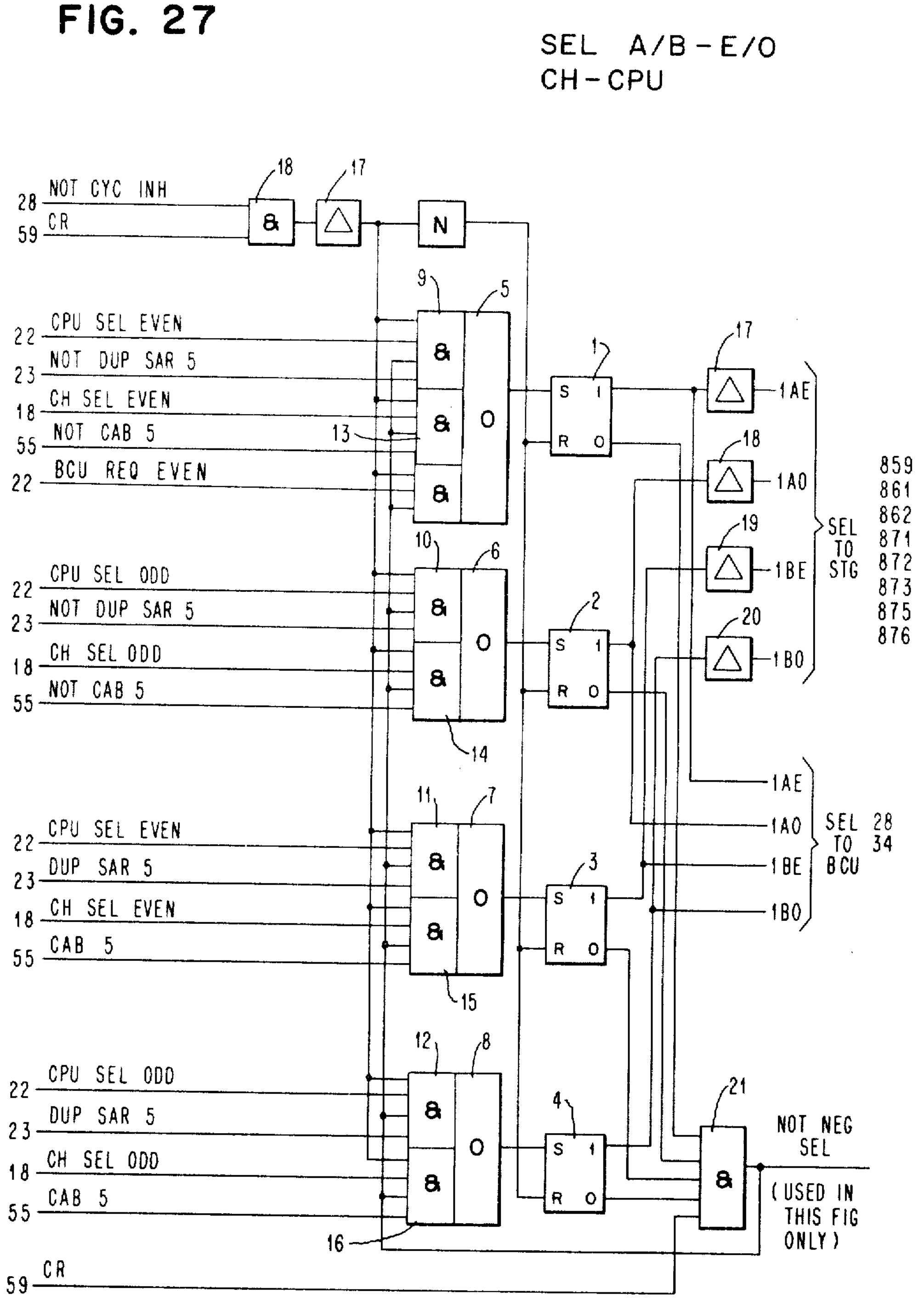

The CH E/O circuit, FIG. 10, and CPU E/O circuit, FIG. 22, each feed the CPU CH SEL A/B E/O circuit, FIG. 27. This circuit responds to some combination of either the channel or the CPU, with even or odd (only one of the 4 possible signals will be available), and matches this with the proper storage address information to determine whether storage 1AE, 1AO, 1BE, or 1BO is to be selected. In the addressing of the storage units, address bit 5 (sixth from highest-ordered) denotes either the lowest address storage frame (the storage frame containing storage units 1A EVEN and 1A ODD) or the high-address storage frame (storage units 1B EVEN and 1B ODD), in dependence upon the absence or presence, respectively, of address bit 5. This is so because bits 6 through 20 are effective to select a particular location from either storage frame, and bit 5 indicates either the low-address or the high-address storage frame; for instance, 16,384 words can be specified by an address comprising fourteen bits, in binary form, the fourteen bits comprising bits 6 through 19; as described hereinbefore, bit 20 permits selecting between the even and odd portion of a storage frame, thereby providing the ability to select any one word out of 32,768 words, the amount which is contained in any one storage frame (storage 1A even and odd, or storage 1B even and odd). By adding an additional, high order binary bit to the address, the number of addressable locations is doubled, granting access to 65,536 words, the amount which is within all four of the storage units within the two storage frames. As used herein, therefore, bit 5 is used to select between the high order frame (1B) and the low ordered frame (1A) as described above. Selection of one of the storage units by the CPU-channel select A/B-even/odd circuit, FIG. 27, will cause either an even or odd busy trigger to be set in the even/odd busy circuit, FIG. 28, which in turn generates a positive select signal in the circuit, FIG. 28; positive select will cause cyclic inhibit and inhibit to be generated in the CYC INH–INH circuit, FIG. 28. The absence of a cyclic inhibit signal together with a CPU select even signal or a CPU select odd signal will cause an accept and a pulse accept signal to be generated in the ACC circuit, FIG. 29; this in turn causes CPU communicate and CPU busy signals to be generated in the CPU COM–BUSY circuit, FIG. 30. Additionally, as before described, the INH circuit, FIG. 28, and the GATE CH circuit, FIG. 18, operate the CH OP/CPU OP circuit, FIG. 18.

*(6.1.4.1) Channel-CPU Selection A/B-even/odd (FIG. 27)*

The storage selection circuit of FIG. 27 comprises a plurality of latches 1–4 which are set by corresponding OR circuits 5–8 each of which is responsive to a corresponding CPU AND circuit 9–12 or a corresponding channel AND circuit 13–16, respectively. Each of the AND circuits 9–16 is gated by the output of a 50 ns. delay unit 17 (at about early B time), in response to an AND circuit 18 responsive to a signal on the NOT CYC INH line from (FIG. 28) concurrently with a C running timing signal on the CR line. Each of the AND circuits must also be gated with a signal on a NOT NEG SEL line (described in this section, hereinafter). Otherwise, each AND circuit 9–16 operates in response to a peculiar combination so as to select one of the storage units, a pair of AND circuits corresponding to each of the OR circuits 5–8 comprising similar inputs for the CPU and for the channel, respectively. For instance, the latch 2 is set by the OR circuit 6 in response to an AND circuit 10 if there is a signal on the CPU SEL ODD line, provided that the low-addressed storage frame is being accessed as indicated by a signal on the NOT DUP SAR 5 line. This will cause accessing of storage unit 1AO. Alternatively, the OR circuit 6 could be operated to access storage. 1AO provided that there is a signal on the CH SEL ODD line and there is a signal on the NOT CAB 5 line (indicating that there is no bit in the sixth bit position of the channel address bus code configuration being presented to the BCU). The remaining ones of the circuits 9–16 operate in a similar, obvious manner, so that either the channel or the CPU will select any one of the four storage units: whether it is to be even or odd being determined by the channel even/odd circuit of FIG. 18 or the CPU even/odd circuit of FIG. 22, and whether it is to be in the low-address frame (storage 1A) or the high-address frame (storage 1B) being determined by bit 5 of the incoming address (either the SAR or the CAB in dependence upon the CPU or the channel, respectively, being granted permission to access storage). The permission to access storage is actually controlled at the channel even/odd circuit, FIG. 18: if the channel does select even or odd, then the CPU is precluded from making a selection. The only thing that could preclude the channel from selecting the even or odd is that the appropriate storage unit (whether selected previously by CPU or by channel) is busy, or that the NOT NEG SEL signal is absent, as described hereinafter. The in-phase outputs of the latches are used directly as select signals within the BCU (in FIG. 28) to generate busy, positive select, and inhibit signals. The select signals are also applied to corresponding delay units 17–20 to generate select signals for actually operating the storage units, the amount of delay in each of the delay units 17–20 being dependent upon the actual physical layout of the respective storage units with respect to the BCU. The out of phase output of each of the latches is fed to an AND circuit 21 which will generate the signal on the NOT NEG SEL line during a CR clock pulse when none of the latches have been set, which fact indicates that there is not a current selection already in progress and that therefore a selection can be made; alternatively speaking, the absence of the signal on the NOT NEG SEL line indicates that the selection circuit is currently busy, and no further request from either the CPU or the channel can be recognized by the circuit of FIG. 27 at that time.

The lack of NOT NEG SEL prevents a circuit race when the CPU REQ latch and CH REQ latch come on in the same cycle and storage is not busy; CPU is gated into FIG. 27. At early B time (delayed CR); and CH SEL is therefore blocked when it comes on at B time. Notice that the timing input to this circuit is a running clock pulse, CR; this is due to the fact that a channel operation may be involved, and as before described, should single cycle operation of the CPU cause channel operation to service the CPU, the channel operation is handled in a normal fashion.

*(6.1.4.2) Busy, positive select and inhibit circuits (FIG. 28)*

The circuit of FIG. 28 centers latches 1, 2, 3, and 4 which are operated by signals on the SEL 1AO or SEL 1BO, SEL 1AE, and SEL 1BE lines, respectively.

*(6.1.4.3) Accept circuit (FIG. 29)*

Figure 29:
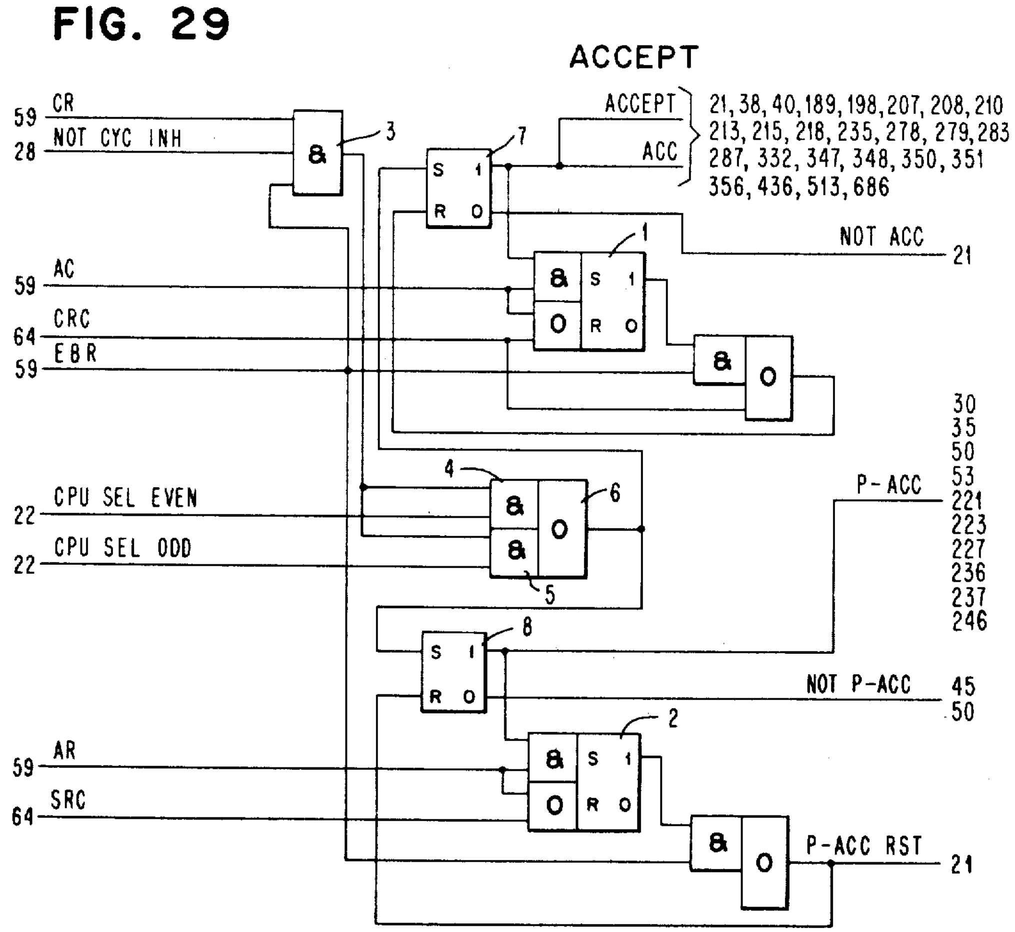

The accept circuit shown in FIG. 29 comprises primarily a pair of latches 1, 2 the circuitry of each being identical to the other with the exception of the fact that circuitry related to latch 1 is operated under the control of a controlled clock pulse AC and the computer reset control CRC, whereas the latch 2 is operated by the running clock pulse AR and the system reset control SRC; both circuits respond to the running early B pulse. Thus, the signal on the accept line reflects single cycle operation and computer reset, whereas the signal on the P–ACC line does not reflect computer resets, but only system resets, and is not aware of single cycle operation due to the use of the running clock pulse.

An AND circuit 3 responds to a signal on the NOT CYC INH line from FIG. 28 at early B time, due to the signal on the EBR line; a CR line is provided to AND circuit 3 to pre-condition the circuit for fast response at early B time. This is done to alleviate any timing problems that could occur if the CPU even/odd circuits have slower response time than expected and therefore would require delaying the early B time. This could cause a slivered accept signal on a cycle in which storage was not selected. The output of the AND circuit 3 is used to gate a pair of AND circuits 4, 5 either of which may operate an OR circuit 6. The AND circuit 4 is operative if there is a signal on the CPU SEL EVEN line, and the AND circuit 5 is operative when there is a signal on the CPU SEL ODD line. The output of the OR circuit 6 will set the latches 7, 8 which correspond respective to latches 1, 2. The output of the latches 7, 8 comprise the accept, and pulse accept signals; the remainder of the circuitry generates only the reset signals for the latches 7, 8. Each of the latches 1, 2 will be set at A time following the setting of the corresponding latch 7, 8 but the output of the latches 1, 2 will not be used until the following early B time. Therefore, each of the latches 7, 8 is reset near the start of early B time next following when the latch was set. It should be noted that the OR circuit 6 which sets the latch 7, 8 will be operated by the AND circuit 3, the critical timing of which is also early B time of one cycle, and then the related latch 1, 2 will be set at the following A time; this in turn causes the respective latch 7, 8 to be reset at the following early B time. The latches 7, 8 are therefore on for approximately one machine cycle (200 manoseconds). The reason for the difference between accept and pulse accept is: during single cycle operation the CPU would not be able to recognize an accept signal that was on for only 200 nsec. (one cycle). Single cycle rate is controlled by a pushbutton. Thousands of storage selections can occur between two successive single cycles, yet the CPU has only made one request. Thus, the BCU resets accept under single cycle control; this retains the fact that the selection has occurred.

*(6.1.4.4) CPU Communicate-busy circuit (FIG. 30)*

Figure 30:
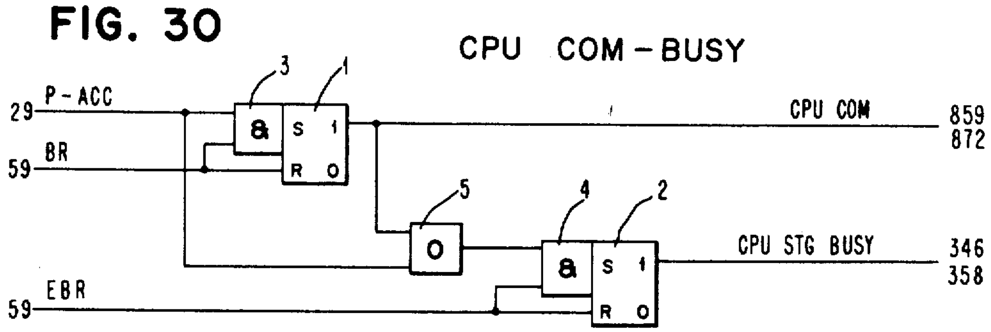
Figure 31:
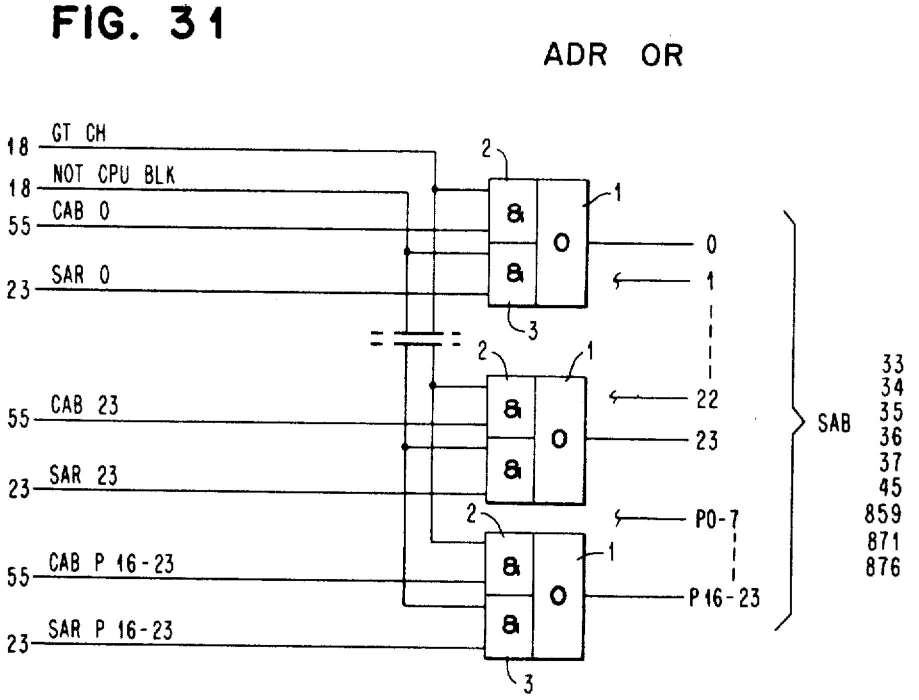

In FIG. 30, a pair of latches 1, 2 are set by corresponding AND circuits 3, 4 to generate signals on a CPU COM (communicate) line and on a CPU STG BUSY (storage busy) line, respectively. The AND circuit 3 is responsive to a signal on a P–ACC line at B time, and the AND circuit 4 responds to an OR circuit 5 so as to be operated by a signal on the P–ACC line at early B time (EBR). The OR circuit 5 is also operated by the signal on the CPU COM line. The purpose of the signals generated in FIG. 30 are to indicate to the storage device that the CPU is the device being serviced, and to indicate to the CPU that it is busy with a storage operation, respectively. The latch 1 is set on the rise of the B clock pulse and remains set until the rise of the following B clock pulse; similarly, the latch 2 is set from the start of early B until the start of the next early B; both latches are set as soon as the P–ACC signal appears. The reason for using the OR circuit 5 in setting the latch 2 is to bring up CPU STG BUSY within the same cycle in which ACC comes on and to maintain CPU STG BUSY one cycle after P–ACC goes off by means of the CPU COM latch 1.

*(6.1.5) Storage address register (FIG. 23)*

Figure 23:
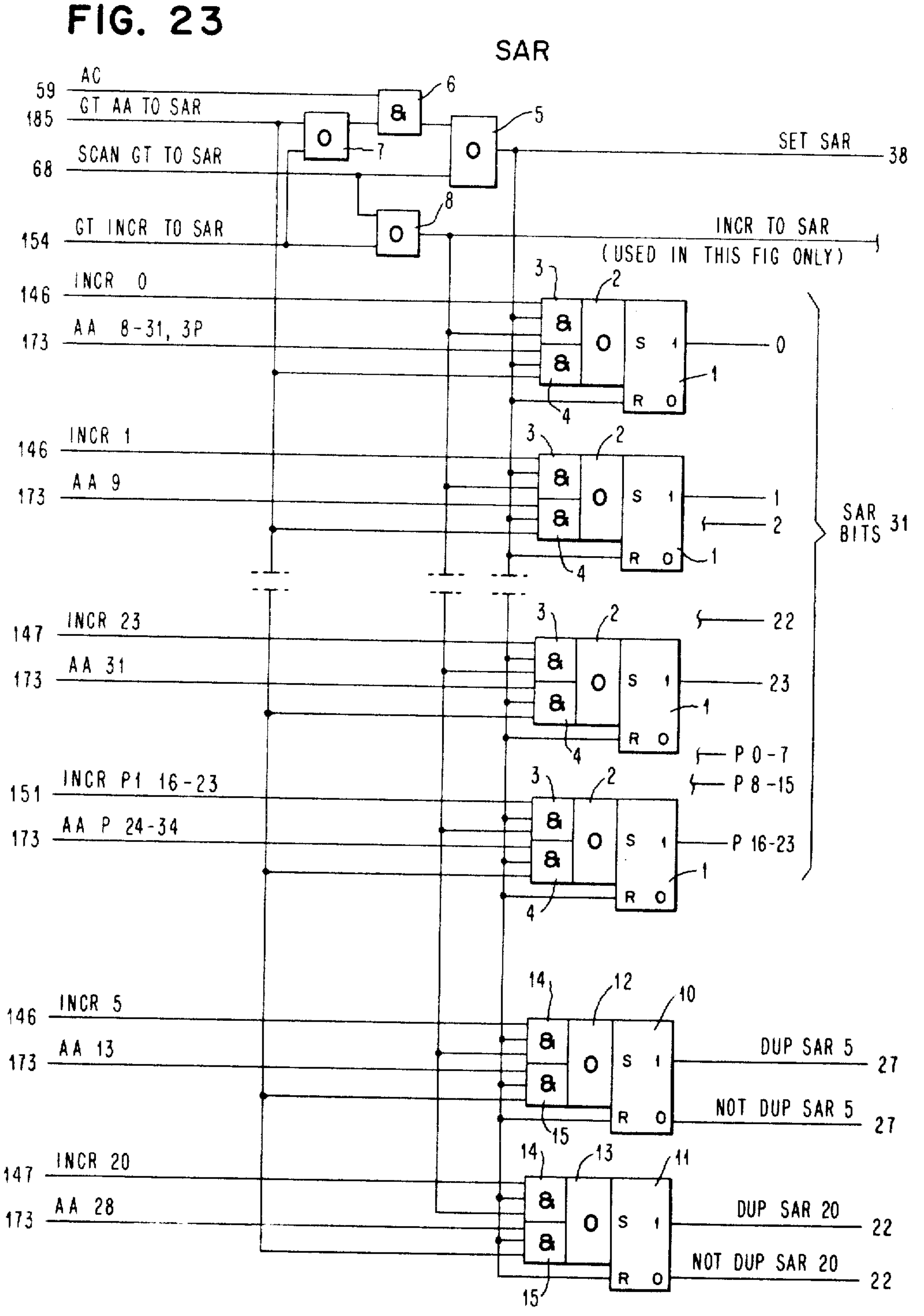

The storage address register shown in FIG. 23 comprises essentially a plurality of latches 1 each of which is set by corresponding OR circuit 2 response to either one of two respective AND circuits 3, 4. Each of the AND circuits 3, 4 responds to a signal on a SET SAR line generated by an OR circuit 5 due to the presence of a signal on a SCAN GT TO SAR line or the output of an AND circuit 6. The AND circuit 6 is operative at A time in response to an OR circuit 7 which in turn responds to a signal on a GT INCR TO SAR line or a signal on a GT AA TO SAR line. Thus, whenever the incrementer or the address adder are to be gated into the storage address register, the AND circuit 6 will cause the AND circuit 5 to do this at A time. On the other hand, the OR circuit 5 will provide a gating signal to SAR whenever the SCAN GT TO SAR line has a signal thereon. The AND circuits 3 are additionally gated by a signal on an INCR TO SAR line from an OR circuit 8 which is responsive to either the SCAN GT TO SAR line or the GT INCR TO SAR line. The AND circuits 4 are responsive to a signal on the GT AA TO SAR line.

Note that the source of bits for SAR are bits 0 through 23 of the INCR (the incrementer) or bits 8 through 31 of the AA (addressing adder). Only the low order 24 bits (bits 8 through 31) of the addressing adder output are required as addresses in this case. (See said illustrative environmental system in which the addressing adder is described for further details as to the bits of the addressing adder which are used to generate storage addresses.) The circuit of FIG. 23 also includes a duplicate storage address register (DUP SAR) which comprises only two latches 10, 11 each set by a corresponding OR circuit 12, 13 in response to a pair of respective AND circuits 14, 15. These circuits 10–15 are identical to the circuits above, and relate only to SAR bits 5 and 20, the OR circuit 14, relating to SAR bit 5, being set by INCR 5, the OR circuit 14, relating to SAR bit 20, being set by INCR 20; the AND circuit 15, relating to SAR bit 5, being set by AA 13; and the AND circuit 15, relating to SAR bit 20, being set by AA 28. The relationship between the AA bits and the INCR bits is the same in the DUP SAR as it is in the SAR, above.

The reason for having SAR and DUP SAR is that in the embodiment herein described, the SAR is physically remote from the DUP SAR (in roughly the same fashion as illustrated with respect to the block diagrams: the SAR appearing in FIG. 10 and the DUP SAR appearing in FIG. 9). As it happens, there is plenty of time to get the input bits to the SAR, but once SAR is set, the timing is rather critical in so far as using SAR bits in FIG. 9, whereby it is preferable to provide these SAR bits directly by means of a DUP SAR so that as soon as they are set therein, they are immediately available without circuit propagation time delays being involved.

(6.1.6) *Summation of selection circuits*

The selection circuits shown in the block diagram of FIG. 9 comprises essentially four portions. In the upper left hand corner, the channel priority circuit, FIG. 12 through FIG. 16 and channel request and selection circuits FIG. 17 and FIG. 18 will recognize a channel (the highest priority channel which has requested a storage reference) and generate a channel select even or odd signal. The second part of the selection circuit includes the CPU request and CPU select even/odd circuits of FIG. 21 and FIG. 22 which recognize fetch and store operations from different parts of the CPU and generate a CPU select even (or odd) signal. The third part of this circuit includes the CPU-channel select (A/B-even/odd circuit, FIG. 27) and its dependent circuit, FIG. 28, which generates even/odd not busy, the positive select, the cyclic inhibit and the inhibit signals. These circuits respond to either a channel or a CPU selection of even or odd to select the proper storage frame (1A or 1B) and then generate signals indicative of the fact that a storage selection has been made. The final portion of FIG. 9 relates only to the CPU and includes the accept circuit of FIG. 29 which recognizes that a CPU selection has been made, and the CPU communicate and busy circuits which are merely timing.

Concerning CH/CPU switching—Referring to FIG. 19 the gate channel signal is latched and remains latched until there is a signal on the NOT INH line to generate the channel OP signal. Inhibit is essentially cyclic inhibit which has been speeded up by adding positive select to it. Stated otherwise, it is POS SELECT held up longer with cyclic inhibit.

The purpose of INH is to have it available to the CH OP latch (by *not* having the NOT INH) just prior to the time that CYC INH appears to block the channel select even/odd inputs (AND circuits 9–16, FIG. 27). Thus INH controls the latch which generates CH OP and thereby permits the CH OP to be available for gating purposes later than GATE CH is available.

A storage cycle begins at B time in every case. When initiated by a channel, the storage cycle begins one machine cycle after the CH REQ latch (FIG. 18) is set; when the result of a CPU REQ latch, the storage cycle begins less than half a machine cycle after the CPU REQ latch is set. This means that there is more time in a channel-initiated sequence than there is in a CPU-initiated sequence, for switching all the circuits (see FIG. 9–FIG. 11) from channel to CPU, or vice versa; therefore, the CPU is always gated in the absence of a recognized channel request. Whenever the CH REQ latch is set, it then switches all required circuits from the CPU to the channel. The time for this switching therefore falls within a channel selection operation rather than within the shorter CPU selection operation.

Figure 24:
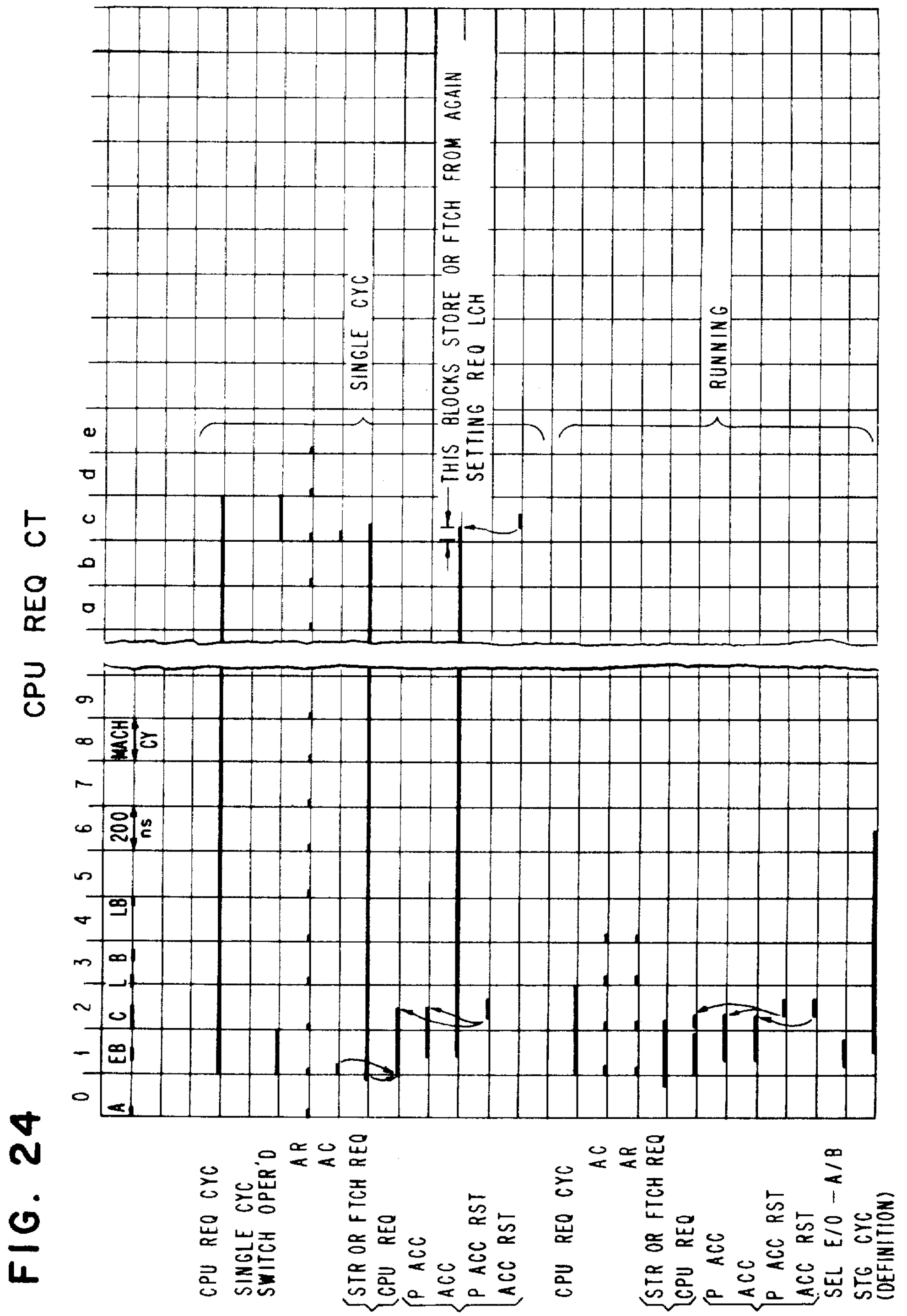
Figure 25:
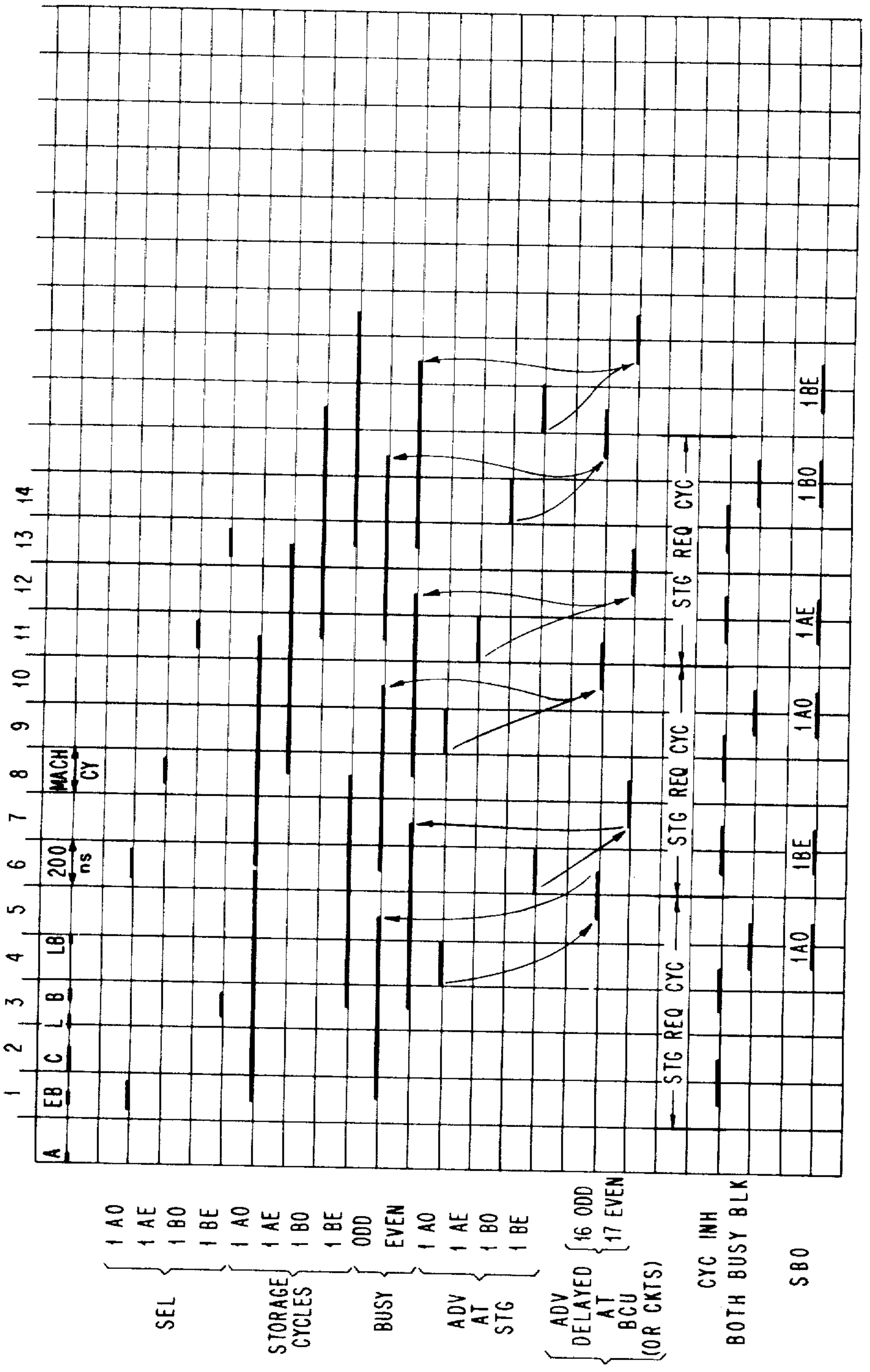

In FIG. 24, two types of CPU request are illustrated. In the upper part of the figure, a request cycle made during single cycle operations (maintenance type operations wherein the operator depresses a key each time that an additional 200 ns. machine cycle is to occur. Due to the relationship of the ACC (accept) and the P–ACC (pulse accept) circuitry of FIG. 29 (which controls the basic CPU request cycle as illustrated in FIG. 24), a CPU request cycle requires two A controlled clock pulses, one to set the cycle and one to reset it; this is due to the fact that the CPU request latch (FIG. 21) is both gated (through the ANDs 3—5 and the OR 2) and reset (through the OR 10) in response to an AND circuit 8 which requires a controlled A clock pulse on an AC line. In the upper part of FIG. 24, it is assumed that a single cycle operation is taking place. Each time that a single cycle switch is operated there will be one AC pulse. Therefore, a CPU request cycle during single cycle operations will take up to several seconds to be completed. Contrarywise, during normal operations when the machine is running, there will be an AC signal during each machine cycle and therefore the CPU request cycle requires only two machine cycle (400 ns.)

One of the features of the present invention is the ability of the CPU request latch to avoid taking useless storage cycles when a branch or an interrupt causes a change in the operation of the machine such that a particular storage access is no longer needed (as indicated by the loss of an I FTCH 1, E STORE, or other input to FIG. 21). The CPU request latch is set and reset by an A controlled clock pulse. This is due to the fact that there is a longer circuit path to the set input from the AC signal than there is to the reset input; thus, when the AC signal first appears it will reset the latch, and there will be a blocking of the inputs for a span of one or two nanoseconds sufficiently to let the latch reset. After that, as soon as the circuit delays are used up, the inputs will again be gated to the latch and the setting will take precedence over the resetting so the latch will again become set.

Figure 26:
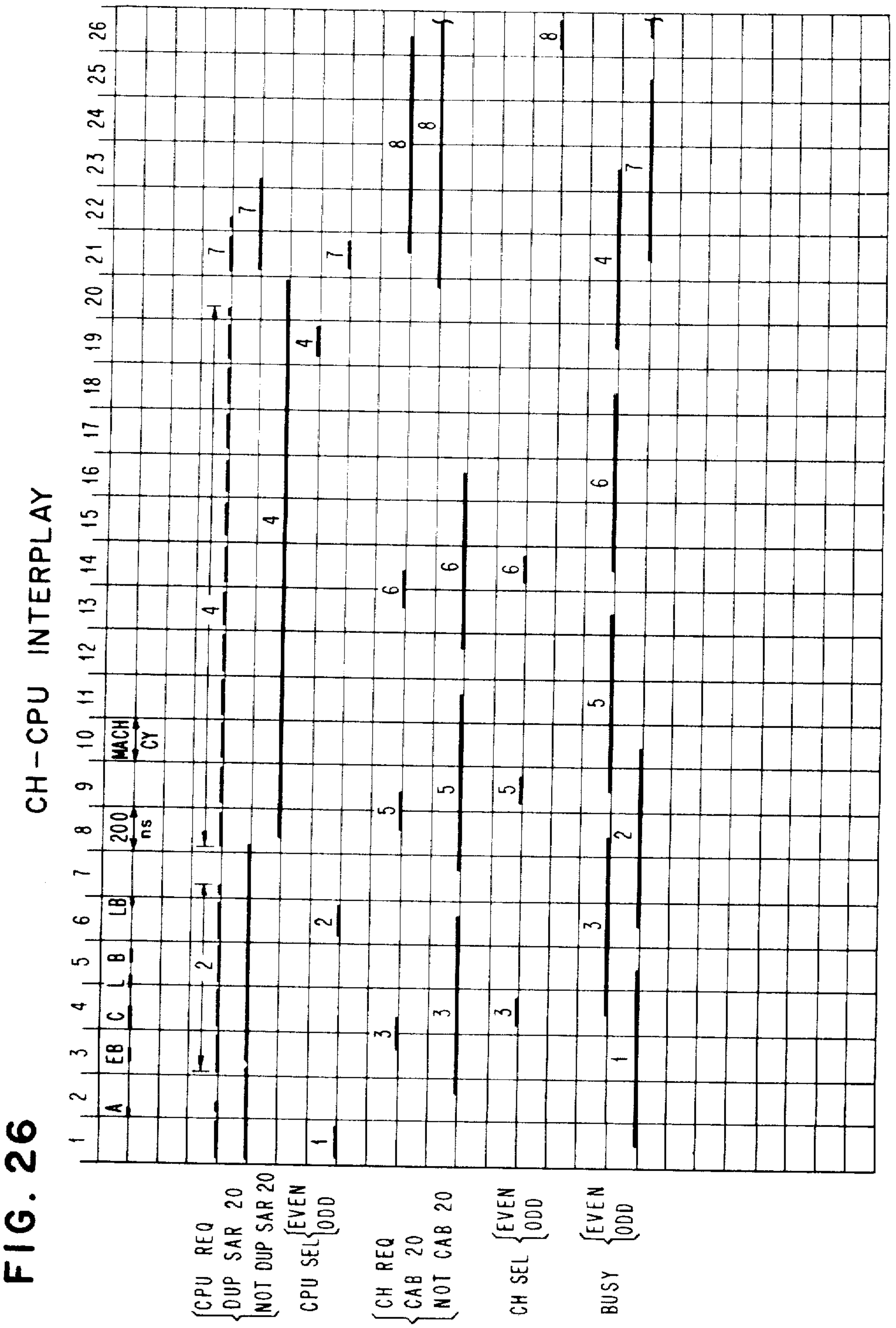

The timing of the CPU request cycle (including the fact that during running operations the CPU request latch is reset momentarily at the start of each machine cycle) is shown in FIG. 24; however, the usefulness of this resetting action is illustrated most clearly in the top line of FIG. 26. In FIG. 26, it can be seen that the second and the fourth CPU requests are not honored immediately; were it not for the fact that the CPU request latch can be reset, at the start of each cycle, any CPU request which is manifested in the latch would eventually result in a storage reference, even though it may be many machine cycles later. Of course, it would be possible to take some function of a branch or an interrupt signal and from it develop an appropriate resetting signal for the CPU request latch. However, the usage of this particular circuit makes the CPU request latch capable of being reset upon branch or interrupt (due to the removal of the remaining inputs such as I FETCH, E FETCH, I STORE, etc.) without regard what is occurring within the CPU. This makes the BCU more versatile, and for instance, lends its use in multiple-computer operations wherein more than one computer may be utilizing the particular BCU for referencing storage devices. Stated alternatively, upon branch of interrupt which causes a loss of the storage access request I FETCH 1, I FETCH 2, E FETCH, I STORE or E STORE) the loss of these signals act as a reset for the CPU request without any particular other reset signal being required.

(6.2) STORAGE INPUT CIRCUITS (FIG. 10)

The selection circuits described with respect to FIG. 9 provide controlling signals to the storage input circuits shown in FIG. 10. These signals include gate channel, not CPU block, channel OP, CPU OP, and cyclic inhibit. The remaining inputs shown in FIG. 10 are from the channels 1–6, from the PDU (which inputs comprise the maintenance channel and a control signal, ENABLE PKF), and from the various portions of the CPU.

The storage input circuits of FIG. 10 select from among the CPU and the channel inputs to provide input signals for storage, and to perform certain checking operations. The address from the CPU AA (address) and INCR (incrementer), and from the channel on the CAB (channel address bus), are combined in the SAR (storage address register), FIG. 23, and the address OR, FIG. 31, to generate a single address to control storage on the SAB (storage address bus). The SAB is checked for proper parity count in the SAB ADR CHK (address check) circuit, FIG. 33, and is checked to determine that the address specifies a storage location within the capacity of a particular system in the INV ADR (invalid address) circuit, FIG. 34. If either circuit, FIG. 33, FIG. 34, indicates an error, then a cancel condition will be generated by a CANC–PKF (cancel-panel key fetch) circuit, FIG. 35. This circuit also is responsive to an operator's indication that panel keys are to be used as a source of data, as indicated by the presence of a signal on the ENABLE PKF line and by an address (from the MC). Under these conditions the CAN–PKF circuit, FIG. 35, generates a signal on a PKF line which is returned to the PDU to control fetching data from the panel keys, and a signal on a CANC line to terminate a storage reference operation. The parity bits, on the SAB are adjusted and new bits generated in the PAR ADJ (parity adjust) circuit, FIG. 35. This adjustment accounts for the fact that, although the system generally may specify as many storage locations as can be addressed with a 24 bit address, only 14 bits are actually used by storage herein, bits 6 through 19 of the channel and CPU address busses. Thus, the parity which obtains for the 24 bit address received at SAB has to be adjusted to reflect the 1 bit address sent to storage.

Figure 37:
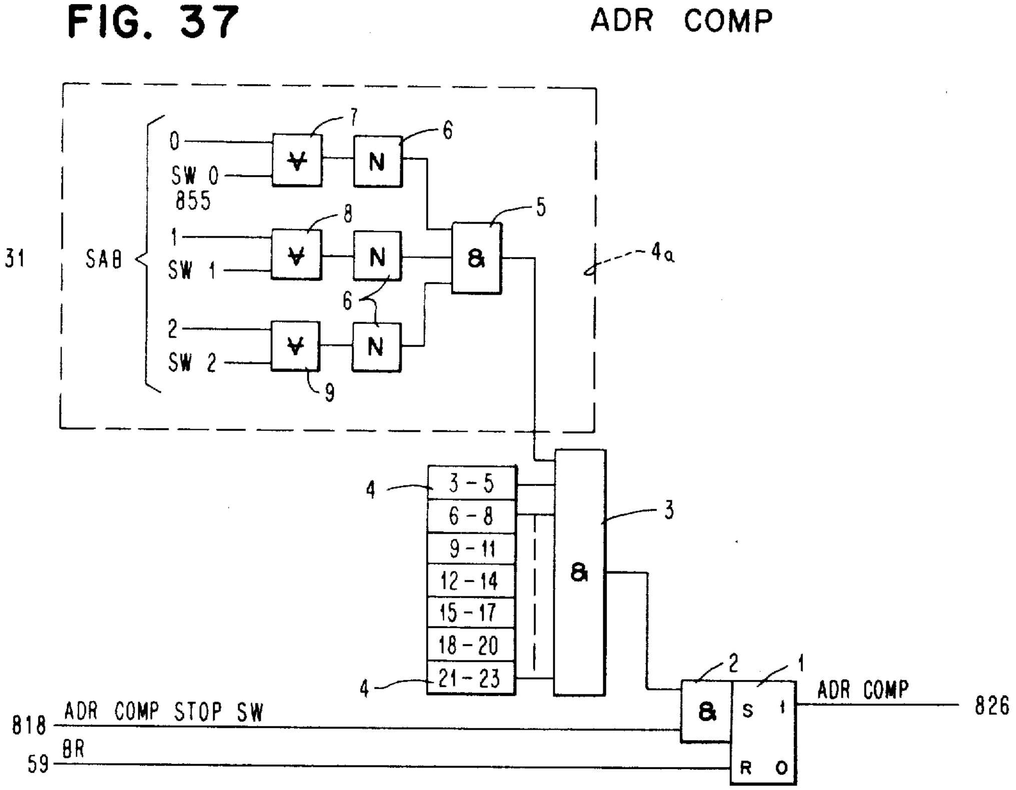

The address bit content of the SAB is also compared against panel address keys in an ADR COMP (address compare) circuit, FIG. 37. This sends a signal back to the PDU indicating that there is, or is not, a comparison.

Figures 38, 39:
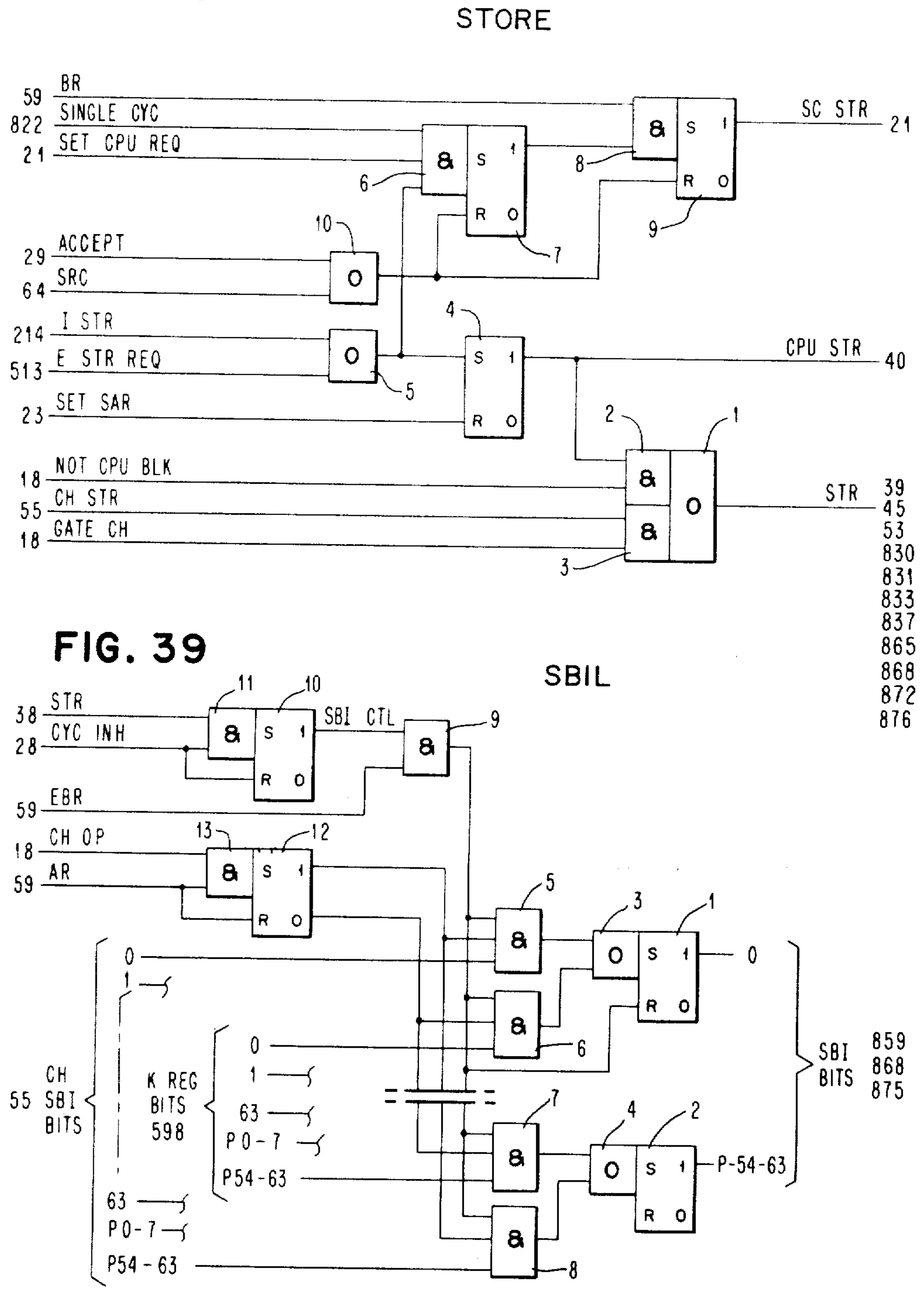

When data is to be stored in one of selected storage devices, STR (store) circuit, FIG. 38, enables an SBIL (storage bus in latch) circuit FIG. 39 to select from the CH SBI (channel storage bus in) and the K REG (a register designated K, within the E unit of the CPU), to generate the correct data bits on the SBI (storage bus in) which supplies actual data to the storage devices for storage therein. The STR circuit FIG. 38 also supplies a signal on a STORE line to indicate to storage that it is to store data, rather than to fetch data from the designated address.

In the system described herein, it is possible to store a full 8-byte storage word or to store only one or more bytes (8 bits and parity each), selectively, the remainder of the storage word being regenerated (that is, the data stored prior to the storage operation is returned with the exception of the one or more new bytes being stored). More than one byte can be stored, the particular bytes to be stored being identified by MARKS. Depending on which unit is controlling storage at a given time, either the channel, the I unit, or the E unit marks are selected by the marks circuit, FIG. 40 to provide correct marks to storage.

In the embodiment being described, every storage location may be protected from erroneous accessing (which would spoil the data therein) by means of storage protection keys which represent four bit code combination used to identify different blocks of storage locations. A storage operation must therefore indicate a key which is correct for the block of locations within which storage is to be effected, or a storage address protection (SAP) error will be indicated.

The IN KEYS circuit, FIG. 42, selects IN KEYS from the channel, or from any one of four locations in the I unit, to send the proper keys to the storage unit.

In summation, the storage input circuits of FIG. 10 select an address from the channel or the CPU, check the address, parity adjust it, and compare the address against panel keys (in response to the proper control signals). This circuit also provides to the storage unit: a store signal, and data to be stored, along with MARKS and IN KEYS, to control the storing of data.

The SAR FIG. 23 is described with respect to the selection circuits, in Section 6.1.4.4. The remaining circuits shown in FIG. 10 are described in succeeding sections, hereinafter.

*(6.2.1) Address OR (FIG. 31)*

The address OR circuit (ADR OR, FIG. 31), responds to the channel address bus (CAB) and to the storage address register (SAR) to generate a 24 bit address, with three parity bits, on the storage address bus (SAB). The circuit comprises essentially a plurality of OR circuits 1 each settable by either one of two corresponding AND circuits 2, 3. The AND circuits 2 are operative when there is a signal on the GATE CH line from FIG. 18, and the AND circuits 3 are operative whenever there is a signal on the NOT CPU BLK line (from FIG. 18). The SAB is indicated as going to the storage unit (see the storage interface, FIG. 859 of application Ser. No. 609,238), the parity adjust, FIG. 36, the address compare, FIG. 37, the invalid address, FIG. 34, and the SAB address check, FIG. 33. However, not all of the SAB bits are utilized by all of these circuits, as is described in the ensuing sections.

*(6.2.2) Storage Addressing (FIG. 32)*

Figure 32:
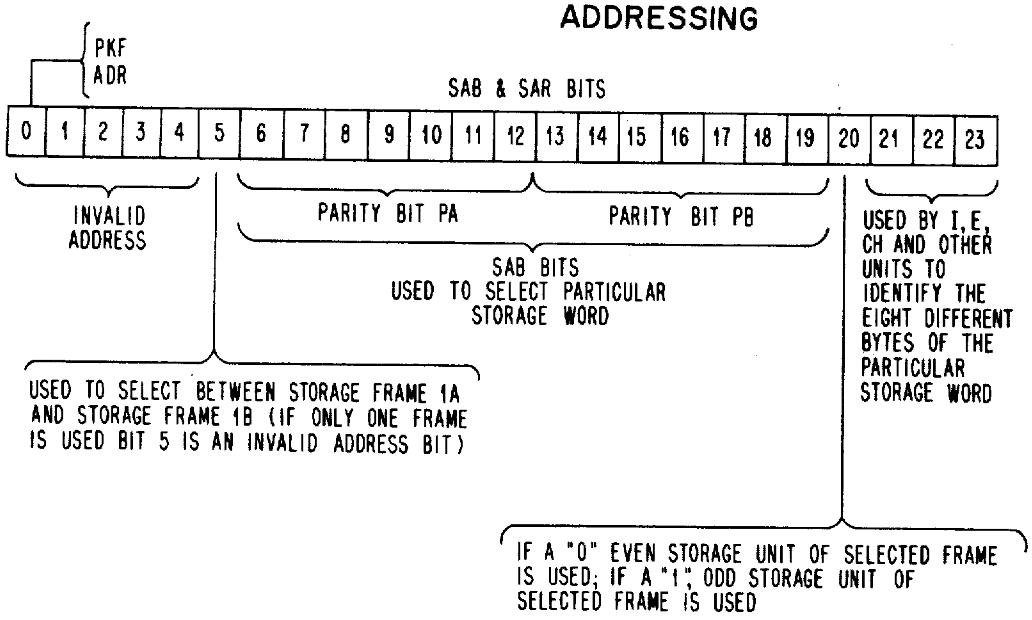

Referring to FIG. 32, in the present embodiment, the 24 possible address bits are not all used, and some are used in different ways. The three lowest ordered bits specify only bytes of a storage word (eight bits each, there being eight such bytes in a storage word), bit 20 is used to select odd or even storage units; the sixth from highest ordered bits specifying whether the lowest-address or the high-address storage frame is to be utilized, the highest ordered bits specifying whether the lowest-address or remaining high order bits (second highest to fifth highest) specify storage locations not included in the system of the embodiment shown in FIG. 9 through FIG. 54. Thus, the address sent on the SAB to storage will contain only 14 bits.

*(6.2.3) SAB Address Check (FIG. 33)*

Figure 33:
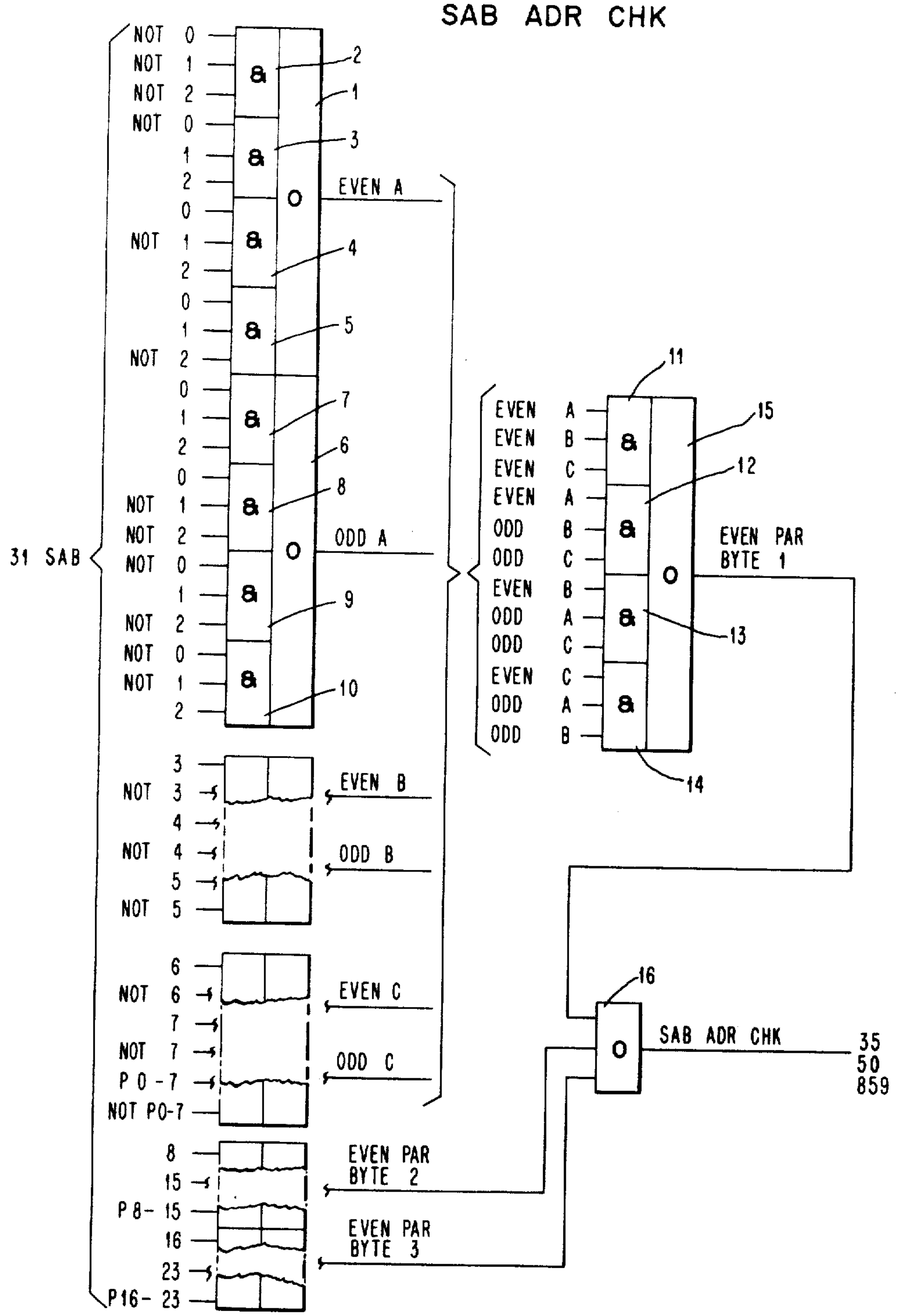

Parity in this embodiment is adjusted so that there is an odd number of bits in any parity checked group, including the parity bit. For instance, in a binary group having a value of zero, the group would consist of ZERO's except for the parity bit, which is a ONE. The SAB address check circuit of FIG. 33 compares the various data bits and parity bits of the SAB, in groups; each group comprises eight data bits and a parity bit, which is called a "byte" in this embodiment. At the top of FIG. 33 is shown detailed circuits for the A section of parity byte 1 and details of how the A, B and C sections of parity byte 1 are combined so as to generate a signal on the EVEN PAR BYTE 1 line. At the bottom of FIG. 33 is represented in block form similar circuitry for EVEN PAR BYTE 2 and EVEN PAR BYTE 3.

Each of the bytes are divided into three groups (there being eight data bits and one parity bit, or a total of nine bits in each group). Since it is well known in the art that three-input AND circuits are readily obtainable, this provides a simple means of checking the storage address bus. An OR circuit 1 is fed by any one of four AND circuits 2–5 and various combinations of the SAB bits: 0, NOT 0, 1, NOT 1, 2, NOT 2. For instance the AND circuit 2 will cause the OR circuit 1 to generate a signal on the EVEN A line if there is no 0 bit, no 1 bit and no 2 bit. The AND circuit 3 responds to no 0 bit but the presence of a 1 bit and a 2 bit. The AND circuit 4 responds to the lack of a 1 bit but the presence of a 0 and a 2 bit, and so forth. In similar fashion, OR circuit 6 responds to any one of four AND circuits 7–10 to generate a signal on an ODD A line. The AND circuit 7 responds to the presence of only a 0 bit; AND circuit 9 responds to the presence of only the 2 bit.

The outputs of the OR circuits 1, 6 and the similar outputs (EVEN B, ODD B, EVEN C, ODD C) are applied to a plurality of AND circuits 11–14 which feed an OR circuit 15. Again the combinations are such that if all are even, or if only one is even and the remaining ones are odd, then the OR circuit 15 will generate the signal on the EVEN PAR BYTE 1 line. An OR circuit 16 responds to EVEN PAR lines for BYTE 1, BYTE 2 and BYTE 3 to generate SAB address check signal on the SAB ADR CHK. Thus, if any one of the three parity groups in the 24 bit address has a total even parity including the parity bit, the OR circuit 16 will generate an error-indicating signal on the SAB ADR CHK line.

*(6.2.4) Invalid Address (FIG. 34)*

Figure 34:
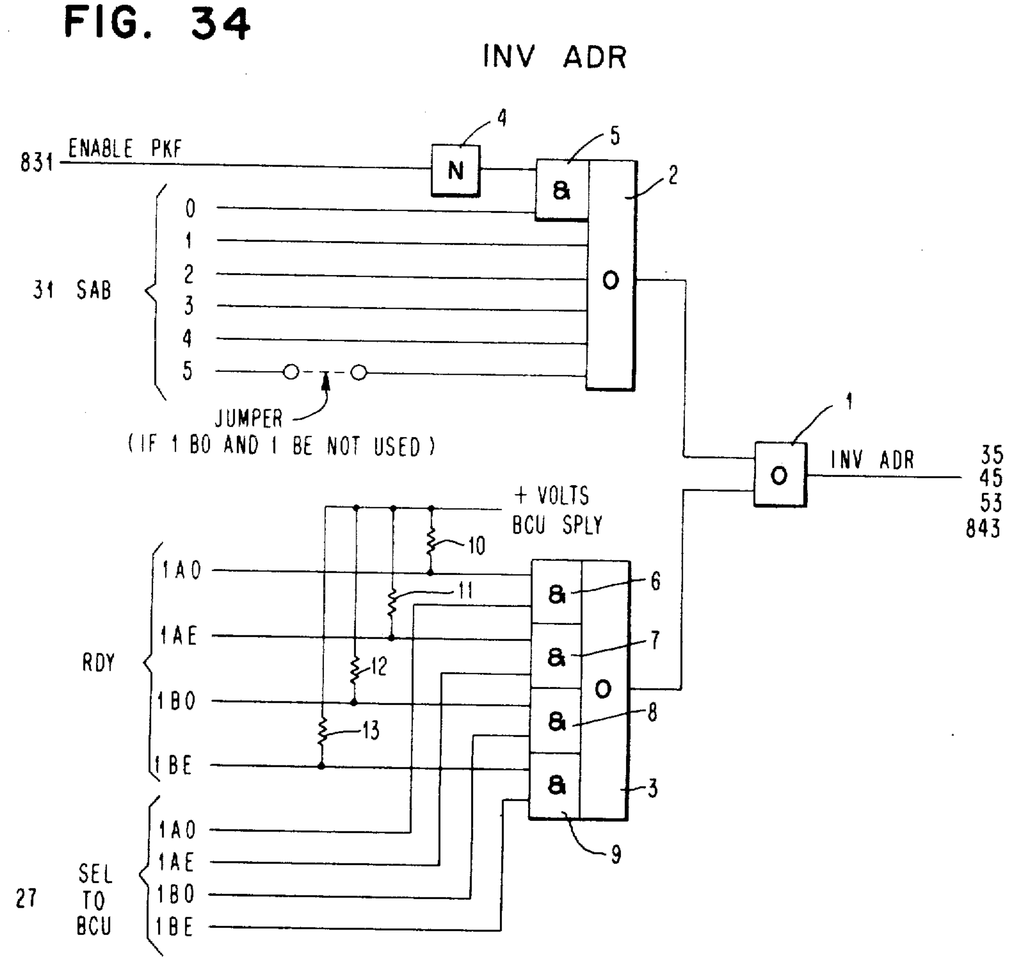

A signal is generated on an INV ADR line in FIG. 34 by an OR circuit 1 in response to either of two other OR circuits 2, 3; of course more or less OR circuits can be used to perform the ORing function of circuits 1, 2 and 3. This configuration is chosen to clearly illustrate the logical functions involved. The OR circuit 2 responds to those bits in the storage address bus which relate to addresses corresponding to locations in excess of those available in the storage units of this particular embodiment. As described in Section 6.2.2, address bits 0–4 could only be utilized in addressing storage locations in excess of those provided in the present embodiment. Therefore, the presence of one of these bits indicates an attempt by the channel or the CPU to reach storage areas which do not exist. The possible exception to this is the use of storage bit zero to designate the fetching of data from the panel data keys as indicated by a signal on the ENABLE PKF line, which is fed to an inverter 4 that feeds an AND circuit 5. The presence of bit zero in an address will therefore be recognized as an invalid address bit only if there is no ENABLE PFK signal present. Notice that bit 5 of the storage address bus can be taken as an invalid address bit if only one storage frame is used; in this embodiment, if storage units 1BO and 1BE were not available, then jumpering of the two points to connect SAB bit 5 with the OR circuit 2 would permit recognizing bit 5 as an invalid address bit.

The OR circuit 3 responds to any one of four AND circuits 6–9 provided that there is present a corresponding signal on one of the select lines 1BE, 1BO, 1AE, 1AO, repsectively, and a positive potential can be sensed at the other input thereto. A plurality of resistance elements 10–13 correspond to the AND circuit 6–9, and are connected to the storage units by corresponding RDY (ready) lines. When any storage device is both operating properly and has not been indicated as being "off-line" (or inoperative) by a manual switch (which maintenance personnel may operate), then the RDY lines will be connected essentially to ground in the storage unit, thereby causing a potential drop across each of the resistors 10–13, so that the inputs to the AND circuits 6–9 are too low to permit these AND circuits to operate. However, should the positive potential in the storage unit fail, or should maintenance personnel operate a switch to take a storage unit off line, then the corresponding ready line will comprise essentially an open circuit, whereby the positive potential of the BCU supply is supplied directly, with little or no voltage drop, via one of the resistances 10–13, to a corresponding AND circuit 6–9, thereby to operate the OR circuit 3, and generate an invalid address signal on the INV ADR line. The purpose of the circuitry connected to OR circuitry 3 is to not only recognize when a power supply of a storage device has failed, or when the storage device has been removed from service for maintenance purposes, but to do so utilizing the existing invalid address circuitry and permitting the usual type of interruption response from the particular occurrence.

*(6.2.5) Cancel-Panel key fetch (FIG. 35)*

Figure 35:
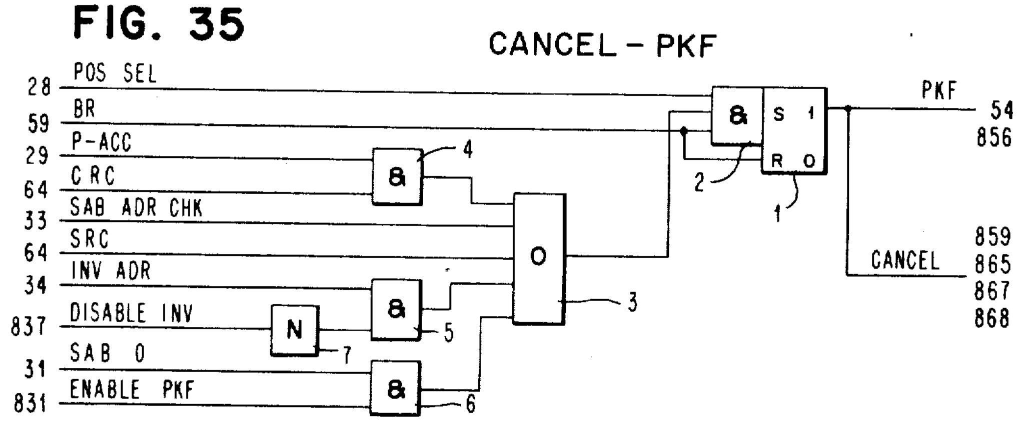
Figure 36:
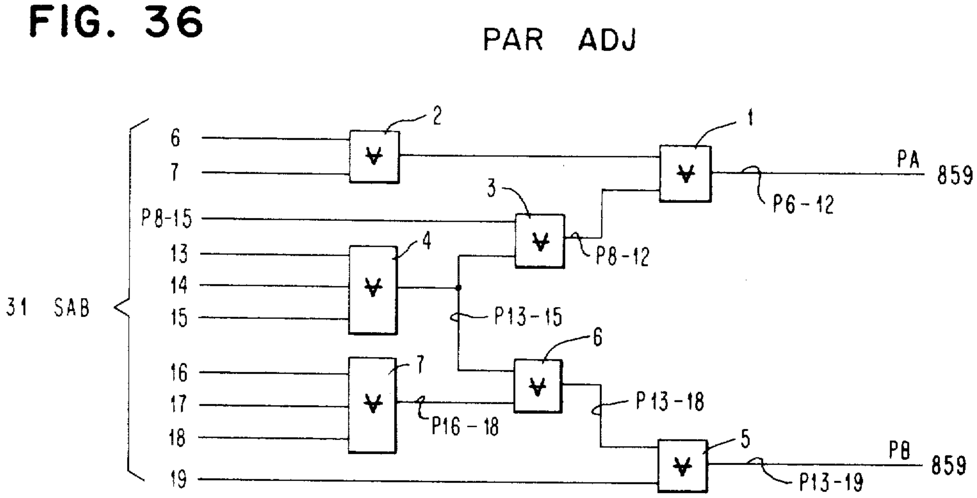

A signal on both a PKF (panel key fetch) line and on a CANCEL line is generated in FIG. 35 by a latch 1 which is set by an AND circuit 2 at B time (BR line), and is reset at the start of the following B time. The AND circuit 2 responds to a signal on the POS SEL line from FIG. 28 and to a signal from an OR circuit 3. The OR circuit 3 recognizes certain error conditions and also recognizes an operation involving the fetching of data from the panel keys under operator control. The OR circuit 3 responds to a storage address bus address check signal on an SAB ADR CHK line from FIG. 33 and to a system reset control signal on an SRC line from the I unit, as well as to three AND circuits 4–6. The AND circuit 4 is operative in response to a computer reset control signal on a CRC line concurrently with the presence of a pulse accept signal on a P-ACC line; the AND circuit 5 is responsive to a signal on the INV ADR address line from FIG. 34, provided there is a signal from inverter 7 indicating that there is no disable invalid signal on a DISABLE INV line from the control panel in the PDU. The disable invalid signal results for the operating of a switch which indicates that invalid addresses are not to be recognized as error conditions during maintenance operations of the system. The AND circuit 6 responds to a signal on the ENABLE PKF line which signal indicates that a switch on the control panel has been operated to cause a fetching of data from the panel data keys, whenever there is a bit in the highest ordered position of the address, that is, SAB bit 0. The latch 2 will be set during the time that the positive select signal is present (which is approximately a half of a cycle of time within which the odd or even select latches of FIG. 28 are set, as the case may be). Thus, if, for instance, the even storage unit had in fact been selected, but error in the storage address (or otherwise) were to show up in the circuit of FIG. 35, the latch 1 would be set at the following B time and would remain set for a cycle; this would send a cancel signal to each of the storage units, where the signal would be effective to cancel the storage requests. Also, should fetching of data from panel keys be indicated, then the latch may be set in response to the AND circuit 6. Furthermore, during reset conditions (CRC, SRC) the latch will be set to cancel any storage requests which may have been initiated in a preceding cycle. Whenever panel key fetch is involved, the output of the latch 1 is sent to the SBOL (storage bus out latch) which is illustrated in block form in FIG. 11, storage output circuits. This signal is used there to select data from the panel rather than from storage to be applied to the storage bus out, for use in the usual fashion by any of the storage return registers as is described hereinafter.

Notice that cancelling a storage request and the fetching of data from the panel keys in the PDU are inseparable. This is so because the CANCEL line and the PKF line are one and the same. This relationship promotes more sophisticated error checking, in that it prevents a data check condition from masking an invalid address condition. Whenever an invalid address is sensed in FIG. 34, it causes a signal on the CANCEL line (FIG. 35), which in turn cancels the storage if a fetch operation is involved, the SBO will be checked for proper parity; since no data is fetched (due to the cancel signal), the SBO will be all ZERO's, and a parity error signal would result. However, since cancel also calls for a fetching of the panel key data, panel key data with correct parity will be sensed instead of the "dead" storage SBO. The data is meaningless, but it is not used, due to the INV ADR error condition which causes an interrupt. Thus, PKF prevents an INV ADR error from being masked by a parity error. Furthermore, the CANCEL line, enables normal storage fetch request circuitry to be used to initiate a PKF, without causing an erroneous storage operation. All other inputs to FIG. 35 (SAB ADR CHK, SRC, CRC) cause storage cancellations which are not affected one way or the other by PKF, and the logic is simplified by allowing the panel key data to be gated to SBO, since it will never be sensed.

Notice that a fetch of data from the panel keys is identified by the presence of address bit 0 (the highest-ordered address bit, FIG. 32). The fetch will be allowed (by generating a signal on the CANCEL line, blocking the usual type of fetch) and the PKF line (to fetch the data from the panel keys) *if* the operator has indicated that the data keys are properly set by setting the ENABLE PKF switch (see AND 6, FIG. 35). If there is no signal on the ENABLE PKF line, the circuit of FIG. 35 does nothing primarily, but since the INV ADR line will be active (see AND 5, FIG. 34), the CANCEL and PKF lines *will* be active due to the address bit 0 causing an invalid address designation.

*(6.2.6) Parity adjust (FIG. 36)*

Referring again to Section 6.2.2 (FIG. 32) the possible 24 bits of address which the channels and the CPU are capable of delivering are not useful to the two frames of storage comprising four storage units 1AO, 1AE, 1BO, 1BE. Therefore, only fourteen bits of address are sent to storage, these comprising bits 6 through 19. Therefore, the parity bits, which relate to groups of data bits 0–7, 8–15, and 16–23 are no longer valid when the address is sent to the storage unit. For this reason, new parity bits which reflect the parity of the fourteen useful address bits have to be provided. These new parity bits are generated in FIG. 36 by a plurality of EXCLUSIVE OR circuits 1–7. The EXCLUSIVE OR circuit 1 generates a signal for the line reflecting a first parity bit PA which relates to bits 6 through 12 of the useful address in response to the EXCLUSIVE OR circuits 2 and 3. The EXCLUSIVE OR circuit 3 generates a parity bit for bits 8 through 12 by subtracting from the parity of bits 8 through 15 (this is the original parity bit which accompanies the address on the SAB) the parity of bits 13 through 15, as determined by the EXCLUSIVE OR circuit 4. The EXCLUSIVE OR circuit 5 generates the second parity bit which relates to address bits 13 through 19, called PB. An EXCLUSIVE OR circuit 5 responds to the parity of bits 13 through 18 which is generated by the EXCLUSIVE OR circuit 6, the EXCLUSIVE OR circuit 6 taking the parity of bits 13 through 15 from EXCLUSIVE OR circuit 4 and taking the parity of bits 16 through 18 from the EXCLUSIVE OR circuit 7. EXCLUSIVE OR circuit 5 also takes into account the presence or absence of bit 19 so as to generate parity for bits 13 through 19. The parity bits PA, PB are the parity bits which accompany the useful address bits sent on the SAB to the storage units from the address OR circuit of FIG. 31. These parity bits are used in the storage unit to check the received address to see that it has proper parity.

*(6.2.7) Address compare (FIG. 37)*

A signal is generated on an ADR COMP line in FIG. 37 by a latch 1 which is set by an AND circuit 2 in response to another AND circuit 3 whenever there is a signal on an ADR COMP STOP SW line from the PDU, which line indicates the operation of a switch to cause address comparison to take place. The AND circuit 3 responds to a plurality of circuits such as the circuit 4*a* which includes an AND circuit 5 responsive to the outputs of three inverters 6 which are fed by corresponding EXCLUSIVE OR circuits 7–9. If, for instance SAB bit 0 and address switch bit 0 (SW O) are both present, then the EXCLUSIVE OR circuit 7 will have no output so that the related inverter 6 will have an output applied to the AND circuit 5. Similarly, if SAB bit 1 is absent and address switch bit 1 is absent then the EXCLUSIVE OR circuit 8 will have no output so that the related inverter 6 will supply a signal to the AND circuit 5. If all three inputs are present at the AND circuit 5 then there will be an input to the AND circuit 3. If all of the other circuits 4 likewise supply signals to the AND circuit 3, then this indicates that all of the bits compare identically with one another, so that the AND circuit 2 will set the latch 1 and generate the address compare signal. The latch 1 is reset every B time by a signal on the BR line.

*(6.2.8 Store circuit (FIG. 38)*

The store circuit shown in FIG. 38 generates a signal on a STORE line by means of an OR circuit 1 which responds to either of the AND circuits 2, 3 that operate alternatively in dependence upon whether the channel or the CPU has requested the recognized storage operation. A signal on a CH STR line from a channel will operate the AND circuit 3 provided there is a signal on the GATE CH line from FIG. 18. Alternatively, a signal on a CPU STR line will operate the AND circuit 2 if there is a signal on the NOT CPU BLK line. The CPU STR line is activated by a latch 4 which is set by an OR circuit 5 in response to a signal on either the 1 STR line from the I unit, or the E STR REQ line from the E unit. The output of the OR circuit 5 is also applied to an AND circuit 6 for setting a latch 7 whenever there is concurrently present a signal on a SINGLE CYC line from the PDU (indicating that single cycle operation is being controlled by maintenance personnel) and a signal on the SET CPU REQ line which is also utilized in FIG. 21 to gate the setting of the CPU request latch. The latch 7 will cause an AND circuit 8 to be operated at B time so as to set a latch 9, the output of which comprises a signal on the SC STR (single cycle store) line. The latches 7 and 9 are reset by an OR circuit 10 in response to an accept signal on the ACCEPT line or a system reset control on the SRC line. The SC STR line is used to initiate a CPU request during single cycle operations. The CPU STR line is used in FIG. 40 to control the MARKS, as described in Section 6.2.1. The STR line is used in a variety of circuits as an indication that a store operation (rather than a fetch operation) is being performed and is used in the storage units to gate data to be stored. This activates certain of the circuits used only on store operations, and causes the storage unit to store data rather than fetch it.

The latches 7 and 9 are used to "kill" one single-cycle-time before setting the request latch. This is to insure data will be gated into the K REG before the storage unit is selected. (K REG is normally set one cycle after the request is made when it is under S/O control). The accept signal is used to reset the latches 7, 9 since it appears for each CPU storage request, thereby clearing these latches so they may reflect the nature of current CPU operation.

*(6.2.9) Storage bus in latch (FIG. 39)*

FIG. 39 is a fragmentary schematic block diagram of the SBIL (storage bus in latch) which selects data from the CPU or from the channel and causes it to be set into a plurality of latches 1, 2. Each latch is set by a corresponding OR circuit 3, 4 in response to related AND circuits 5, 6 and 7, 8, respectively. The AND circuits operate in response to an early B timing signal (EBR line) and SBI control signal from latch 10. The latch 10 is set by an AND circuit 11 in response to signals on the STR line from FIG. 38 and the CYC INH line from FIG. 28. The CYC INH line is also used as a reset for latch 10, so that the latch 10 will be set from the start of cyclic inhibit of a store operation to the start of cyclic inhibit for a following storage reference, a period of about two machine cycles (400 nanoseconds). This means, then, that the storage bus in latches 1, 2 will be set during the second cycle of a sequence of cycles within which a storage request has been recognized by the selection circuits of FIG. 9. The AND circuits 5 and 8 are operated by a latch 12 which is set by an AND circuit 13 in response to an AR timing pulse and a signal on the CH OP line from FIG. 18. If the latch is not set, then the AND circuits 6 and 7 will be operated by the off-side of the latch 12. Thus, the AND circuits 5 and 8 may be affirmatively brought into operation by the latch 12 so as to gate the CH SBI BITS into the SBIL, otherwise bits from the K register (in the E unit of the CPU) will automatically be gated by the AND circuits 6 and 7 (this action is referred to in Section 6.1.5, concerning CH/CPU switching).

Note that the input to the storage units is from the K register in the E unit; this is true, no matter what form of data is to be supplied to the storage units from the CPU.

*(6.2.10) Marks circuit (FIG. 40)*

The marks circuit comprises a plurality of OR circuits 1, 2, 3 which correspond respectively to various ones of eight mark bits 0–7, 8–15, . . . 56–63 each of which is operated by either one of two corresponding AND circuits: 4, 5; 6, 7; 8, 9. Each mark bit corresponds to a byte of data containing the identified parity bits; for instance, one mark bit relates to bits 0–7 of a storage word, one relates to bits 8–15 of a storage word, etc. Each of the AND circuits 4, 6, 8 responds to a corresponding channel mark 0–7, 8–15, . . . 56–63, and to a signal on the CH OP line from FIG. 18. On the other hand, the AND circuits 5, 7, 9 respond to a signal on the CPU OP line from FIG. 18 and to a corresponding latch 10, 11, . . . 12, each of which is settable by a respective OR circuit 13, 14, . . . 15. The OR circuits 13–15 are responsive to a first set of corresponding AND circuits 16, 17, . . . 18 which are operated by a signal on a VFL MK GT (gate) line which comes from the E unit. This line is energized during variable field length operations where one or more bytes of each storage word may be operated upon and a storage word containing one or more bytes of results must therefore be accompanied by marks to indicate which bytes of the storage word are to be stored. Each of the AND circuits 16, 17, . . . 18 is operated at A time by a signal on the AC (controlled A clock) line from the I unit. Each AND circuit also responds to a signal on a corresponding VFL MK line 0–7, 8–15, . . . 56–63. These are the lines which indicate individual bytes (such as the byte containing bits 0–7, or 48–55, etc.) which are to be stored in variable field length operations. Each of the OR circuits 13–15 also respond to a corresponding OR circuit 19, 20, . . . 21, responsive at A time to signals on corresponding SET MK lines 0–15, . . . 48–63. These lines are from the I unit, and cause the setting of two mark bits at a time in related pairs of bytes, said pairs of bytes being called syllables herein. Two mark bits are set because the I unit cannot store, on a byte by byte basis, except in multiples of two bytes. Thus, the marks circuit of FIG. 40 can respond to individual mark bits from the E unit in variable field length operations, to the 1 unit during store operations, or to channel mark bits during channel operations.

Each of the latches 10–12 is reset by signals on a line from an OR circuit 22 which responds to a signal on a CPU RST line from the I unit, and to the output of an AND circuit 23. The AND circuit 23 is operative at A time (due to a signal on the AC line) concurrently with the output of an OR circuit 24 which in turn responds to a signal on an IRPT RST (interrupt reset) line from the I unit, or to the output of a latch 25. The latch 25 is set by an AND circuit 26 in response to the concurrent presence of a signal on the CPU STORE line from FIG. 38 and a signal ACCEPT line from FIG. 29. The latch will remain set throughout the duration of the signal on the ACCEPT line and will then be reset. Thus, whenever a CPU store operation has been accepted by the BCU, the latch 25 will operate the OR circuit 24 so that, during the next following A time, the AND circuit 23 will operate the OR circuit 22 to reset the latches 10–12. Otherwise, the latches will be reset during an interrupt reset or during a CPU reset. Note that there is no channel reset for the latches 10–12 due to the fact that channel marks are not lodged in the latches, but rather are applied directly to AND circuits 4, 6, . . . 8. The nature of the CPU reset and interrupt reset are discussed in more detail in said environmental system (see references).

The output of the AND circuit 23, and the signal on the CPU RST line also feed an OR circuit 27 which will set a mark parity latch 28 to provide a signal on a mark parity line (P) which is used in storage to check the validity of the mark bits, and which is also used to operate a bipolar latch 29. The OR circuit 27 will thus generate a parity bit for the mark register whenever the mark register is itself reset. The OR circuit 27 will also set latch 28 in response to an AND circuit 30 which operates at A time (due to a signal on the AC line) in response to an EXCLUSIVE OR circuit 31 which will generate a signal provided there is only one of two inputs present. One input is the output of the bipolar latch 29, and the other input is a signal on the VFL UPDATE MARK PAR (parity) line from the E unit. The output of the mark parity latch 27 is applied to an AND circuit 32 which responds to the signal on the CPU OP line along with the AND circuits which corresponds to the OR circuits 1, 2, 3, and other input of which has an AND circuit 35 which corresponds to the AND circuits 4, 6, 8 and is operative to gate a signal on a CH MARK P (parity) line whenever there is a signal on the CH OP line. Thus, the mark circuit of FIG. 40 includes 8 mark bits, one corresponding to each byte of a storage word (such as the byte containing bits 0–7,) and a parity bit (P). The parity bit accompanying the channel marks is generated in the channel; the parity bit accompanying CPU marks is generated by the circuitry at the bottom of FIG. 40. Mark Parity Latch 28 is set so as to generate a mark parity bit whenever the mark register (latches 10, 11, 12) are reset. Thereafter, whenever variable field length operations are involved, successive bytes of a storage word may be operated upon during each successive cycle, a mark bit is sent to the mark register for each byte handled. For instance, a first cycle of operation may involve byte 0–7; when the mark bit for byte 0–7 is set into the latch 10 under control of the VFL MK GT line, there will also be a signal on the VFL UPDATE MARK PAR line (bottom of FIG. 40) which will cause the parity bit reflected at the output of the bi-polar latch 29 to be reversed by the operation of the EXCLUSIVE OR circuit 31. Thus there will then be no output from the EXCLUSIVE OR circuit 31 and no input from the AND circuit 30 through the OR circuit 27 to again set the latch 28. The latch 28 is, however, reset at A time of each cycle. Thus, during that cycle when a mark bit for byte 0–7 is set into the latch 10, there will be no parity bit output from the latch 28. On the next cycle of operation, assume that there will be a mark bit for byte 8–15 set into the latch 11. Again, this is achieved by a signal on the VFL MK GT line which is accompanied by a signal on the VFL UPDATE MARK PAR line; the latch 28 is reset at the start of A time: at not A time, the bipolar trigger 29 will be gated to reflect the setting of the latch 28. In this case, the trigger 29 will be set so as to have no output, so that there *will* be an output from the EXCLUSIVE OR circuit 31 in response to the signal on the VFL UPDATE MARK PAR line. The output of the EXCLUSIVE OR circuit 31 will then pass through the AND circuit 30 at A time so as to set the latch 28 thereby generating a parity bit. The output of the mark circuit is at this time, therefore, two mark bits (0–7, 8–15) and a parity bit (P). In a similar fashion, the latch is left reset in each odd cycle, and is left set in each even cycle, provided that a mark bit is in fact sent to the mark register latches 10, 11, 12. CPU parity for the mark bits is automatically supplied to the storage unit except when a channel operation is actually being performed. However, the CPU mark parity generating circuit (bottom of FIG. 40) will provide a parity bit whenever the storage could possibly do a checking of the mark lines (output to FIG. 40), because the mark parity will never be sampled except during a store operation which has been accepted by a storage unit. Therefore, it is only during reset adjunctive to storage operations or during accepted CPU store operations wherein mark parity must be adjusted as described above.

The bipolar trigger 29 is a trigger which will respond to the output of latch 28 whenever there is a signal on the NOT AC line, and the output of the circuit 29 will be the same as it was at the end of the last signal on the NOT AC line until the next signal appears. The details of such a circuit, and how it operates are disclosed in an article by O. J. Bedrij, "Gated Trigger With Bi-Polar Set," IBM Technical Disclosure Bulletin, vol. 2, No. 6, April 1960, p. 50 (copy in Patent Office Scientific Library).

Summarizing, the mark parity circuit (bottom of FIG. 40) operates in accordance with a philosophy which causes a changing of the parity bit only when parity could possibly be changed, and otherwise ignoring conditions in the system insofar as this parity bit is concerned. Specifically, whenever the mark register is reset (such as at the start of any operation) the parity latch 28 is set so that together with no mark bits there will be an odd number of bits including the parity bit. Thereafter, if the mark register is set by the I unit, the parity bit is not changed because the I unit supplies multiples of two mark bits at a time due to the fact that the I unit stores only syllables or multiples of syllables at any one time. See the Table of Contents for an appropriate section describing the reasons therefore.

During VFL operations, where streams of bytes are operated upon, the parity register may have a sequence of marks set therein, one mark at a time, on successive cycles, in preparation for storing all or part of storage word containing one or more bytes to be stored. The condition of the parity register 28 is sampled at not A time, and if it is set, it will cause the bipolar trigger 29 to be set. Whenever a mark is sent to the register by the VFL circuits, the output of the bipolar trigger 29 is sampled at the EXCLUSIVE OR circuit 31. Regardless of the setting of the trigger 29, the EXCLUSIVE OR circuit 31 will cause the opposite signal to pass through an AND circuit 30 to set the latch 28 into the opposite condition. The way the latch 28 is set is in fact by resetting it and again setting it each time that it should be set, or leaving it in the reset condition each time that it should not be again set. Thus, at A time, the output of the EXCLUSIVE OR can be put into the latch 28, and at not A time, the setting of the latch 28 will be passed along to the bipolar trigger 29. The latch 28 operates essentially in the same fashion as the CPU request latch in FIG. 21 described hereinbefore. That is, being reset each cycle, and again set if the input so indicates or not again set if the input so indicates, alternatively. Thus, correct mark parity is available essentially immediately (at A time), so that storage is not held up.

*(6.2.11) IN keys circuit (FIG. 42)*

As is described in detail in said System/360 Manual, storage protection may be provided to be sure that no block of storage is accessed erroneously by any particular operation of the CPU. To identify storage locations to which the CPU and the channels should be allowed to provide storage information, a set of four keys is used. Various coded combinations of the keys correspond to respective blocks of memory locations. In order for a store operation to be permitted in a particular block, a set of IN KEYS must accompany the storage request, and these KEYS must match those of the block within which the storage location being accessed is located. However, if the IN KEYS are each zero (forming a key combination of 0000), then any block of storage locations will be accessible at that time. Also, any storage location having a Key designation of 0000 may be accessed by any KEY combination. The IN KEYS circuit of FIG. 42 selects a set of CPU IN KEYS from two sources within the CPU and then selects between the set of CPU IN KEYS and a set of channel IN KEYS to provide IN KEYS to storage.

Figure 42A:
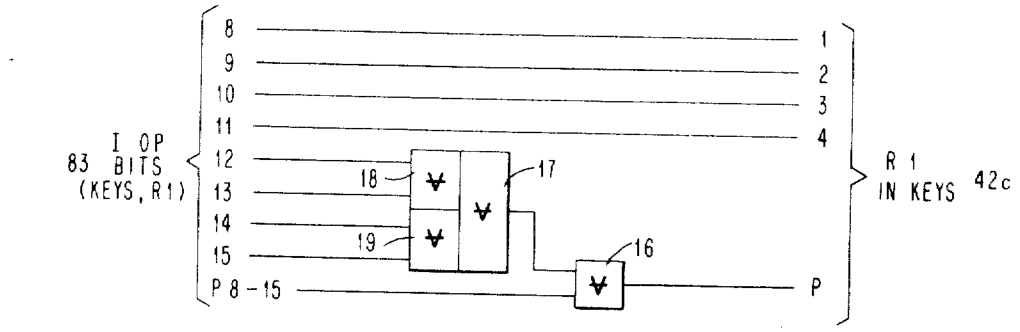
Figure 42B:
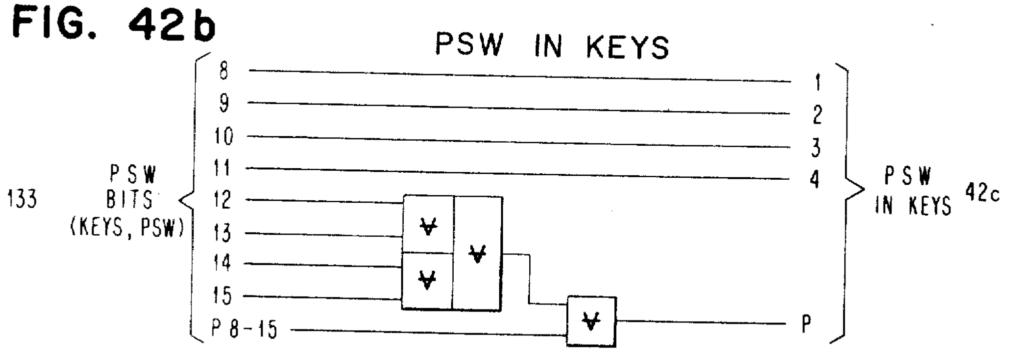
Figure 42C:
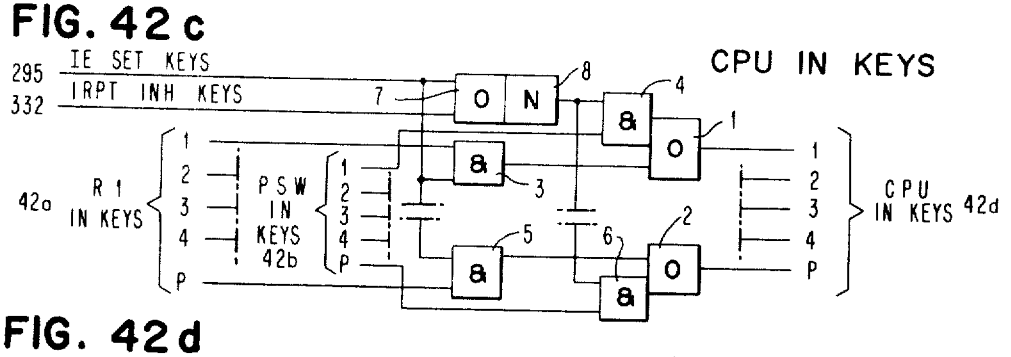

In FIG. 42*c*, the various CPU IN KEYS 1–4, P are generated by corresponding OR circuits 1, 2, each responsive to either one of two related AND circuits 3, 4 and 5, 6 depending upon the source within the CPU of the IN KEYS. A signal on an IE KEY line signifies when an operation directly involved in manipulating the storage keys is being performed. Such an operation might be changing the key designation of a storage block in memory. A signal on a SET or INHIBIT KEYS line will operate an OR circuit 7, the output of which is passed through an inverter 8 to generate a signal for application to the AND circuits 4 and 6. Thus, whenever manipulation of the keys is not involved, or there is not an interrupt to inhibit the use of keys, the AND circuits 4 and 6 will gate the key bit signals from the PSW IN KEYS lines 1–4, P. This is to cause storage protection action under control of the program status word (see said System/360 Manual). On the other hand, if a key manipulation operation is being performed, or there is an interrupt, the inverter 8 will supply NO signal to the AND circuits 4, 6 therefore not gating PSW KEY bit signals through to the OR circuits 1, 2.

During key operation, a signal on the SET or INSERT KEYS line will cause AND circuits 6, 5 to operate and to gate signals on the R1 IN KEYS lines 1–4, P through to the OR circuits 1 and 2 so as to supply signals corresponding CPU IN KEYS lines.

Figure 42D:
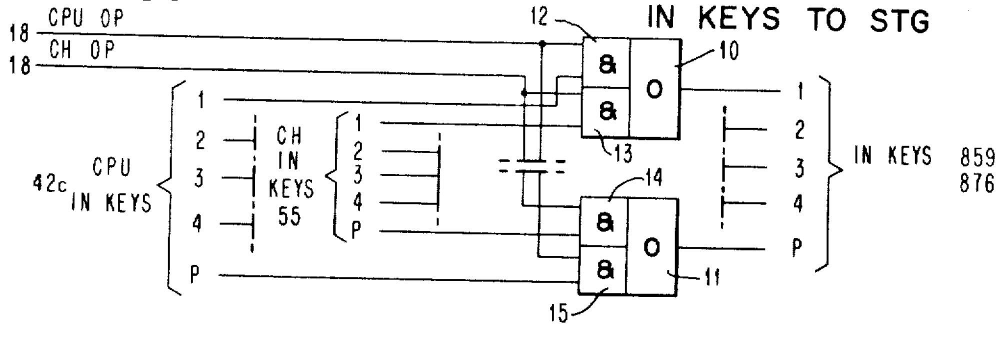

Selection is made between CPU in keys and channel in keys in FIG. 42*d*. The signals on the IN KEYS lines 1–4, P are generated by corresponding OR circuits 10, 11, each operative in response to either one of a pair of related AND circuits 12, 13 and 14, 15. The AND circuits 12 and 15 are responsive to the signal on the CPU OP line from FIG. 18 to gate the signals on CPU IN KEYS lines 1–4, P from FIG. 42, and the AND circuits 13, 14 are responsive to a signal on the CH OP line from FIG. 18 to gate signals on the CH IN KEYS lines 1–4, P. Thus, the signals on the IN KEYS lines will reflect either the channel in keys or the CPU in keys in dependence upon there being a channel operation or a CPU operation in progress, respectively.

The source of the R1 in keys and PSW in keys is FIG. 42*a* and FIG. 42*b*, which derive these keys from the IOP register and the PSW register in the I unit, respectively.

The signals on the R1 in keys lines 1–4, P in FIG. 42*a* are developed from bits 8 through 15 and the accompanying parity bit of the I OP register in the I unit. This is so because keys which are to be inserted in storage units to assume control thereof are found in the R1 register section of the I OP register and this includes bits 8–11 of the I OP register. In FIG. 42*a*, the effect of the R2–X register portion of the I OP register on the parity bit P is subtracted from the parity bit by means of an EXCLUSIVE OR circuit 16 which responds to the parity bit P 8–15 and to an EXCLULSIVE OR circuit 17 which is driven by a pair of EXCLUSIVE OR circuits 18, 19. Thus, if I OP bits 12 and 13 are both present, there will be no output from the EXCLUSIVE OR circuit 18; on the other hand if bit 14 is present, but bit 15 is not present, there will be an output from the EXCLUSIVE OR circuit 19, thus providing between them (18, 19) one input only to the EXCLUSIVE OR circuit 17, so that the EXCLUSIVE OR circuit 17 will provide an input to the EXCLUSIVE OR circuit 16; this indicates that bits 12–15 have an odd parity count, and that therefore the state of the parity bit P 8–15 (regardless of what it was) must be reversed by the EXCLUSIVE OR circuit 16. Thus if there had originally been a parity bit P 8–15 due to the fact that the total number of bits (8–15) was an even number, there would therefore be two inputs present to the EXCLUSIVE OR circuit 16 and so no parity bit P would be generated thereby. Other situations would achieve corresponding results.

In FIG. 42*b* signals are developed on PSW IN KEYS lines 1–4 by corresponding signals on PSW bits lines 8–11 because the key which actually controlls whether or not a reference to memory is to be permitted, is stored in bits 8–11 of the PSW register (in the I unit). As before the remaining bits of the parity checked byte (BITS 12–15) and the parity bit are also received in the BCU so as to adjust the parity bit as described with reference to FIG. 42*a*.

(6.3) STORAGE OUTPUT CIRCUITS (FIG. 11)

Figure 11:
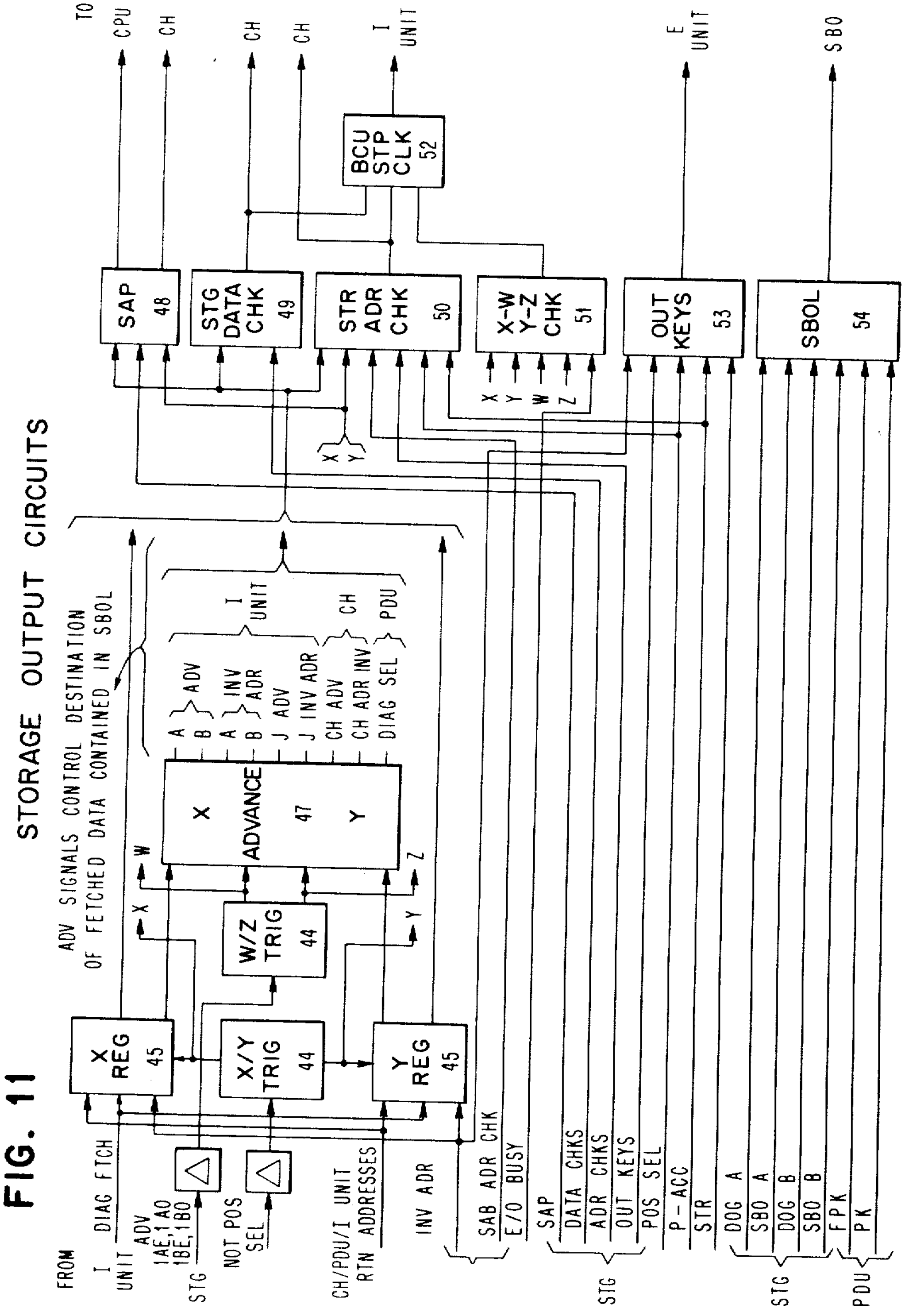

The storage output circuit shown in FIG. 11 respond to control signals from FIG. 9 and FIG. 10 and to outputs from the storage units and from the PDU to recognize error signals, and to return data from storage to the proper requesting locations.

Figure 46:
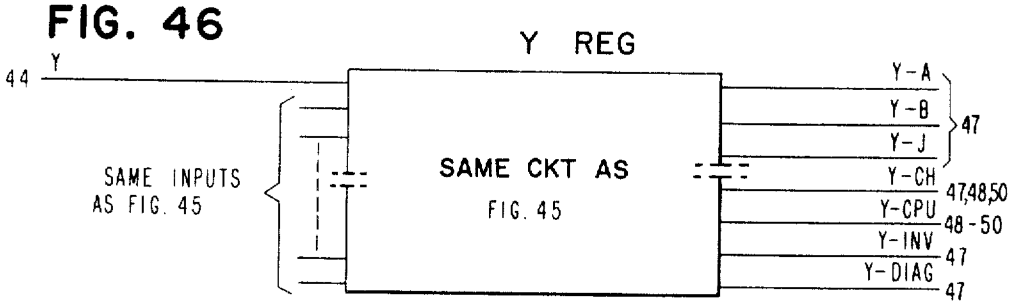
Figure 47:
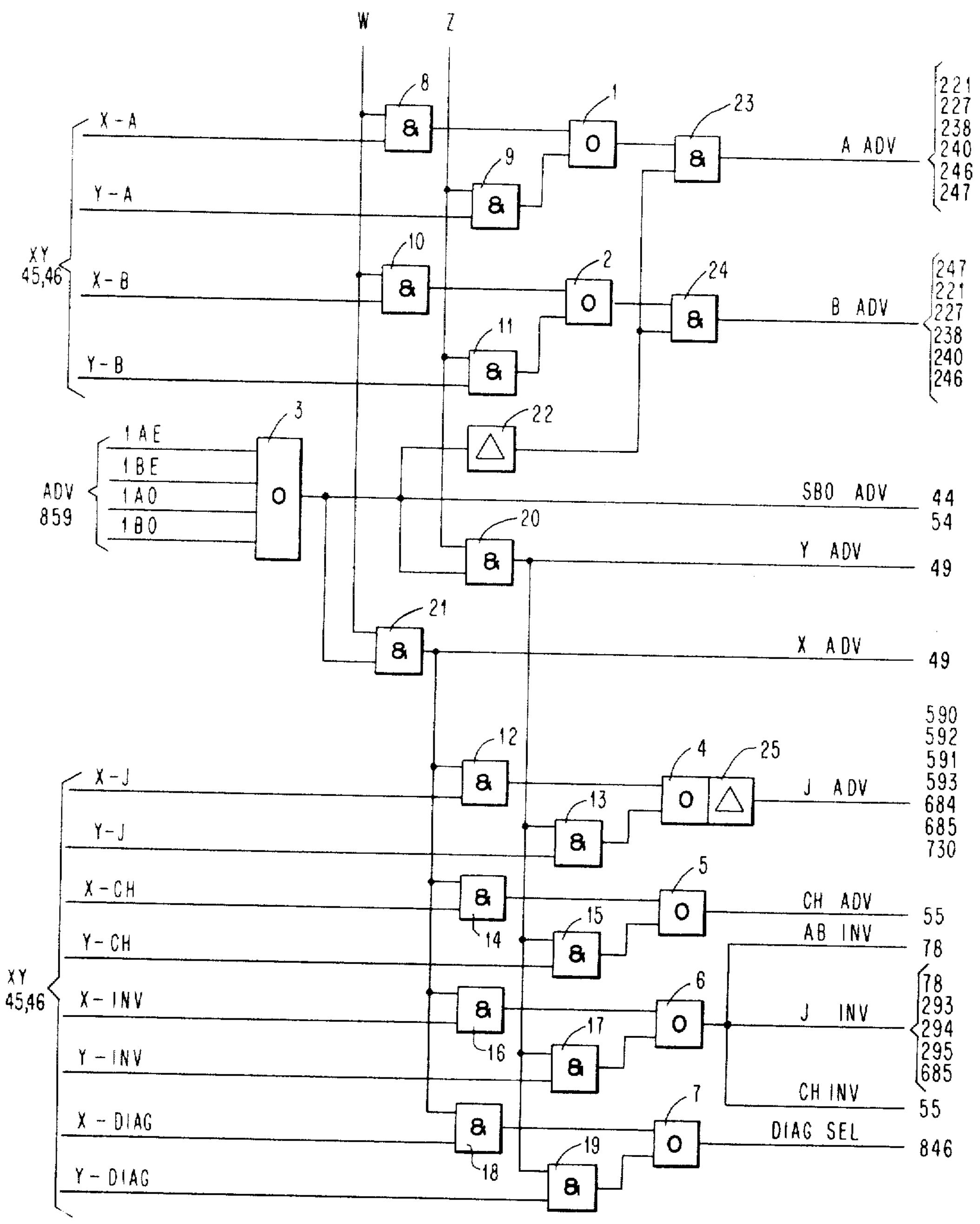
Figure 48:
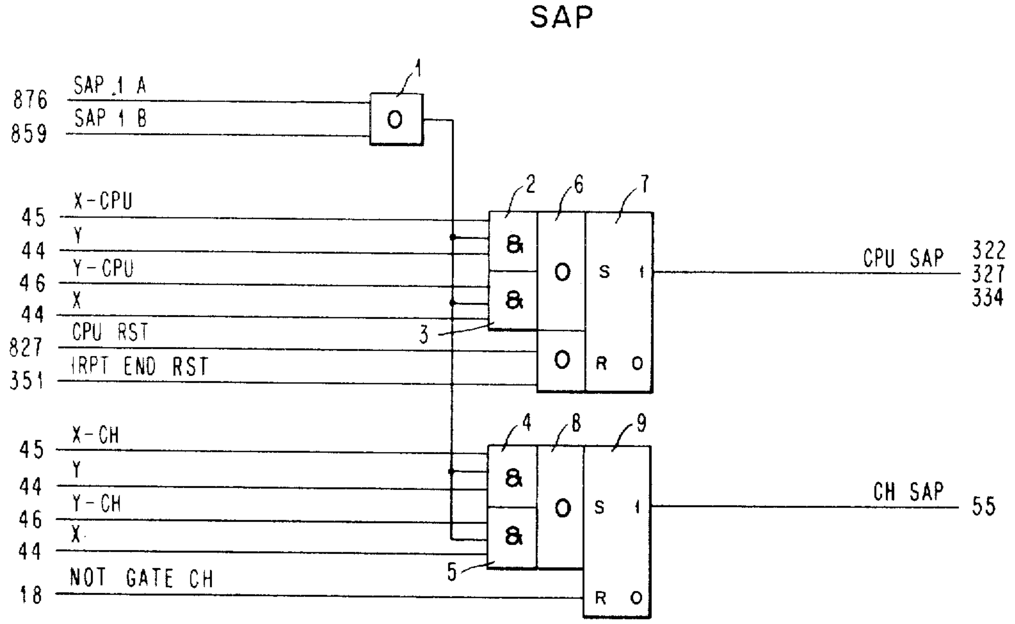
Figure 49:
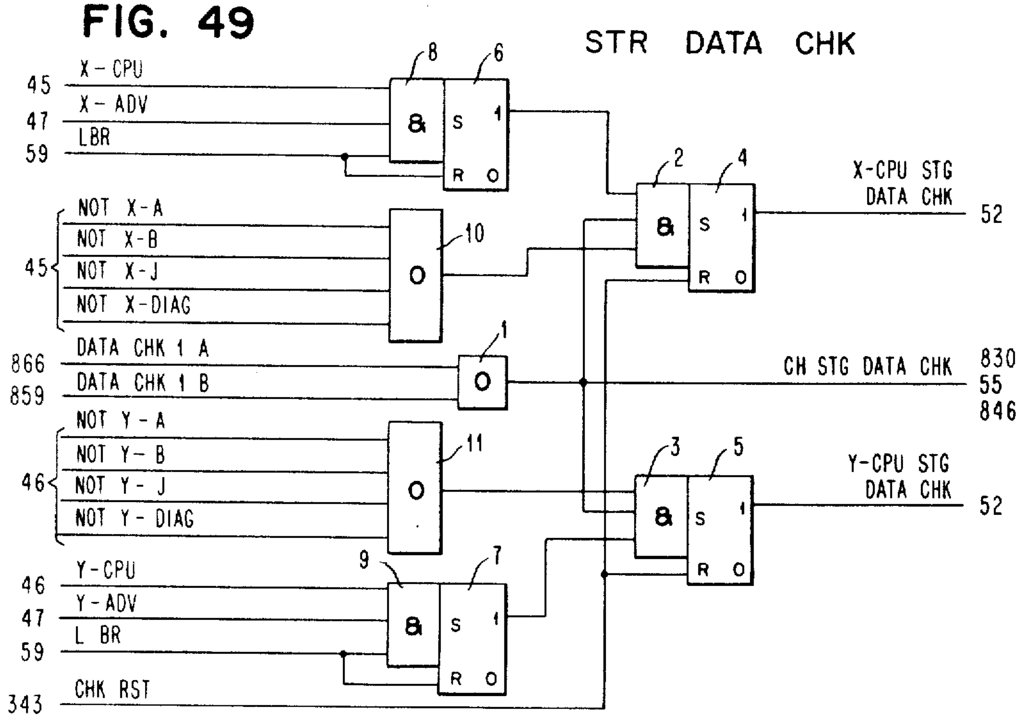
Figure 50:
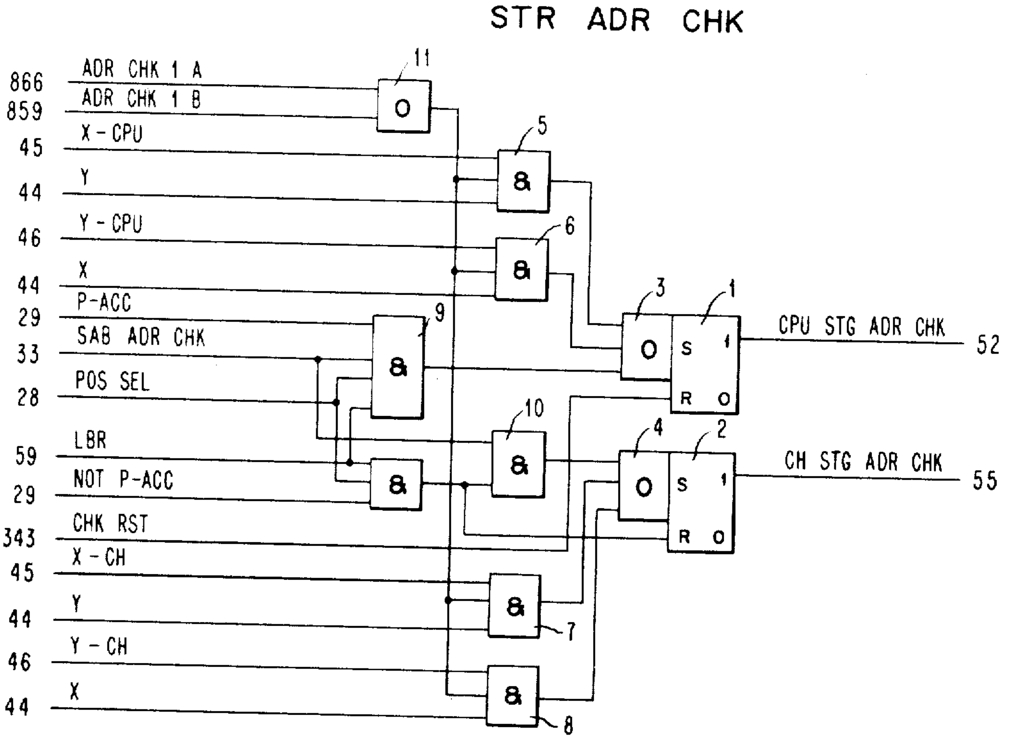
Figure 51:
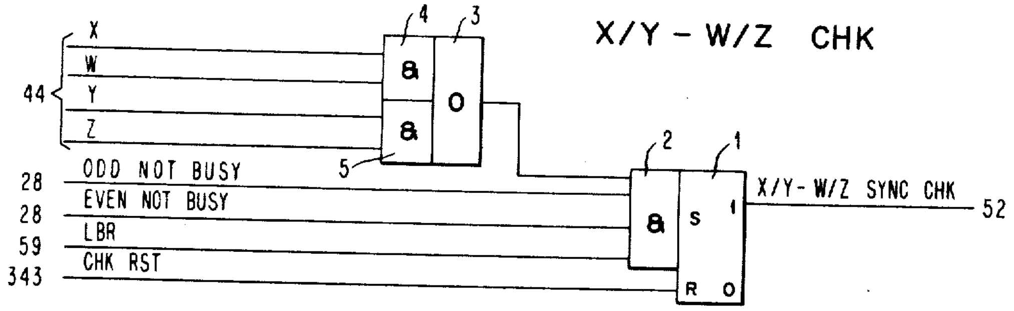

Very briefly, this is achieved by the X/Y–W/Z circuits and the advance circuits, FIG. 44, FIG. 45, FIG. 46 and FIG. 47, which keep track of a requesting unit with respect to returning data, and error conditions resulting from checks performed within storage itself are handled by the SAP (Storage Address Protection) circuit FIG. 48 (which operates in response to a mismatch of storage keys), the STG DATA CHK (Storage Data Check) circuit, FIG. 49, and the STR ADR CHK (storage Address Check) circuit, FIG. 50. In addition, the X/Y–W/Z trigger synchronization is checked by the X–W, Y–Z CHK circuit, FIG. 51. In the event of an error output from any of the circuits, FIG. 49, FIG. 50, FIG. 51, a BCU STP CLK circuit, FIG. 52, will indicate to the I unit that the BCU has an error which should stop the timing clock.

Figure 53:
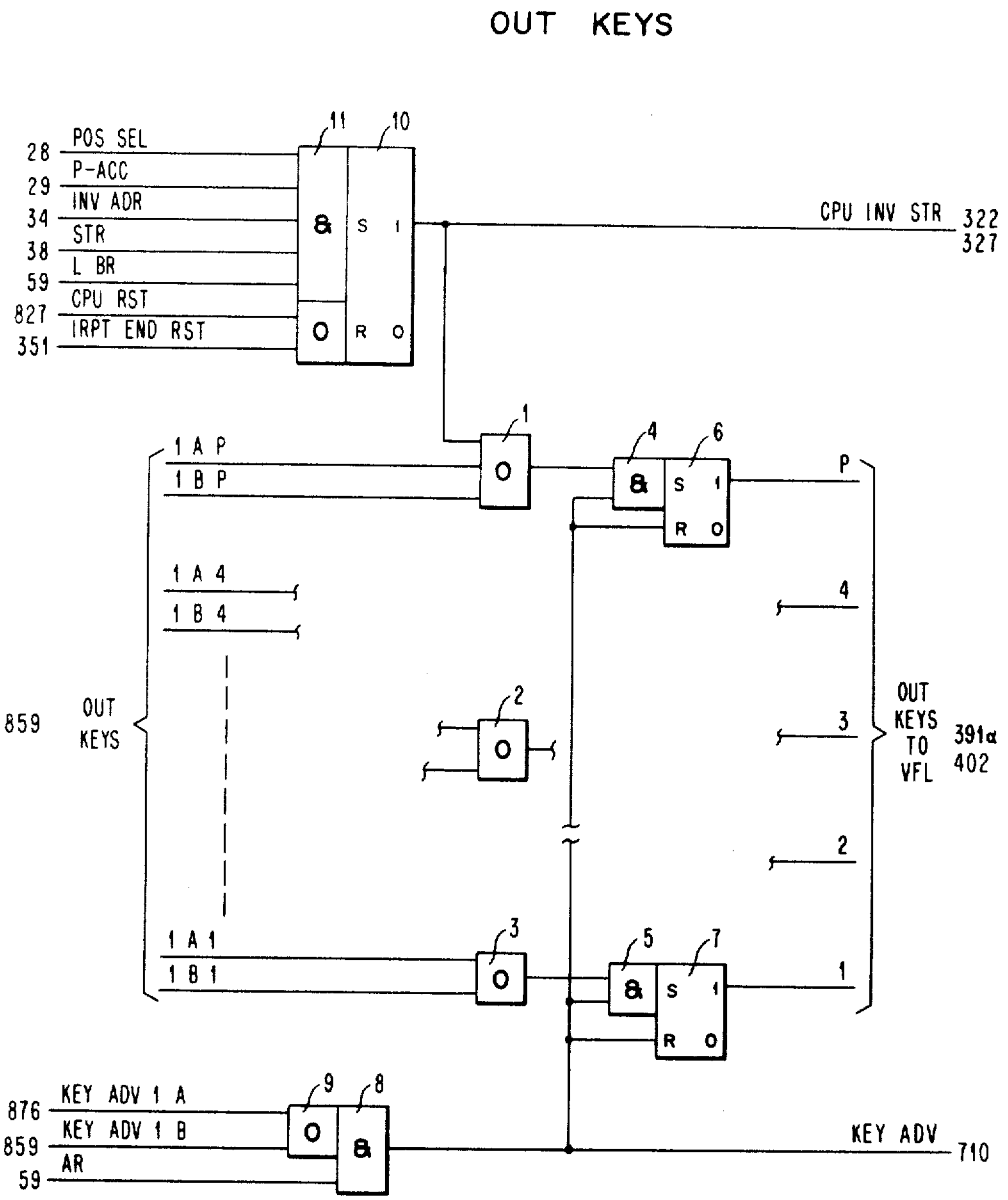
Figure 54:
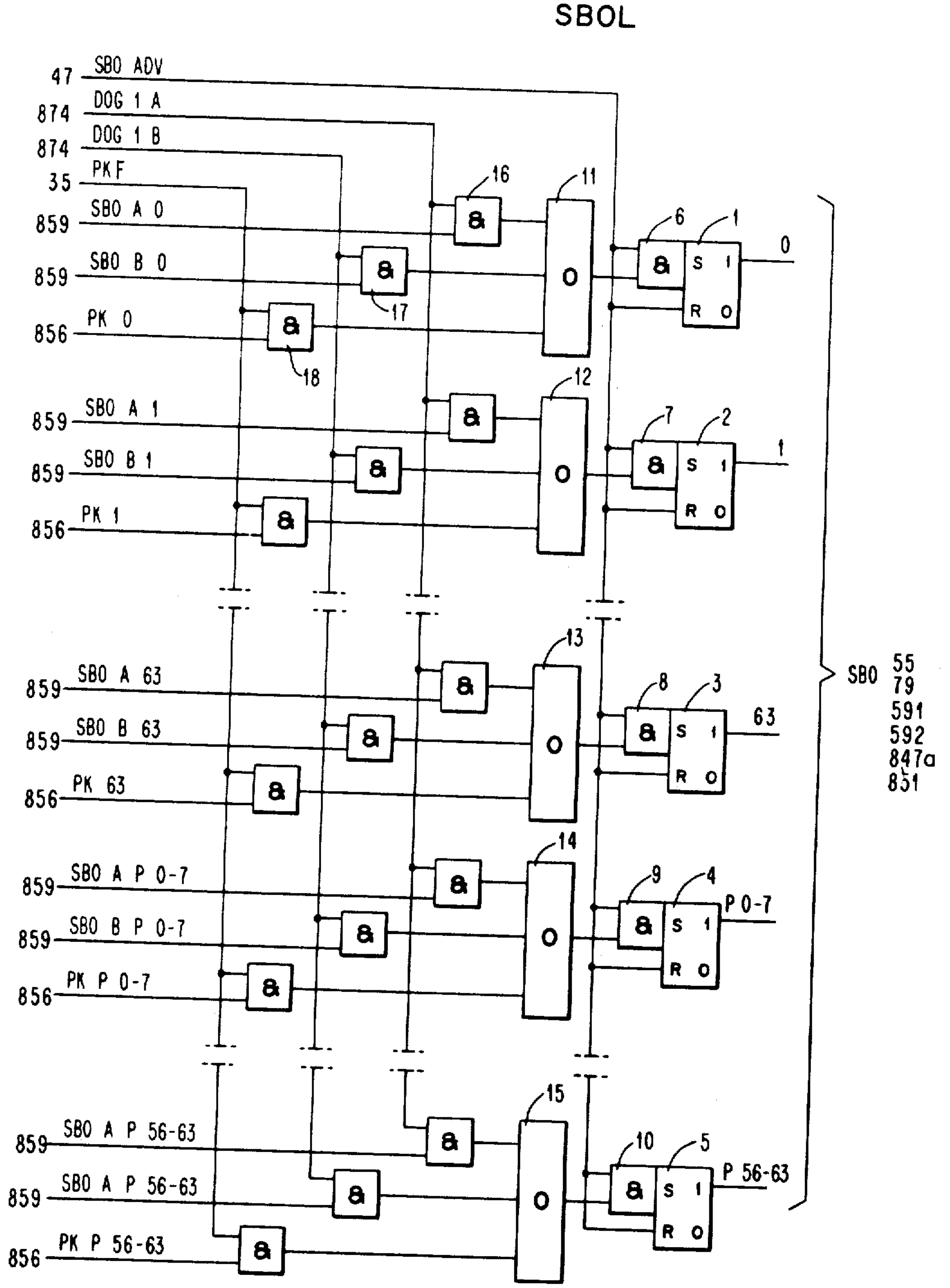

In addition, keys fetched from storage pass through the OUT KEYS circuit, FIG. 53: additionally, data from the panel data keys as well as data fetched from storage will pass through the SBOL (storage bus out latch), FIG. 54. The details of the circuitry of FIG. 11 are described in succeeding sections.

*(6.3.1) Return address timing (FIG. 43)*

Figure 43:
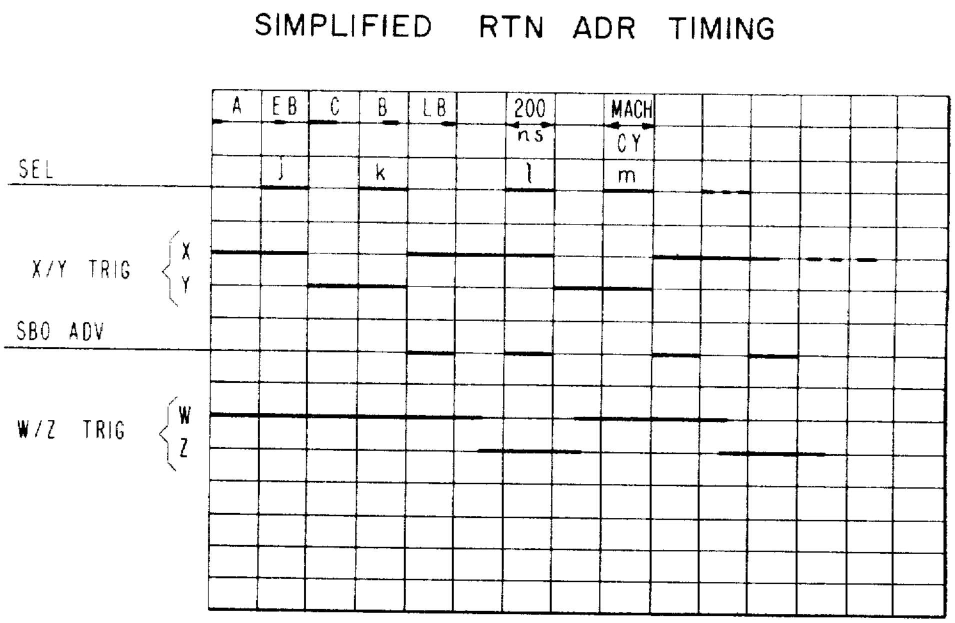

In FIG. 43, three fetches of data are illustrated and are denoted *j, k, l* and *m*. Because of the operation of the cyclic inhibit (which is generated in FIG. 28 and described with reference to the timing diagram of FIG 19 and FIG. 24) a storage fetch request (such as *j*) can be followed two cycles later by a second storage fetch request (such as *k*); thereafter, two cycles must intervene before the next storage fetch (such as *l*) can take place, and then that fetch may be followed after only one cycle by a further storage fetch (such as *m*). As the fetch request for *k* is being made, the storage will be indicating to the BCU that the data requested for *j* is returning to the BCU. It is therefore essential to keep track of which data belongs with which request. The circuitry of FIG. 44, FIG. 47 accommodate this "keeping track."

In FIG. 43, the first select signal takes place in the second machine cycle. Assume, arbitrarily, that the XY trigger was set at X at the start of the operation. Thus the *j* storage fetch is associated with the X side of the X/Y trigger. On the fourth machine cycle a fetch request *k* is recognized as indicated by the select signal in the fourth cycle. Note that by this time, the X/Y trigger has been set to Y (as a direct result of the select signal which denotes the request 4). At the end of the fourth cycle, the storage device has sent back an advance signal as indicated by the SBO ADV signal J (on 5th cycle). Thus although the *k* storage reference is being made during this cycle, the *j* storage reference will be handled by the W trigger, during the next cycle (5th cycle).

After a delay following the *k* select signal in the fourth cycle, the X/Y trigger is flipped back to X (in the fifth cycle). Thus the *l* storage reference, as indicated by the SEL signal in the seventh cycle, will be associated with the X trigger.

Midway in the sixth cycle, the W/Z trigger is flipped to Z after a delay from the SBO ADV signal, and so forth. The X trigger causes a return address (that is an indication of the particular register associated with the fetch) to be stored in an X register. After the X/Y trigger is changed to Y, the next storage request will therefore have information relating to the particular unit which requested the storage fetch stored in a similar Y register.

The W/Z trigger is arranged so that when set to W, it will cause the advance circuit to recognize the setting in the X register, and when set to Z it will cause the advance circuit to recognize the setting in the Y register. Since the X/Y trigger is switched back and forth upon the occurrence of each select signal, this means that every time a storage reference is made, the X/Y trigger will be changed from one state (X or Y) to the other state (Y or X).

Note that even on store operations, where no return data comes from the storage unit, there is still an advance signal which is used to steer addresses, invalid address indications, storage address protection indications and data check indications; there is always an advance signal suitable for switching the W/Z register, so that if store and fetch operations are intermingled, the X/Y–W/Z synchronization will not be lost.

*(6.3.2) X/Y–W/Z triggers (FIG. 44)*

Figure 44:
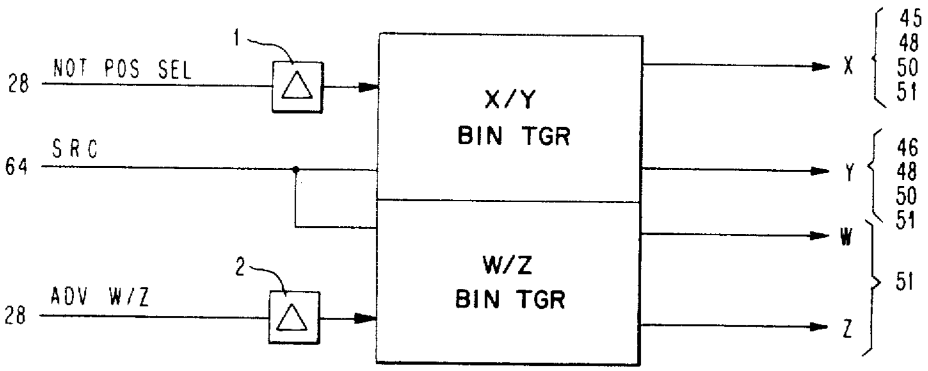

The X/Y and W/Z binary triggers are identical, they provide a change in the output each time that there is a corresponding input signal. For instance, the X/Y binary trigger shown in FIG. 44 will switch from X to Y the first time that a POS SEL signal on the POS SEL line causes a delay unit 1 to provide an input signal to the trigger; thereafter, the next time a signal appears on the POS SEL line so as to cause the delay unit 1 to provide an input to the trigger, the output of the trigger will switch from Y back to X. The W/Z trigger operates in the same fashion except that a delay unit 2 is responsive to an advance on an ADV W/Z line from FIG. 28, said signal being itself delayed from the advance signals from the storage units. The X/Y and W/Z binary triggers are identical to the triggers shown in FIG. 38 and FIG. 39, and described in Section 11*b* of a co-pending application, Ser. No. 332,648 filed Dec. 23, 1963, now Patent 3,270,325, entitled "Parallel Memory, Multiple Processing, Variable Word Length Computer," R. S. Carter and W. R. Welz, assigned to the same assignee as this patent application. In order to connect the circuit of FIG. 27 in said co-pending application so as to utilize it as an X/Y or a W/Z trigger herein, the input applied to blocks 2 and 5 in said co-pending application would be from the delay unit 1 or the delay unit 2 (as the case may be) as shown in FIG. 44 herein, rather than from the AND circuit FIG. 603 in said co-pending application. Also, rather than being reset as shown in said co-pending application, the signal on the SRC line as shown in FIG. 44 would be connected to the various blocks.

Whenever a signal appears on the SRC line, this automatically resets the triggers so that X and W are both set, and on the first activation of either trigger, the trigger will switch from X to Y, and from W to Z, respectively. Notice that it is immaterial to the circuits of FIG. 45–FIG. 47 whether the X and W lines are first activated, or whether the Y and Z lines are first activated; this is so because the X register and Y register are identical, and each of them has an identical circuit input in each of the other circuits, FIG. 47–FIG. 51, which utilize the X/Y triggers.

*(6.3.2.1) X and Y Registers (FIG. 45 and FIG. 46)*

Figure 45:
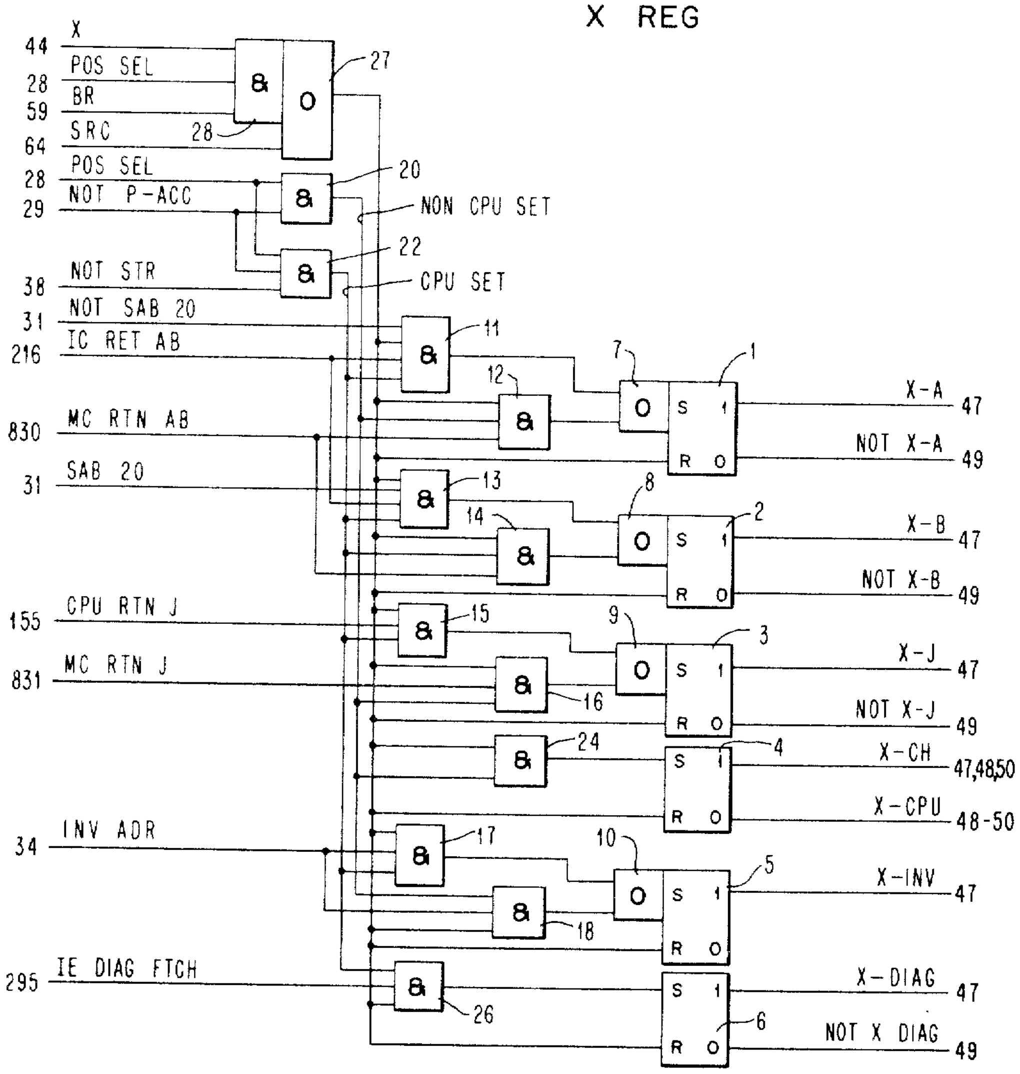

The Y register shown in FIG. 46 is identical in all respects to the X register shown in FIG. 45 with the exception of the fact that it is gated by a Y signal rather than by an X signal and the outputs are oriented with respect to the Y register rather than with the X register.

The X register shown in FIG. 45 comprises essentially six latches 1–6, each respectively corresponding to either a destination for data returning from storage or to a condition which is being gated through the X register due to its relationship to a particular storage operation (in the same fashion that returning data relates to a particular storage operation). Each of the latches 1, 2, 3 and 5 are settable by a corresponding OR circuit 7–10 which responds to either one of two AND circuits 11, 12; 13, 14; 15, 16; 17, 18. The AND circuits 12, 14, 16 and 18 are responsive to a signal on a NON CPU SET line which is generated by an AND circuit 20 in response to signals on POS SEL and NOT P–ACC lines. Whenever there is a signal on NOT P–ACC line, this means that there has not been a CPU storage request recognized which is outstanding. This, in effect, is the same as saying that there has been a mintenance channel fetch or a fetch from the channels 1–6. On the other hand, the circuits 11, 13, 15 and 17 respond to a signal on a CPU SET line from an AND circuit 22 which responds to signals on the POS SEL and P–ACC lines (as does the AND circuit 20) and also responds to a signal on a NOT STR line from FIG. 38 (shown in the storage input circuit block diagram of FIG. 38). In addition, the latch 4 responds to a signal from an AND circuit 24 which is responsive to the NON-CPU set line, and the latch is responsive to an AND circuit 26 which responds to the CPU SET line. All of the AND circuits 11–18, 24 and 26 are responsive to a gating signal generated by an OR circuit 27 in response to either a signal on the SRC line or to the output of an AND circuit 28. The AND circuit 28 responds to a signal on the X line from the *X/Y* trigger of FIG. 44 along with a signal on the POS SEL line and a B running clock signal (on the BR line).

The latches 1, 2 are set when data passing through the X register is to be returned to the A and/or B registers in the I unit. The A and B registers are used to temporarily store instructions fetched from storage. Each register is capable of holding a full storage word (a double word as defined hereinbefore) of 64 bits of data and 8 parity bits. The A register is used to store data returning from an even storage unit, and the B register is used to store data returning from an odd storage unit. The AND circuits 11 and 13 are both operated by a signal on an IC RET AB (CPU return to A or B registers) line. This line is brought up within the I unit whenever an instruction fetch is made so as to indicate to the BCU, and most particularly to the X, Y registers that the data being fetched is instruction data, and is to be returned to either the A or B registers in dependence upon whether an even or an odd address, respectively, were used in accessing the instruction. Thus, the selection between latch 1 and latch 2 via the AND circuit 11 and 13 is based on whether or not there is a ONE in the bit 20 position of the storage address bus. A signal on the NOT SAB 20 line to AND circuit 11 will cause AND circuit 11 rather than AND circuit 13 to operate, and conversely, a ONE in bit position 20 of the storage address bus will cause a signal to be present on the SAB 20 line which feeds AND circuit FIG. 13. The other inputs to the latches 1, 2 are from the MC channel in the PDU. In case a double word of data (64 data bits plus 8 parity bits) is being returned on the maintenance channel, an MC RTN AB signal will cause both the AND circuits 12, 14 to set the latches 1, 2, so that there will be developed an X–A and X–B signal at the output thereof to cause this data to be stored in both the A register and the B register simultaneously.

The latch 3 is operated in essentially the same fashion as the latches 1, 2 with the exception of the fact that, since it represents but a single register, no address bit information is required (such as SAB 20) into the AND circuits 15, 16. Since all non-instruction data which is fetched for the CPU (with the exception of maintenance operations) returns to the J register in the E unit, the I unit always causes non-instruction fetches to send a signal on the CPU RTN J (CPU requests return to J register) line. If on the other hand, certain maintenance operations (see Table of Contents) are being performed, a signal will be developed on an MC RTN J (maintenance channel return to J register) line to the AND circuit 16.

The latch 5 is similar to the latch 3 in its operation with the exception of the fact that a single gating line will operate the latch regardless of whether the NON-CPU set line or the CPU SET line has the controlling gating signal thereon. In this case, it is not a return address control signal that energizes one of the AND CIRCUITS 17, 18; rather, it is the fact that an invalid address has been sensed by one of the storage units; the effect of this invalid address is properly oriented with respect to the particular storage access which caused it, by gating it through the X or the Y register, as the case may be. The function of the latch 5 is not so much to orient the invalid address signal with respect to a particular circuit, but rather to gate it through at the proper time so that it will be returning to several circuits simultaneously but at a time when the data which would otherwise have been fetched (had there not been an invalid address) would be returning to the particular location. This is discussed in more detail in Section 6.3.2.2 with respect to the advance circuit of FIG. 47.

The latch 4 is operated by an AND circuit 24 in response to the signal on the NON-CPU set line from the AND circuit 20. In other words, the latch 4 will be set in all NON-CPU cases, even though it may be either a maintenance channel operation or an actual channel request which is associated with a particular storage request that is using the X register. Even in store operations, the latch 4 will be operated so as to provide a signal to steer address error, data errors or storage address protection indications to the channel. During maintenance operations which would operate the AND circuits 12, 16, and 18 the AND circuit 24 will also be operated; this is so because of the fact that data may be returned to the channel even though fetched for a maintenance channel operation, without interfering with channel operation since there will be no particular channel request outstanding to gate data into any one of the channels.

The latch 6 recognizes a special situation when the CPU is involved in a diagnostic fetch operation, and, as is described in Section 6.3.2.2 with respect to the advance circuit, FIG. 47, this latch contributes to the generation of a diagnostic select signal indicative of the fact that a diagnostic reference to storage has taken place.

*(6.3.2.2) X/Y Advance Circuit (FIG. 47)*

"Advance" as used in the bus control unit means a signal indicating that storage has reached a near-completion point in either a store or a fetch cycle. Stated alternatively, advance comprises an input gate signal for a register with respect to data which has come from storage or errors related thereto. The advance signal, of course, denotes a point in a storage cycle of operation which can be recognized as a point where data is or will be (within a known increment of time) available to the requesting unit.

In FIG. 47 a plurality of OR circuits 1–7 each generate a respective advance signal, each one corresponding to the output of either the X register or the Y register as selected by a signal from W or Z side of the W/Z trigger of FIG. 44. The OR circuit 3 responds to an advance signal from any one of the four storage units so as to generate a signal on an SBO ADV line, which is used to fetch data into the SBOL (storage bus out latch) from any one of the storage units without regard to the destination of the data (such as the channel, or the A and B registers in the I unit, or the J register in the E unit). Each of the OR circuits 1, 2, 4–7 responds to either one of a pair of respectively corresponding AND circuits 8, 9; 10, 11; 12, 13; 14, 15; 16, 17; 18, 19, in dependence upon whether the W or Z side of the W/Z trigger, respectively, is presenting a signal on the W line or the Z line. The AND circuits 8–11 are operated directly by signals on the W and Z lines, whereas the AND circuits 12–19 are operated by signals on a Y ADV line or an X ADV line, respectively, which are generated by corresponding AND circuits 20, 21. This difference is due to the fact that the SBO ADV signal is used directly in gating the AND circuits 12–19, but it is passed through a delay unit 22 prior to being utilized by a pair of AND circuits 23, 24 to gate the signals on the A ADV and B ADV lines respectively.

The A ADV and B ADV signals are delayed at the gates 23, 24 by the delay unit 22 because of the fact that the A register and the B register are in such close proximity with respect to the bus control unit that the advance signals would appear at the A and B registers prior to the time that data would be available thereto if it were not for this delay. Similarly, the signal on the J advance line is provided by a delay unit 25 in response to the OR circuit 4, this delay unit being of a somewhat lesser delay than the delay unit 22 due to the fact that the J register is not quite as close as are the A and B registers. Of course, if a different arrangement of hardware within the frame work were provided, the delay characteristics of the circuit of FIG. 47 could be entirely different. The channels, which are located remotely of the CPU frame do not require delaying and therefore the OR circuit 5 develops a signal directly on the channel advance line. The OR circuit 6 takes an invalid address indication from either the X register or the Y register and develops a signal on each of three lines AB INV, J INV, CH INV, to indicate to all of these units that an invalid address has been sensed, without regard to which unit it was that initiated the storage request designated by a faulty address. As mentioned in Section 6.3.2.1, the OR circuit 7 generates a signal on a DIAG SEL (diagnostic select) line which indicates to the PDU that a diagnostic reference to storage has been accepted for a Diagnose instruction. The even numbered AND circuits 8–18 are all responsive to the X-register whereas the odd numbered AND circuits 9–19 are all responsive to the Y-register. The X-register is gated by a signal on the W line whereas the Y-register is gated by a signal on the Z line. The reason for this is clarified by a reconsideration of the timing diagram of FIG. 43. A fetch made while the X/Y trigger is set to X will cause an advance signal from storage; this will occur while the W/Z trigger is set to W. Since the select signal which relates to the fetch will then cause the X/Y trigger to be reset (after a half cycle delay) the next storage reference will be made when the X/Y trigger is set to Y. Similarly, since the advance signal causes the switching of the W/Z trigger from W to Z (after a half cycle delay), the next advance signal will appear during the time that the W/Z trigger is set to Z. Thus, selection of storage in accompaniment with an X signal results in a return from storage in accompaniment with a W signal; selection of storage with Y signal will result in an advance (or return) from storage with a Z signal.

*(6.3.2.3) Summation of X/Y–W/Z circuits (FIG. 42 and FIGS. 43 through 47)*

The X/Y–W/Z and Advance circuits also control the return of error signals from the storage units in the circuits of FIGS. 48 through 50.

The X/Y–W/Z and advance circuits therefore provide for keeping track of the location of origination of a storage request, and control destination of stored data and/or check conditions *without* tying the circuits directly to the particular storage which was referenced. In other words, the circuits of FIGS. 43 through 51 are not concerned with whether an even or odd storage unit was utilized. Thus there has been avoided the necessity of identifying (to the storage output circuits of FIG. 11) the particular storage unit which was referenced (by the circuits of FIG. 9) in order to keep track of the alternating storage references which are being made.

(6.3.3) BCU CHECKING CIRCUITS

*(6.3.3.1) Storage address protection circuit (FIG. 48)*

In the storage units, the key corresponding to a block of storage locations is compared against a key from the program status word within the I unit whenever a store operation (and not a fetch operation) is involved. In the event that either set of keys is not all zeroes and does not match the other set of keys, there will be a signal generated on the storage protection line for the related storage frame 1A or 1B. For instance, in FIG. 48, an OR circuit 1 will respond to signals on an SAP 1A or an SAP 1B line. The system does not care whether storage unit 1A or storage unit 1B was referenced with erroneous keys, but it does have to insure that a storage address protection error indication is gated to the proper unit: to the channel or to the CPU.

A storage address protection error signal resulting from an erroneous set of keys sent from a channel (in connection with a channel reference of storage) is recognized at the channel, due to the fact that the channel responds differenently to errors which it has created; in other words, the I unit of the CPU does not handle error indications from the channel; rather, a channel handles its own error indications. This is necessarily so since any single channel which causes an error should not cause stopping of the CPU or prevent other channels from referencing storage.

To accommodate these needs, the output of the OR circuit 1 is passed to four AND circuits 2–5 which are operated by signals on the X–CPU and Y lines, respectively. The reason for this arrangement of X and Y input signals is that a storage address protection signal on one of the lines SAP 1A or SAP 1B is not received until more than a half cycle after the select signal goes out to the storage unit. Therefore, it is evident that the X/Y trigger will have its state reversed by the time that an SAP signal can be received in the circuit of FIG. 48. Thus, if X–CPU selection (which is generated in FIG. 45 by the off-side of the X–CH latch 4) is apparent at the input to the AND circuit 2, and the X/Y trigger has been set to Y, and it is known that more than a half cycle has passed from a select signal for a CPU reference to storage. The other AND circuits operate in a corresponding fashion for the Y register and for the channel in various combinations. The AND circuits 2, 3 operate an OR circuit 6 which sets a latch 7; the AND circuits 4, 5 operate on OR circuit 8 which sets a latch 9. The latch 7 is reset either by a CPU reset signal on a CPU RST line (a special reset condition generated in the I unit), or by a signal on an IRPT END RST line from the I unit (which indicates the end of an interrupt handling routine). The latch 9 is reset by a signal on the NOT GATE CH line which is generated in FIG. 18. Thus, the latch 9 will remain set until a following time when the channel is to be gated due to a new storage reference initiated by the channel. Note that the signal on the NOT GATE CH line will have disappeared by the time that a signal could appear on one of the SAP lines at the OR circuit 1 due to the fact that, in FIG. 18, the CH REQ signal input to the AND circuits, 1, 2, will have disappeared due to the resetting, in FIG. 17, of the latch 1 by a signal on the BR line, B time being the third quarter of each cycle which is right after the X/Y trigger has been switched from X to Y. Thus, by the time that a signal could appear on the SAP 1A line or the SAP 1B line, the NOT gate signal has disappeared; therefore, the latch 9 will not be reset until the next time that a channel selection takes place. The usage of the signal on the CPU SAP line is described in the interrupt section of said environmental system. The usage of the CH SAP line is described in the aforementioned co-pending application, Ser. No. 357,369, filed Apr. 6, 1964, Automatic Channel Apparatus, L. E. King, W. C. Hoskinson and E. J. Annunziata.

*(6.3.3.2) Storage data check circuit (FIG. 49)*

Each of the storage frames 1A, 1B check incoming and outgoing data, data on the SBO. However, data checks performed on the SBO are ignored by the CPU and the channel since these data checks would involve, many times, data which never could be used because of the fact that a branch operation, or a preceding interrupt operation, has caused the system to leave that point in the program the anticipation of which has caused the fetching of the data. On store operations, however, the fact that the storage device has sensed erroneous data is utilized by the channels and the CPU; the use of this storage data check is different for the CPU than for the channel.

In FIG. 49 an OR circuit 1 responds to a signal on a DATA CHK 1A line or on a DATA CHK 1B line to provide an input to each of two AND circuits 2, 3 and to provide a signal on a CH STG DATA CHK (channel storage data check) line. The AND circuits 2, 3 operate corresponding latches 4, 5 to provide timing synchonization for CPU storage data checks; on the other hand, the storage data check is sent directly to the channel at all times, because of the fact that the channels themselves have synchronizing circuitry so that any particular one of the channels will be able to respond to a storage data check signal output from the OR circuit 1 only if that particular channel had previously received an advance signal from storage, said advance signal being the output of OR circuit 5 in FIG. 47. In the case of the CPU, by the time that the data check 1A or data check 1B lines could have signals thereon, the CPU advance signals may already be dissipated. This is true because of the fact that the data check signals are very late in the storage operation in comparison with the advance signal. Therefore, the effect of a CPU advance is stored in a pair of latches 6, 7. The latch 6 is set by corresponding AND circuit 8 in response to signals on the X–CPU line (from FIG. 45) the X–ADV line (from FIG. 47) and a late B timing signal on the LBR line. The latch 7 is set by an AND circuit 9 in response to signals on the Y–CPU line (from FIG. 46) and the Y ADV line (from FIG. 47 and a late B timing signal on the LBR line. Thus, the latch 6 or the latch 7 will be operated during a CPU access in dependence on whether the X or Y advance is up, respectively; said latches being set at the start of late B time and remaining set until the start of the following late B time. Referring to FIG. 43, it can be seen that this therefore will cause an X or Y advance which appears simultaneously with the SBO advance to be registered at late B in the cycle and to remain registered until late B in the following cycle even though the advance signal is on from the start of B time in one cycle to the start of the following B time in the next cycle; in other words, a quarter cycle delay is provided by the latches 6, 7. The AND circuit 2, 3 also respond to corresponding OR circuits 10, 11 which recognize the CPU operations that result from a fetch. Particularly, NOT X–A,B,J,DIAG and not Y–A,B,J, and DIAG are indicative of the fact that neither an I, E or diagnostic FETCH has been made; if this is true and the CPU has however accessed storage, then it must have been a CPU store operation. The OR circuits 10, 11 are used to ascertain this fact due to the fact that the storage data check signal to the OR circuit 1 arrive so late in a storage cycle that the selection for a next storage access could be taking place, and that the store circuit of FIG. 38 can no longer be relied upon to reflect the storage operations for the following access. The latches 4, 5 are reset by a signal on a CHK RST line which indicates that the error which was sensed has been handled, and all of the error circuitry involved is to be reset. The details of the signal on this line are developed more fully with respect to the I unit, for which preference may be made to the Table of Contents.

*(6.3.3.3) Storage address check circuit (FIG. 50)*

The storage address check circuit of FIG. 50 is similar to the storage address protection circuit of FIG. 48. Specifically, a signal will be generated on a CPU STG ADR CHK (CPU Storage Address Check) line by a latch 1, or a signal will be generated on a CH STG ADR CHK line by a latch 2, alternatively, in dependence upon whether the address error sensed in a storage unit relates to a CPU reference to storage or to a channel reference to storage, respectively. Each of the latches 1, 2 is set by a corresponding OR circuit 3, 4 in response to either one of a pair of related AND circuits 5, 6 and 7, 8 respectively. The OR circuits 3, 4 also respond to corresponding AND circuits 9, 10 which provide gating signals for the respective latches. All of the AND circuits 5–8 are responsive to an OR circuit 11 which responds to a signal on either an ADR CHK 1A (Address Check from storage frame 1A) line or on an ADR CHK 1B (from storage frame 1B) line. Thus, the OR circuit 11 indicates to the AND circuits 5–8 that an erroneous address has been sensed in one of the storage frames; the identity of the storage frame in which the error was sensed is not important; however, it is important to ascertain whether this resulted from a reference by the CPU or from a reference by one of the channels. Therefore, the AND circuits 5–8 combine the output of the OR circuit 11 with signals on lines from the X/Y and advance circuits of FIG. 44 through FIG. 47.

Specifically, the AND circuit 5 responds to signals on the X–CPU and Y lines, whereas the AND circuit 1 responds to signals on the Y–CPU and X lines. Similarly, the AND circuit 7 responds to signals on the X–CH and Y lines and the AND circuit 8 responds to signals on the Y–CH and X lines. The reason for pairing X–CPU and X–CH signals with Y signals is the same as described hereinbefore: specifically, by the time that an address check signal can be received in the circuit of FIG. 50, the X/Y trigger will have been switched from X to Y (in the case of a request which is recognized in the X register); therefore, it is known that the opposite side of the trigger must be used in order to properly relate the address check signals arriving at the OR circuit 11 with requests from the CPU or from the channel, alternatively. The signal on the CPU STG ADR CHK is utilized in FIG. 52 described in Section 6.3.3.5 hereinafter. The signal on the CH STR ADG CHK line is utilized in the channel as described in said co-pending application, Ser. No. 357,369.

*(6.3.3.4) X/Y–W/Z Check circuit (FIG. 51)*

The operation of the X/Y–W/Z trigger in controlling the the X and Y registers is described in detail in the foregoing sections. However, should there be some sort of malfunction whereby a select signal is not followed by a respectively corresponding advance signal from storage, or whereby operation of the triggers themselves becomes faulty, it is possible that the X/Y and W/Z triggers could fall out of synchronization with one another. The circuit of FIG. 51 will operate, at a time when none of the storage units are busy, to check the synchronism of the X/Y and W/Z triggers. Specifically, a signal indicating an error in this synchronization is generated on an X/Y–W/Z SYNC CHK (synchronization check) line by a latch 1 which is set in response to an AND circuit 2 that operates under control of an OR circuit 3 in dependence upon either one of two AND circuits 4, 5. The AND circuit 4 responds to concurrent presence of signals on the X and Z lines, and the AND circuit 5 responds to signals on the Y and W lines. Thus, the OR circuit 3 will receive an input from both of the AND circuits 4, 5 each time that the W/Z trigger is set to W concurrently with the X/Z trigger being set to Y. However, the AND circuit 2 prevents the output of the OR circuit 3 from setting the latch 1 except at late B time (due to a signal on the LBR line) during a cycle in which there are signals present on both an ODD NOT BUSY line and an EVEN NOT BUSY line. In other words, when the X/Y register circuits are in a quiescent state, due to the lack of outstanding storage operations being performed, then the AND circuit 2 will permit the latch 1 to sample the condition of the OR circuit 3. This time (odd and even not busy) is a time when this relation can easily be identified, and if both outputs of a trigger are off together, no error signal will result; however, this can only occur for a simultaneous failure of two circuits (ANDS and ORS), so such a failure is rather unlikely. It should be noted that if one of the triggers X/Y, W/Z fails such that both outputs of the trigger come up at one time, then one of the AND circuits 4, 5 will provide an error signal. The latch 1 is reset by a signal on a CHK RST (Check Reset) line supplied by the I unit.

*(6.3.3.5) BCU stop clock circuit (FIG. 52)*

Figure 52:
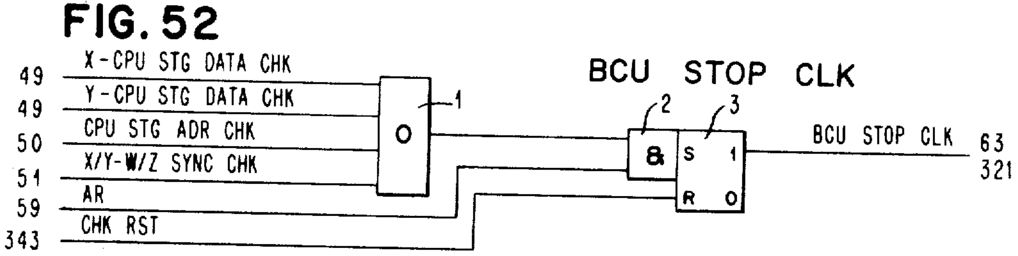

The output of each of the circuits 49–51 is supplied to the BCU STP CLK circuit of FIG. 52. These signals are received on corresponding lines by an OR circuit 1 which supplies an AND circuit 2 so as to set a latch 3 with the concurrent presence of an A running clock pulse signal on an AR line. The latch 3 generates a BCU Stop Clock signal on a BCU STOP CLK line. The latch 3 is reset by a signal on the CHK RST line from the 1 unit.

(6.3.4) OUT KEYS (FIG. 53)

Each of the storage frames, 1A, 1B can respond to an INSERT KEYS instruction from the CPU to fetch from storage, a particular block of storage locations. Specifically, signals representing keys from storage frame 1A may be received by a plurality of OR circuits 1–3 on corresponding out keys lines 1AP, 1A4, . . . 1A1. The OR circuits 1–3 will also respond to signals from storage frame 1B on a plurality of corresponding out key lines 1BP, 1B4, . . . 1B1. The OR circuits 1, 2, 3 each supply a signal to a corresponding AND circuit 4, 5 so as to set a related latch 6, 7 in dependence upon the concurrent presence of a signal from an AND circuit 8. The AND circuit 8 responds to an OR circuit 9 whenever there is a signal on either one of two lines; KEY ADV 1A, KEY ADV 1B, which denote that valid key manifestations have been delivered on the OUT KEYS lines by a storage unit within the respective storage frame 1A, 1B. The AND circuit 8 is gated at A time by an A running clock pulse on the AR line. The output of the AND circuit 8 is also used to reset the latches 6, 7 so that the latches 6, 7 will be set at the start of A time and will remain set until the start of a following A time.

The OR circuit 1 also has an input on a CPU INV STR (CPU invalid storage) line from a latch 10 which is set by an AND circuit 11. The AND circuit 11 responds to signals on the following lines POS SEL, P–ACC, INV ADR, STR and LBR. Thus, the AND circuit 11 will be operative during a CPU(P–ACC) storage reference (POS SEL) during a store operation (STR) whenever the storage request includes an invalid address (INV ADR). The latch 10 set at late B time. The latch 10 is reset by signals on a CPU RST (reset) line or an IRPT END RST (interrupt end) line from the I unit. Thus, if an invalid CPU storage request is made, the latch 10 will be set early in the CPU storage operations and will remain set until much later in the operation (several cycles later) so that it will be supplying an input to the OR circuit 1 to thereby gate the AND circuit 4 at A time when the KEY ADV signal is received by the OR circuit 9. The purpose of connecting the latch 10 to OR circuit 1 is to provide a parity bit on the OUT KEYS TO VFL P line when no keys are in fact received from the storage unit, due to the fact that an invalid address was sensed. This prevents a parity check indication resulting from checking the parity of the outkeys to VFL lines from masking the CPU invalid storage indication which is sent to the I unit over the CPU INV STR line.

(6.3.5) STORAGE BUS OUT LATCH CIRCUIT (FIG. 54)

The storage bus out latch in FIG. 54 comprises essentially a plurality of latches 1–5 each of which is set by corresponding AND circuit 6–10 in response to a related OR circuit 11–15. The AND circuits 6–10 also respond to a signal on the SBO ADV (storage bus out advance) line which is generated in the advance circuit of FIG. 47. This signal is indicative of the fact that the storage unit is sending data to the BCU and that said data can be sampled.

Each of the OR circuits 11–15 responds to one of three related AND circuits such as AND circuit 16, 17, and 18 for the OR circuit 11. Each of the AND circuits is gated by a different line in dependence upon the source of information which is to be received in the SBOL. For instance the AND circuit 16 is gated by a data out gate signal for storage frame 1A on a DOG 1A line, the AND circuit 17 is gated by a data out gate signal for storage frame 1B on the DOG 1B line, and the AND circuit 18 is gated by a signal on the PKF line (from FIG. 35) which indicates that data is to be received on the storage bus out from the panel data keys in the PDU. The other inputs to the AND circuit are the actual data bits; for instance the AND circuit 16 responds to bit 0 signal from the storage bus out of storage frame 1A on an SBO A 0 line; an AND circuit 17 responds to an SBO B 0 line; and AND circuit 18 responds to a PK 0 line, which supplies a zero bit signal from the panel data keys during a panel key fetch. The operation of the remainder of the circuit is similar and obvious with respect to the above description.

(6.3.6) RESET CIRCUITS

*(6.3.6.1) Computer reset control*

Figure 41:
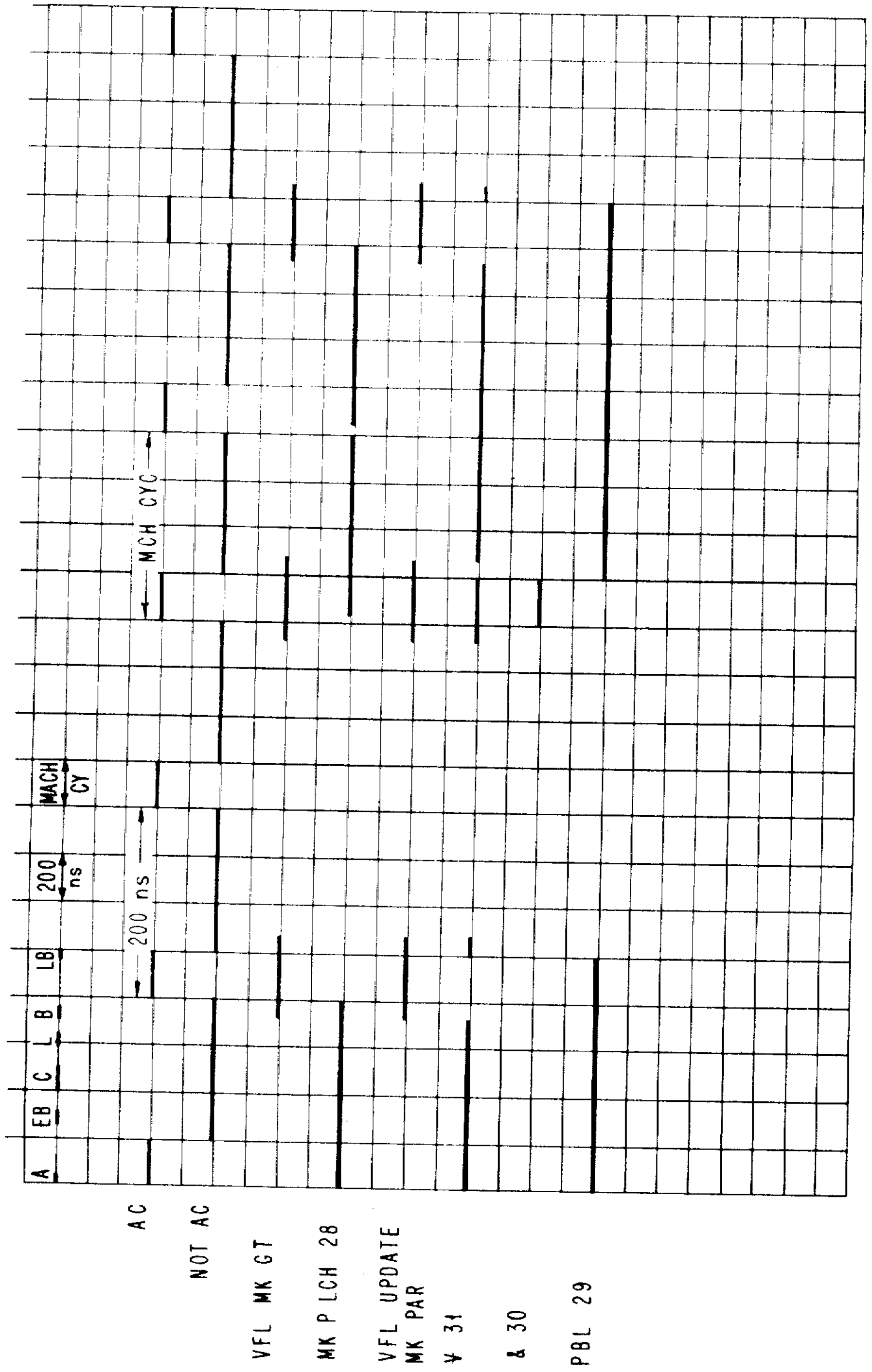

The computer reset control is a special resetting signal line which appears prior to B time of a final controlled machine cycle before the clock is stopped (that is, before the controlled timing signal AC is halted as shown in FIG. 41). Computer reset control is used only in the accept circuit and in the PKF-CANCEL circuit of FIG. 29 and FIG. 35 respectively. The computer reset control signal (on the CRC line) remains present for approximately four microseconds. This is aproximately four storage cycles, or twenty machine cycles. This signal is used to perform a cancel operation if the BCU had initiated a storage reference for the CPU during this last cycle before the clock has stopped. Whenever there is a CRC signal, there will also be a check reset signal (although the converse is not true). The computer reset control signal on the CRC line is used at FIG. 29 to reset the accept latch. Notice however, that it does not reset the pulse accept latch; this is because pulse accept is used to continue control over the BCU as described in Section 6.1.1.4 hereinbefore.

The computer reset control signal on the CRC line is used in FIG. 35 to directly cause an AND circuit 4 to generate a cancel if there is a signal on the P–ACC line indicating a CPU storage reference has been initiated within the last cycle. This CANCEL insures storage is not destroyed if the reference was a store (store data is not available until one cycle after retiming).

*(6.3.6.2) System reset control*

The System Reset Control signal on the SRC line is a special reset signal which arrives at the BCU prior to B time of a last running machine cycle (that is the last machine cycle before CR, AR, EBR, BR, and LBR running clock signals will all be stopped). In other words, SRC heralds the shutting down or stopping of the system as is described in more detail with respect to the I Clock, for which reference may be made to the said environmental system. In FIG. 12, the system reset control signal on the SRC line is used to reset the channel priority latches 1 at LBR time so that when the system is again started, the latches will be ready to respond to channel storage requests.

This system reset control signal on the SRC line is used in FIG. 17 to reset the channel request latch 3 and in FIG. 28 to reset the latches 1, 2 at A time (AR line), which are used to set the odd and even busy latches. The SRC line is used in FIG. 35 to initiate a cancel operation and in FIG. 44 to reset the X/Y and W/Z triggers, and is used in FIG. 45 and FIG. 46 to reset all of the latches 1–6. Note that this is on a combined set and reset line, but the gating of the setting AND circuits 11–18, 24, and 26 will be ineffective since there will be no other inputs to these AND circuits at the time that the SRC line is activated.

A summary of the use of these resets is shown in the following chart:

| | CHECK Reset | CRC | SRC | CPU RST | SYS RST |
|---|---|---|---|---|---|
| Mark REG | | | | X | |
| Accept | | X | | | |
| Accept RST | | X | | | |
| S/C STR LCHS | | X | | | |
| Request Latches | | X | | | |
| POS SEL ODD LCH | | | X | | |
| POS SEL EVEN LCH | | | X | | |
| P-ACC RST | | | X | | |
| P-ACC | | | X | | |
| Odd Busy | | | | | X |
| Even Busy | | | | | X |
| X/Y Trigger | | | X | | |
| X REG | | | X | | |
| Y REG | | | X | | |
| W/Z Trigger | | | | X | |
| CPU INV STR Buffer | | | X | | |
| XY-WZ SYNCH CHK TRIG | X | | | | |
| CPU STR Data CHK LCHS | X | | | | |
| BCU STOP | X | | | | |
| CPU STR ADR CHK TGR | X | | | | |
| CPU SAP | | | | X | |
| ADR VAL | | | X | | |
| CH REQ | | | X | | |

*(6.3.6.3) System reset*

The system reset signal resets the busy triggers at LB time (LBR line, FIG. 28) whenever storage is inhibited by a "stop on error control" in response to maintenance operations (see Table of Contents) of said environmental system.

Sections 7.0 through 22.0 are shown only in said environmental system, referred to herein in Section 2.0.

While the invention has been shown and described with respect to a preferred embodiment thereof, it will be understood by those skilled in the art that various changes mentioned herein and other changes and modifications of the invention may be made without departing from the spirit and scope thereof, which is to be limited only by the following claims.

What is claimed is:

1. In a data processing system having addressable storage means and including a Central Processing Unit and at least one channel, said Central Processing Unit providing timing signals which delineate machine cycles, a storage reference control device, comprising:

a Central Processing Unit request latch settable in response to a storage reference request manifestation from said Central Processing Unit, said latch being settable at a first time within a machine cycle;

a channel request latch settable in response to a channel storage reference request manifestation, said channel request latch being settable at a second time in a machine cycle which follows said first time;

and a selection means including connection means for connecting said selection means to said Central Processing Unit request latch and to said channel request latch, selectively, said selection means generating a selection signal for said storage means in response to the setting of said Central Processing Unit request latch or said channel request latch, alternatively, said connection means including means responsive to said channel request latch to block the connection from said Central Processing Unit request latch to said selection means.

2. The device described in claim 1 including a circuit connection means for selectively interconnecting said Central Processing Unit with said storage means and for alternatively interconnecting said channel with said storage means;

and means responsive to said channel request latch to cause said circuit connection means to interconnect said channel with said storage means, said circuit connection means otherwise interconnecting said Central Processing Unit with said storage means.

3. The device described in claim 1 additionally comprising:

busy means responsive to said selection signal for generating a storage busy manifestation, said busy manifestation being applied to said selection means to inhibit the operation thereof;

and means operable at said second time to reset said busy means thereby preventing it from generating said busy manifestation at said second time;

whereby said selection means will connect with said channel request latch rather than said Central Processing Unit request latch in the event that each latch designates a request to a storage unit which is initially busy upon the occurrence of such storage unit indicating that it is no longer busy.

4. In a data processing system having addressable storage means and including a Central Processing Unit and a plurality of channels, said Central Processing Unit providing timing signals which delineate machine cycles, said channels operating independently of said CPU timing signals, a storage reference control device, comprising:

channel priority means for determining priority of requests initiated by said channels for storage reference operations;

a channel request latch responsive to said priority means to register said designated storage reference request, said channel request latch operable in the same fashion without regard to which channel may have operated said channel priority means;

a Central Processing Unit request latch settable in response to a storage reference request manifestation from said Central Processing Unit;

and selection means for initiating a storage reference request in response to said channels or said Central Processing Unit, selectively, said selection means granting preference to said Central Processing Unit in the event that the requested storage unit is not busy at the time that said storage request latches are set, said selection means granting preference to said channels in the event that the requested storage device is busy at the time of setting of said storage request latches.

5. The device described in claim 4 additionally comprising:

cyclic inhibit means responsive to said Central Processing Unit timing signals to recognize the operation of said selection means in one cycle and to inhibit the operation thereof in a following cycle.

6. The device described in claim 3 including:

a circuit connection means for selectively interconnecting said Central Processing Unit with said storage means and for alternatively interconnecting said channel with said storage means;

and means responsive to said channel request latch to cause said circuit connection means to interconnect said chanel with said storage means, said circuit connection means otherwise interconnecting said Central Processing Unit with said storage means.

7. The device described in claim 4 including:

a circuit connection means for selectively interconnecting said Central Processing Unit with said storage means and for alternatively interconnecting said channel with said storage means;

and means responsive to said channel request latch to cause said circuit connection means to interconnect said channel with said storage means, said circuit connection means otherwise interconnecting said Central Processing Unit with said storage means.

8. The device described in claim 5 including:

a circuit connection means for selectively interconnecting said Central Processing Unit with said storage means and for alternatively interconnecting said channel with said storage means;

and means responsive to said channel request latch to cause said circuit connection means to interconnect said channel with said storage means, said circuit connection means otherwise interconnecting said Central Processing Unit with said storage means.

9. The device described in claim 1 including:

cyclic inhibit means responsive to said Central Processing Unit timing signals to recognize the operation of said selection means in one cycle and to inhibit the operation thereof in a following cycle.

10. The device described in claim 2 including:

cyclic inhibit means responsive to said Central Processing Unit timing signals to recognize the operation of said selection means in one cycle and to inhibit the operation thereof in a following cycle.

11. The device described in claim 3 including:

cyclic inhibit means responsive to said Central Processing Unit timing signals to recognize the operation of said selection means in one cycle and to inhibit the operation thereof in a following cycle.

12. The device described in claim 6 including:

cyclic inhibit means responsive to said Central Processing Unit timing signals to recognize the operation of said selection means in one cycle and to inhibit the operation thereof in a following cycle.

13. The device described in claim 7 including:

cyclic inhibit means responsive to said Central Processing Unit timing signals to recognize the operation of said selection means in one cycle and to inhibit the operation thereof in a following cycle.

14. The device described in claim 8 including:

cyclic inhibit means responsive to said Central Processing Unit timing signals to recognize the operation of said selection means in one cycle and to inhibit the operation thereof in a following cycle.

References Cited

UNITED STATES PATENTS

| | | | |
|---|---|---|---|
| 3,061,192 | 10/1962 | Terzian | 235—157 |
| 3,200,380 | 8/1965 | MacDonald | 340—172.5 |

ROBERT C. BAILEY, *Primary Examiner.*

PAUL J. HENON, *Examiner.*

R. B. ZACHE, *Assistant Examiner.*